US009507588B2

(12) United States Patent
Arriola et al.

(10) Patent No.: US 9,507,588 B2
(45) Date of Patent: Nov. 29, 2016

(54) INFORMATION TERMINAL, INFORMATION PRESENTATION METHOD FOR AN INFORMATION TERMINAL, AND INFORMATION PRESENTATION PROGRAM

(75) Inventors: George Arriola, Atlanta, GA (US); Kichiro Kurozumi, Atlanta, GA (US); Takahiro Kawaguchi, Atlanta, GA (US); Jorge Furuya, Atlanta, GA (US); Brian Johnson, Atlanta, GA (US); Takashi Kawakami, Tokyo (JP); Masatoshi Inagawa, Tokyo (JP); Takamasa Kuramitsu, Tokyo (JP); Takahiro Okada, Tokyo (JP); Hironobu Aoki, Tokyo (JP); Seigo Iwasaki, Tokyo (JP); Yoshimitsu Funabashi, Lund (SE); Takashi Hasegawa, Tokyo (JP); Erica Kato, Lund (SE); Tetsuya Takahashi, Tokyo (JP); Makoto Kamiya, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 116 days.

(21) Appl. No.: 13/377,828

(22) PCT Filed: Sep. 30, 2009

(86) PCT No.: PCT/JP2009/005052
§ 371 (c)(1),
(2), (4) Date: Dec. 13, 2011

(87) PCT Pub. No.: WO2011/007401
PCT Pub. Date: Jan. 20, 2011

(65) Prior Publication Data
US 2012/0083260 A1 Apr. 5, 2012

(30) Foreign Application Priority Data
Jul. 16, 2009 (JP) .................................. 2009-167492

(51) Int. Cl.
*H04M 1/00* (2006.01)
*G06F 9/44* (2006.01)
*G06F 3/0488* (2013.01)
*G06F 17/30* (2006.01)

(52) U.S. Cl.
CPC ............ *G06F 8/71* (2013.01); *G06F 3/04883* (2013.01); *G06F 9/4446* (2013.01); *G06F 17/30064* (2013.01); *G06F 17/30265* (2013.01); *G06F 17/3056* (2013.01)

(58) Field of Classification Search
CPC ................... G06F 17/30064; G06F 17/30265; G06F 17/3056; G06F 17/30309; G06F 3/0482; G06F 3/0483; G06F 3/04883; G06F 8/71; G06F 9/4446; H04M 2250/60; H04M 1/72552; H04M 1/274583; H04M 1/72547; H04M 1/72586; H04L 12/589; H04W 4/12
USPC .............. 455/422.1, 425, 566; 715/203, 204, 715/704, 726, 732
See application file for complete search history.

(56) References Cited

U.S. PATENT DOCUMENTS 6,577,330 B1 *  6/2003  Tsuda et al. ................... 715/782
2002/0075312 A1 *  6/2002  Amadio et al. ............... 345/764
(Continued)

FOREIGN PATENT DOCUMENTS

CN    1274439 A    11/2000
CN    1994009      7/2007
(Continued)

OTHER PUBLICATIONS

Wolfgang Muller et al., "Visualization Methods for Time-Dependent Data—an Overview", Proceedings of the 2003 Winter Simulation Conference, Dec. 1, 2003, pp. 737-745, XP002444908.
(Continued)

*Primary Examiner* — Thai Vu
(74) *Attorney, Agent, or Firm* — Oblon, McClelland, Maier & Neustadt, L.L.P.

(57) ABSTRACT

[Object] To enable a user to simply and easily confirm update information of a plurality of pieces of content data handled by a plurality of various application programs without any troublesome operation. [Solving Means] A plurality of update information display cards (51) are aligned and displayed on a display screen (50). The update information display cards (51) displayed on the display screen (50) are associated with different pieces of content data, and update information of the content data is individually arranged on the corresponding update information display card (51). Moreover, the update information display cards (51) on which the update information of the different types of content data are arranged are aligned and displayed on the display screen (50) in a chronological order of the updates of the content data.

15 Claims, 36 Drawing Sheets

(56) References Cited

U.S. PATENT DOCUMENTS

| | | |
|---|---|---|
| 2005/0132053 A1 | 6/2005 | Roth et al. |
| 2006/0064638 A1* | 3/2006 | Bocking .............. G06F 3/0482 715/700 |
| 2008/0034307 A1* | 2/2008 | Cisler et al. .................. 715/764 |
| 2008/0034327 A1 | 2/2008 | Cisler et al. |
| 2008/0059958 A1 | 3/2008 | Bolanowski |
| 2009/0047983 A1* | 2/2009 | Klassen et al. .............. 455/466 |
| 2009/0327921 A1* | 12/2009 | Holm-Peterson et al. ... 715/753 |
| 2012/0036443 A1 | 2/2012 | Ohmori et al. |

FOREIGN PATENT DOCUMENTS

| | | |
|---|---|---|
| EP | 1 624 707 | 2/2006 |
| JP | 8-190569 | 7/1996 |
| JP | 11-65806 | 3/1999 |
| JP | 2001 186569 | 7/2001 |
| JP | 2004-264895 | 9/2004 |
| JP | 2005 160052 | 6/2005 |
| JP | 2009-48310 | 3/2009 |
| WO | 03 067815 | 8/2003 |

OTHER PUBLICATIONS

International Search Report issued Mar. 26, 2010 in PCT/JP09/005052 filed Sep. 30, 2009.

Combined Office Action and Search Report issued Oct. 22, 2013 in Chinese Application No. 200980158796.0 (English Translation).

* cited by examiner

Fig. 38

| Filter category | Subcategory | | Idle state | | | Preview state | |
|---|---|---|---|---|---|---|---|
| | | Image | Text TX1 | Text TX2 | Preview text PTXA | Preview text PTXB |
| Media | Music | Latest purchased album | Album cover | Album title | Stored date and time | Artist name | Artist name |
| | | Latest purchased song | Album cover | Song title | Stored date and time | Artist name | Artist name |
| | Moving image | Latest purchased moving image | Head frame moving image | – | Stored date and time | – | – |
| | | Latest captured moving image | Head frame moving image | – | Stored date and time | – | – |
| | Photograph | Latest captured photograph | Photograph | – | Stored date and time | – | – |
| Telephone & message | Missed call | Registered in address book | Registered photograph | Registered name | Stored date and time | – | Phone number |
| | | Unregistered in address book | Image for unregistered | Phone number | Stored date and time | – | – |
| | Voice mail | Registered in address book | Voice mail image | Voice mail | Stored date and time | – | – |
| | | Unregistered in address book | Voice mail image | Voice mail | Stored date and time | – | – |
| | Received SMS | Registered in address book | Registered photograph | Registered name | Stored date and time | Message (within limited number of letters) | Message (sufficient number of letters) (link) |
| | | Unregistered in address book | Image for unregistered | Phone number | Stored date and time | Message (within limited number of letters) | Message (sufficient number of letters) (link) |
| | Received MMS | Registered in address book | Registered photograph | Registered name | Stored date and time | Message (within limited number of letters) | Message (sufficient number of letters) (link) |
| | | Unregistered in address book | Image for unregistered | Phone number | Stored date and time | Message (within limited number of letters) | Message (sufficient number of letters) (link) |

Fig. 39

| Filter category | Subcategory | | Idle state | | | Preview state | |
|---|---|---|---|---|---|---|---|
| | | | Image | Text TX1 | Text TX2 | Preview text PTXA | Preview text PTXB |
| E-mail | Received e-mail | Registered in address book | Registered photograph | Registered name | Stored date and time | Title | Title |
| | | Unregistered in address book | Image for unregistered | E-mail address | Stored date and time | Title | Title |
| IM | IM | Registered in address book | Registered photograph | Registered name | Stored date and time | Message (within limited number of letters) | Message (sufficient number of letters) (link) |
| | | Unregistered in address book | Image for unregistered | Phone number | Stored date and time | Message (within limited number of letters) | Message (sufficient number of letters) (link) |
| SNS | SNS | Linked | Registered photograph | Registered name | Stored date and time | Update condition (within limited number of letters) | Update condition (sufficient number of letters) |
| | | Unlinked | Image for unregistered | Phone number | Stored date and time | Update condition (within limited number of letters) | Message (sufficient number of letters) |
| RSS feed | RSS feed text & image | | Source logo | Headline | Stored date and time | After headline | Headline etc. (sufficient number of letters) |
| | RSS feed image | | Source logo | Header | Stored date and time | – | – |

Fig. 40

| Operation (gesture) | Operation | Result |
|---|---|---|
| Touch | Touch card in idle state | Card is set to preview state after elapse of X time period |
| Tap | Tap card in idle state | Application corresponding to card is activated |
| Upward flick/drag | Upwardly flick card in idle state | Scroll speed is raised |
| Downward flick/drag | Downwardly flick card in idle state | Scroll speed is lowered |
| Leftward flick | Leftwardly flick card in idle state | Next adjacent cards are displayed on screen |
| Rightward flick | Rightwardly flick card in idle state | Next adjacent cards are displayed on screen |
| Forward rock | - | - |
| Backward rock | - | - |

Fig. 41

| Operation (gesture) | Operation | Result |
|---|---|---|
| Touch | Touch card in preview state | Card in preview state is displayed |
| Tap | Tap card in preview state | Application corresponding to card is activated |
| Touch + rightward drag | Touch and rightwardly drag card in preview state | Shift to pivot state |
| Touch + upward drag | - | - |
| Touch + downward drag | Touch and downwardly drag card in preview state | Entering card deletable state |
| Upward flick | - | - |
| Downward flick | - | - |
| Leftward flick | - | - |
| Rightward flick | - | - |
| Forward rock | - | - |
| Backward rock | - | - |
| Touch | Touch pivot icon on card in preview state | Shift to pivot state |

INFORMATION TERMINAL, INFORMATION PRESENTATION METHOD FOR AN INFORMATION TERMINAL, AND INFORMATION PRESENTATION PROGRAM

TECHNICAL FIELD

The present invention relates to an information terminal such as a cellular phone terminal, and an information presentation method and information presentation program for presenting various types of information handled in the information terminal to a user.

BACKGROUND ART

Conventionally, a cellular phone terminal as a typical example of a mobile information terminal has a function of displaying a list of incoming/outgoing call histories of calls, transmission/reception histories of e-mails, reception histories of other messages, and the like.

For example, Japanese Patent Application Laid-open No. 2001-186569 (Patent Literature 1) discloses a mobile wireless phone that records, in a recording means, communication recordings such as a transmission/reception date and time of a call or mail and a destination phone number and e-mail address, presence/absence of information attached at the time of transmission/reception, and a location of that information. In addition, the mobile wireless phone disclosed in Patent Literature 1 displays communication recordings in time series when a predetermined button operation is made, for example, acquires, when there is additional information, the information from the recording means, and reproduces audio from a loudspeaker if the information is audio information or displays it if the information is letter or image information.

Further, Japanese Patent Application Laid-open No. 2005-160052 (Patent Literature 2) discloses mobile terminal equipment that includes a storage part for storing transmitted and received e-mails, a control part for detecting, among the e-mails stored in the storage part, e-mails of a designated person, and a display part for displaying in time series a list of e-mails of that person that have been detected by the control part. In other words, the mobile terminal equipment disclosed in Patent Literature 2 is capable of mixedly displaying in time series a list of transmitted e-mails and received e-mails of a designated person so that it is possible to judge at a glance what kind of e-mails have been exchanged with that person.

CITATION LIST

Patent Literature

[Patent Literature 1] Japanese Patent Application Laid-open No. 2001-186569 (FIG. 1)
[Patent Literature 2] Japanese Patent Application Laid-open No. 2005-160052 (FIG. 2)

SUMMARY OF INVENTION

Technical Problem

Incidentally, in recent years, a cellular phone terminal is capable of executing not only an application program for calls or an e-mail application program, but also a variety of application programs that run individually or in cooperation with others such as an application program for connecting to the Internet and viewing a webpage, an application program for shooting photographic images and moving images and reproducing those images, an application program for managing and reproducing music, and a schedule management application program.

Therefore, when confirming an update of content data handled by a desired application program out of those plurality of application programs, for example, a user needs to operate the cellular phone terminal to activate the desired application program and thereafter make an operation to display, on a display, update information of the content data handled by that application program, and the like.

Specifically, when confirming an update content on an e-mail communication history, for example, a user needs to activate an e-mail application program and make an operation to display a content of the communication history by executing the e-mail application program. Moreover, when confirming addition and display histories of photographic images, for example, a user needs to activate a photograph application program and make an operation to display a content of the addition and display histories by executing that application program.

Therefore, when wishing to confirm update contents of a plurality of pieces of content data handled by different application programs, for example, a user needs to activate a certain application program first to display an update content of content data handled by that program and the like, then select a different application program to activate next and activate the selected application program to display an update content of content data handled by that program and the like, and repeat the operation one after the other, thus requiring an extremely-troublesome task. It should be noted that, practically, the same holds true for a case where update contents of a plurality of types of content data handled by the same application program are confirmed, for example. For confirming update contents of those different types of content data and the like, a user needs to make troublesome operations of sequentially switching update contents of those various types of content data to display them.

The present invention has been proposed in view of the circumstances as described above, and it is an object of the invention to provide an information terminal, an information presentation method for an information terminal, and an information presentation program that enable a user to simply and easily confirm update contents of a plurality of types of content data handled by different types of application programs and the like, without any troublesome operation.

Solution to Problem

An information terminal according to the present invention includes an update information storage, an information manager, and a display controller. The update information storage stores a part of content data updated in an information storage that stores a plurality of types of content data, as update information associated with the respective types of content data. The information manager monitors an update of the content data in the information storage, stores, when the content data is updated in the information storage, the part of the updated content data in the update information storage as the update information associated with the respective types, and reads out, during a predetermined screen display state, the update information associated with the respective types of content data from the update information storage in a chronological order of the updates of the content data. The display controller arranges the individual time-series update information that have been read out from the update information storage by the information manager on a plurality of predetermined object images respectively corresponding thereto, and aligns and displays the predetermined object images on which the update information are arranged individually in the chronological order of the update information. Accordingly, the problem of the present invention described above is solved.

In other words, according to the present invention, it is possible to integrally manage update information of a plurality of types of contents and display them on a screen in time series.

Advantageous Effects of Invention

In the present invention, since it is possible to integrally manage update information of a plurality of types of contents and display them on a screen in time series, an update of a plurality of pieces of content data and the like handled by a variety of application programs executed individually can be simply and easily confirmed by a user without any troublesome operation.

BRIEF DESCRIPTION OF DRAWINGS

FIG. 3 A diagram schematically showing a state where an information manager acquires updated data when content data stored in the information storages shown in FIG. 2 are updated, added, or the like.

FIG. 29 Diagrams showing a screen shift example at a time information on a content of an update information display card is linked with registered information of an address book and the like.

FIG. 30 Diagrams showing a screen shift example at a time information on a content of an update information display card is linked with registered information of an address book and the like.

FIG. 38 A diagram showing an update information table as a list of information that the update information manager acquires from the information storages and stores in an update information storage, in particular, a part of the table concerning filter categories of media and a telephone and message.

FIG. 39 A diagram showing the update information table as a list of information that the update information manager acquires from the information storages and stores in the update information storage, in particular, a part of the table concerning filter categories of an e-mail, IM, SNS, and RSS feed.

FIG. 40 A diagram showing a gesture operation management table used in judging which of the instructions a gesture operation of a user with respect to a touch panel is, in particular, a part of the table used when the update information display cards are in the idle state.

FIG. 41 A diagram showing a gesture operation management table used in judging which of the instructions the gesture operation of the user with respect to the touch panel is, in particular, a part of the table used when any one of the update information display cards is in the preview state.

DESCRIPTION OF EMBODIMENTS

Hereinafter, an embodiment of the present invention will be described with reference to the drawings.

It should be noted that this embodiment exemplifies a cellular phone terminal as an example to which an information terminal, an information presentation method, and an information presentation program of the present invention are applied, but contents described hereinbelow are merely an example and the present invention is of course not limited to this example.

(Schematic Structure of Cellular Phone Terminal)

Figure 1:
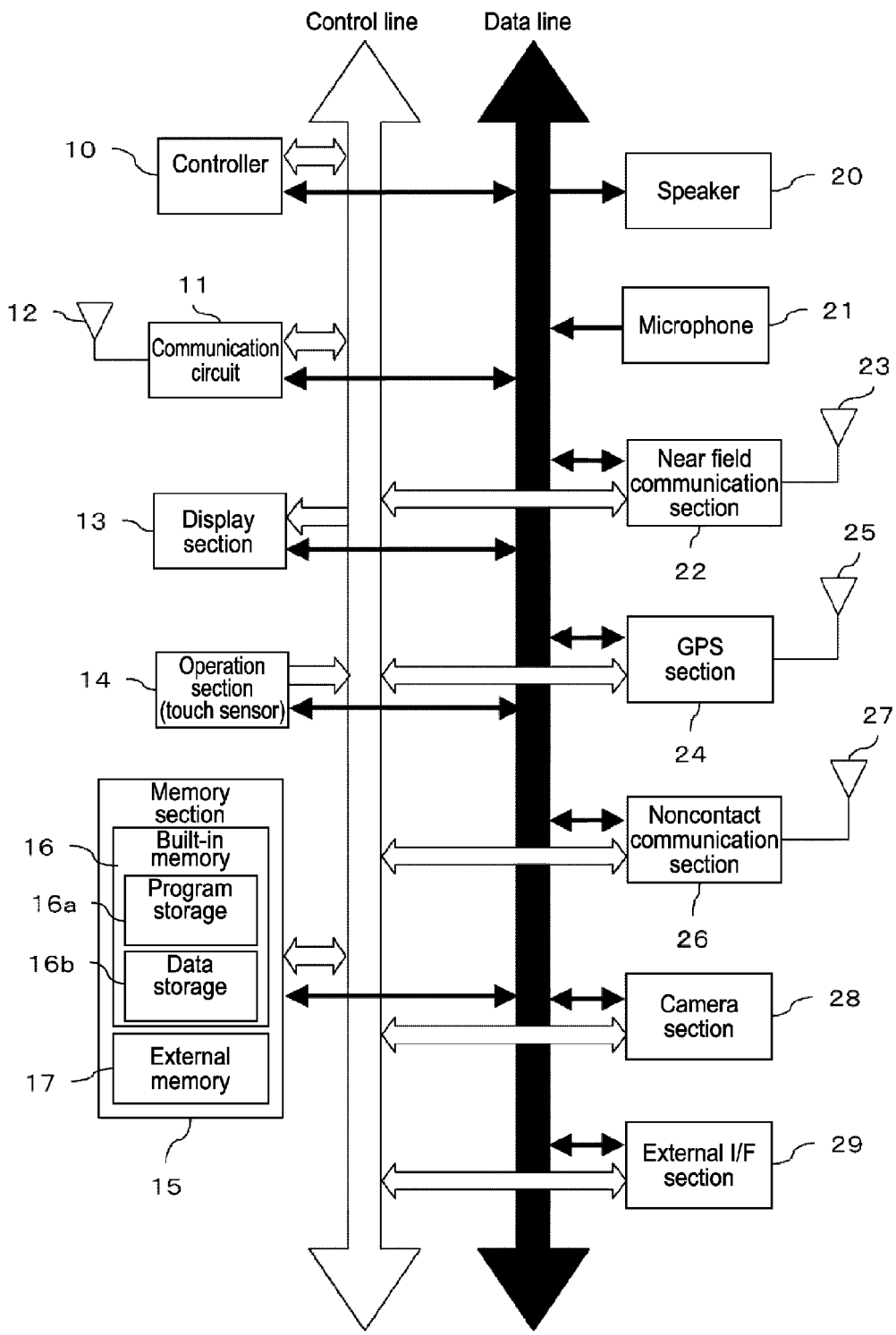
FIG. 1 A block diagram showing a schematic structure of a cellular phone terminal according to an embodiment of the present invention.

FIG. 1 shows a schematic inner structural example of a cellular phone terminal of this embodiment.

In FIG. 1, a communication antenna 12 is, for example, a built-in antenna, and transmits and receives signal waves for calls and packet communication of e-mails and the like. A communication circuit 11 performs a frequency conversion, modulation, demodulation, and the like on transmitted and received signals.

A speaker 20 is a receiver speaker provided to the cellular phone terminal or an output speaker for a ringer (ring tone), an alarm, reproduced music, audio of reproduced moving images, and the like, and converts an audio signal supplied from a controller 10 into an acoustic wave and outputs it into the air.

A microphone 21 is a transmitter microphone or outside audio collection microphone and converts an acoustic wave into an audio signal and transmits the audio signal to the controller 10.

A display section 13 includes a display device such as a liquid crystal display and an organic EL (Electroluminescent) display and a display drive circuit for the display, and displays various letters and messages of e-mails and the like or displays still images, moving images, and the like on the display by image signals supplied from the controller 10. Further, in this embodiment, although details will be described later, display of update information indicating an update, new addition, and the like of a plurality of types of content data handled by various application programs is also performed on a screen of the display section 13 using tile-like or card-type object images.

An operation section 14 is constituted of, for example, operators such as a so-called touch panel, various button keys, and a jog dial, and an operation signal generator that generates operation signals when those operators are operated. It should be noted that a touch panel used as the operation section 14 can be provided almost over the entire surface of the display section 13, for example. When the touch panel is provided almost over the entire surface of the display section 13, a display position on the screen of the display section 13 and a touch detection position on the touch panel are associated with each other. Moreover, in a case where a user carries out various gesture operations such as touch, tap, flick, drag, and smear as will be described later on the touch panel using a finger or the like, the cellular phone terminal of this embodiment can judge which gesture operation has been made. In addition, the cellular phone terminal of this embodiment performs control and operations based on the detected gesture operation.

A near field communication section 22 performs near field communication via a near field communication antenna 23 using, for example, a so-called Bluetooth (registered trademark) system, UWB (Ultra Wide Band) system, and wireless LAN (Local Area Network). Moreover, the near field communication section 22 performs overall control in the near field communication and exchanges data with the controller 10.

A GPS section 24 receives a GPS signal from a GPS geodesic satellite via a GPS antenna 25 and obtains a latitude and longitude of a current position of the own terminal using the GPS signal. GPS data (information indicating latitude and longitude) obtained by the GPS section 24 is transmitted to the controller 10. As a result, the controller 10 can grasp the current position of the own terminal.

A noncontact communication section 26 performs noncontact communication used in, for example, so-called RFID (Radio Frequency-Identification) or noncontact IC card via a noncontact communication antenna 27. The noncontact communication section 26 is used for exchanging information on an electronic settlement by a so-called e-wallet or information as an electronic ticket for entering and exiting stations using noncontact communication.

A camera section 28 is a built-in camera for shooting still images and moving images and constituted of an optical lens, an image pickup device, a lens drive mechanism that drives the optical lens for adjusting a focus and changing a zoom magnification, a drive circuit thereof, an image processing circuit that performs image processing on an image pickup signal from the image pickup device, and the like. An image signal obtained by the camera section 28 is stored in a memory section 15 under control of the controller 10.

An external I/F section 29 is constituted of a cable connection connector section and an external data communication interface circuit that are used when performing data communication via a cable, for example. Data exchanged via the external I/F section 29 is stored in the memory section 15 as necessary under control of the controller 10.

The memory section 15 includes a built-in memory 16 provided inside the cellular phone terminal of this embodiment and a detachable card-type external memory 17 that stores so-called SIM (Subscriber Identity Module) information and the like. The built-in memory 16 is constituted of a ROM (Read Only Memory) and a RAM (Random Access Memory). The ROM stores an OS (Operating System), a control program used for the controller 10 to control respective sections, various initial setting values, dictionary data, sound data such as a ring tone and a key operation tone, various application programs for, for example, SNS (Social Networking Service), SMS (Short Message Service)/MMS (Multimedia Messaging Service), e-mails, music, moving images, and photographs, an information presentation application program that enables update information, that indicates an update or addition of a plurality of types of content data handled by various application programs, to be managed integrally and presented to the user as will be described later, and the like. Further, the ROM includes a rewritable ROM such as a NAND-type flash memory and an EEPROM (Electrically Erasable Programmable Read-Only Memory). The rewritable ROM is capable of storing content data handled by various application programs and information related to attributes of those content data, that is, data on a phone number, an e-mail address, an individual name, and an SNS account (hereinafter, collectively referred to as address book data), schedule book data, calendar data, SMS/MMS/e-mail message data, communication histories on transmission and reception of the message data and incoming and outgoing calls, data on still images and moving images taken by a camera or transferred from a personal computer and the like, still images and moving images purchased through the Internet and the like, a music buying history, data files that a user has downloaded via a network, user dictionary data, and various user setting values, for example. It should be noted that in the example shown in FIG. 1, out of a storage area for the various types of data and programs in the built-in memory 16, a program storage 16a that stores the control program, the information presentation application program, and various other application programs, a data storage 16b that stores various types of data on an address book, messages, and the like described above, and the like are illustrated in particular. As a matter of course, though an illustration is omitted, the RAM occasionally stores data as a work area when the controller 10 carries out various types of data processing.

The controller 10 is constituted of a CPU (Central Processing Unit) and performs control of communication in the communication circuit 11, audio processing and control thereof, image processing and control thereof, various other types of signal processing, control of respective sections, and the like. Moreover, the controller 10 executes various control programs and application programs stored in the memory section 15, information processing of various contents associate therewith, and the like. Furthermore, as will be described later in detail, in the case of this embodiment, the controller 10 uses the information presentation application program stored in the program storage 16a of the memory section 15 to execute processing of integrally managing update information indicating an update, addition, and the like of a plurality of pieces of content data handled by various application programs and the like and presenting them to the user.

In addition, although illustrations are omitted in FIG. 1, the cellular phone terminal of this embodiment also includes constituent elements that are provided to a general cellular phone terminal, such as a power management IC section that controls a battery for supplying power to the respective sections and power thereof, an external memory slot, a reception tuner section and an AV codec section for digital broadcasts, and a timer (clock section).

(Management of Content Update/Addition)

Figure 2:
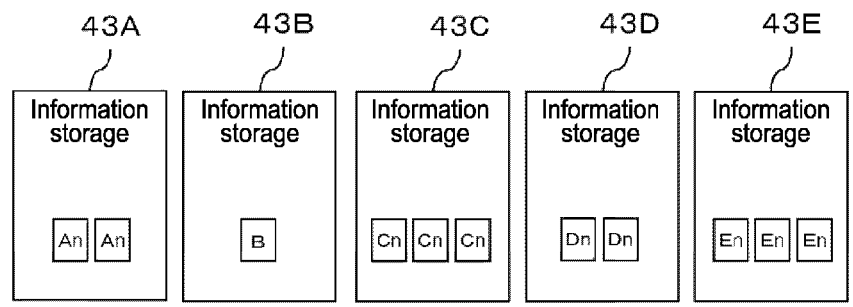
FIG. 2 A diagram schematically showing information storages that individually store information on contents handled by a plurality of different types of application programs included in the cellular phone terminal of this embodiment.

FIG. 2 schematically shows information storages 43A to 43E that individually store information on contents handled by a plurality of different types of application programs included in the cellular phone terminal of this embodiment.

Here, although the information storages 43A to 43E are formed inside the data storage 16b of the memory section 15 in this embodiment, it is also possible to additionally provide an information storage prepared on an external network.

Further, in this embodiment, examples of the plurality of different types of application programs include various application programs for calls, SNS, SMS/MMS, e-mails, music, moving images/photographs, and an address book.

It should be noted that FIG. 2 does not show those in particular, and an example in which 5 types of content data are stored in the information storages respectively corresponding thereto is shown. Specifically, FIG. 2 shows an example in which content data An, An are stored in the information storage 43A and, similarly, content data B is stored in the information storage 43B, content data Cn, Cn, Cn are stored in the information storage 43C, content data Dn, Dn are stored in the information storage 43D, and content data En, En, En are stored in the information storage 43E.

Figure 3:
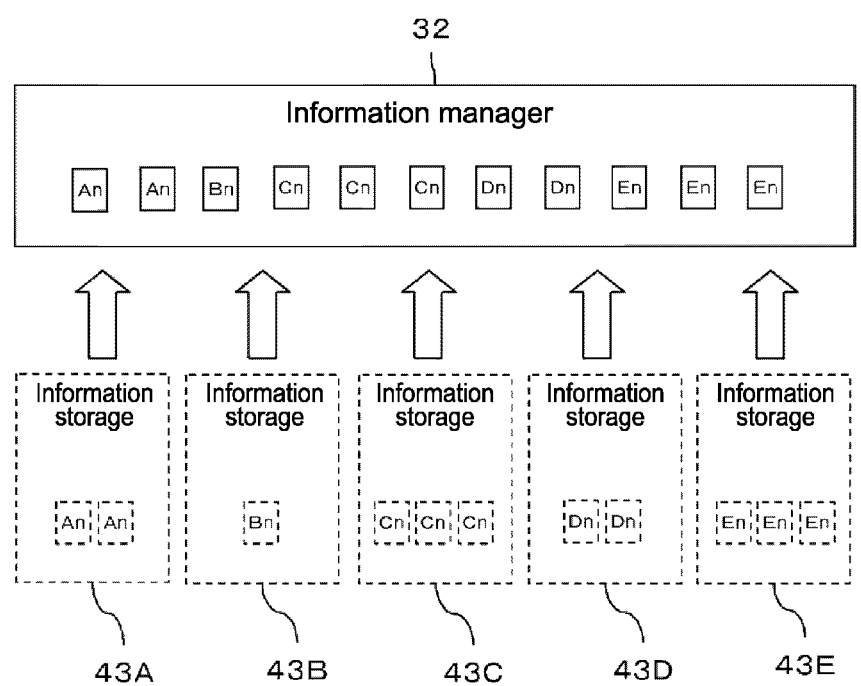

Further, as shown in FIG. 3, the cellular phone terminal of this embodiment includes an information manager 32 that manages whether an update, new addition, or the like has been made with respect to the content data stored in the information storages 43A to 43E, and, when an update, addition, or the like is made, acquires a part or all of the date that has been updated, added, or the like from the information storages 43A to 43E to manage and store them.

It should be noted that the example of FIG. 3 schematically shows a state where, when an update, addition, or the like is made to the content data stored in the information storages 43A to 43E as described above with reference to FIG. 2, the information manager 32 acquires the updated data or the like. In other words, the example of FIG. 3 shows a state where, in a case where updated or added content data An, An are stored in the information storage 43A and, similarly, updated or added content data Bn is stored in the information storage 43B, updated or added content data Cn, Cn, Cn are stored in the information storage 43C, updated or added content data Dn, Dn are stored in the information storage 43D, and updated or added content data En, En, En are stored in the information storage 43E, the information manager 32 acquires a part or all of the updated or added content data An, An, Bn, Cn, Cn, Cn, Dn, Dn, En, En, En from the information storages 43A to 43E and stores and manages them inside.

(Update Information Display Card)

In a case where an update, addition, or the like is made to the various types of content data handled by the plurality of different types of application programs as described above, by displaying update information indicating the update, addition, or the like of those contents on a display screen, the cellular phone terminal of this embodiment can notify the user of a content of the update, addition, or the like of the contents in an easy-to-understand way.

Figure 4:
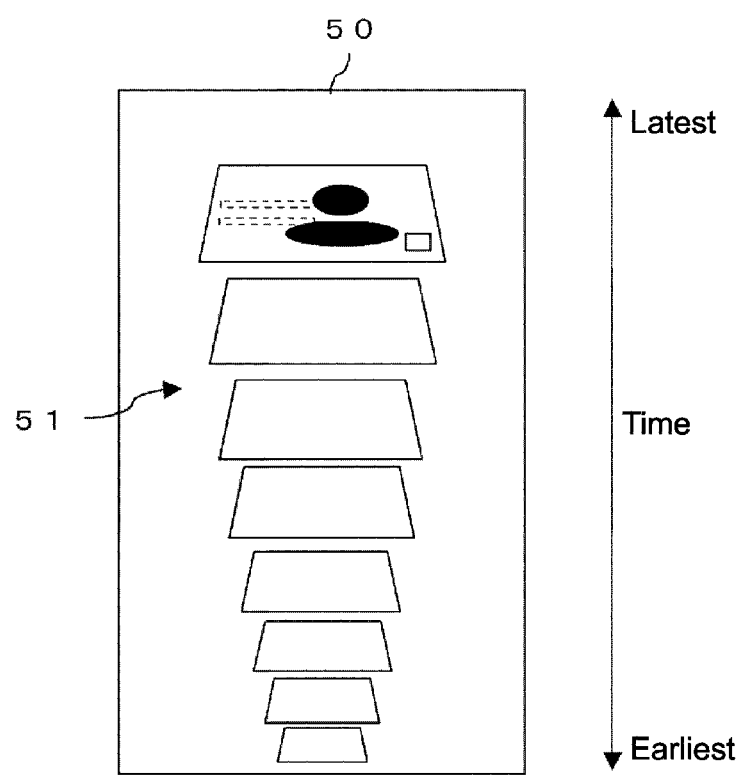
FIG. 4 A diagram showing an example of a user interface screen on which a plurality of update information display cards are displayed while being arranged in a chronological order of an update, change, or the like of content data.
Figure 5:
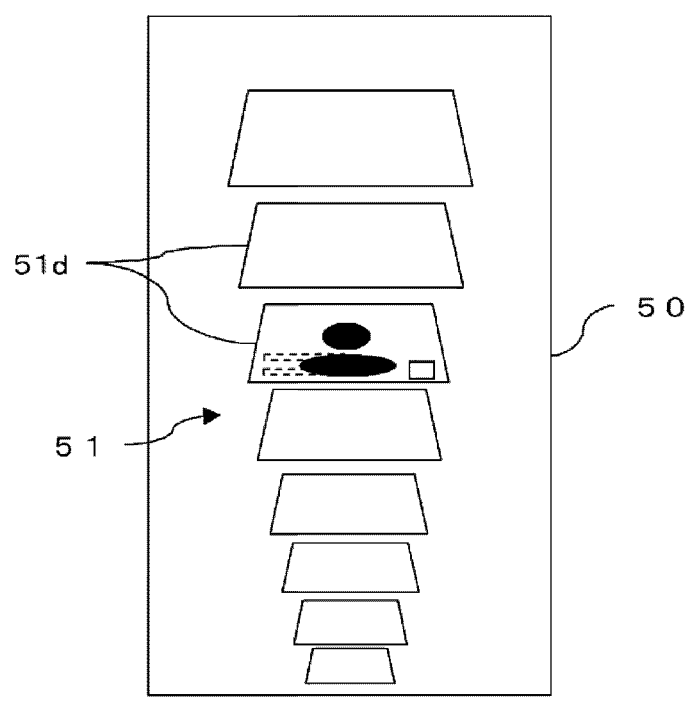
FIG. 5 A diagram showing the user interface screen in a state where the plurality of update information display cards are displayed while being arranged in the chronological order of the update, change, or the like of the content data, the diagram being used for explaining a case where all the update information display cards are in an idle state.

When displaying the update information on the display screen in this embodiment, as shown in FIGS. 4 and 5, a tile-like or card-type object (referred to as update information display card 51 in this embodiment) is used, for example. In other words, in this embodiment, a single update information display card 51 is a display object for comprehensibly presenting to the user a fact that an update or addition has been made to the content data corresponding to that card and a brief content of the update or addition.

Moreover, displayed on each of the update information display cards 51 is information that precisely indicates content characteristics and an update content, such as information indicating to which program among the various application programs for SNS, SMS, e-mails, music, and photographs a content corresponds, information that is unique to each content and capable of indicating an attribute of each content, such as a sender of a message and a news headline, and information indicating a date and time of an update, addition, or the like of content data and the like.

Specifically, in this embodiment, an icon, letter information, and the like corresponding to a type of a content is used as an example of the information that indicates to which application program the content corresponds, and the icon and letter information are prepared in advance and differ for each content. Moreover, letter information and an image such as a photograph that indicate a sender of a message, and letter information indicating a distribution source of news and a news headline are used as an example of the information that is unique to each content and capable of indicating an attribute thereof. Further, letter information indicating a date, date and time, and the like is used as the information indicating a date and time of an update, addition, or the like of content data and the like. It should be noted that in the examples of FIGS. 4 and 5, an illustration on which content each of the update information display cards 51 corresponds to is omitted, and an illustration on a specific example of letter information and the like described on the update information display cards 51 is also omitted.

Furthermore, in this embodiment, when displaying a plurality of update information display cards on the display screen, by displaying the plurality of update information display cards while arranging them in line in a chronological order of updates of the content data, for example, a temporal relationship of an update, change, and the like among the content data can be presented comprehensibly.

In other words, the examples of FIGS. 4 and 5 each show a user interface screen in a state where the plurality of update information display cards 51 are displayed while being arranged in a chronological order of an update, change, and the like of the content data. It should be noted that FIGS. 4 and 5 each show a display example of the update information display cards 51 in a state where the cellular phone terminal of this embodiment is in a so-called standby state, which is, of course, a mere example. The screens of FIGS. 4 and 5 may be a predetermined update information display screen prepared additionally instead of the standby screen.

More specifically, in this embodiment, the plurality of update information display cards 51 displayed on the display screen are displayed sequentially in a reverse chronological order of update dates and times (displayed in time series) from an upper portion of the screen toward a lower portion of the screen as seen by the user from the front. In other words, as an example, in a reverse chronological order of dates and times of updates, changes, or the like (sequentially from upper portion to lower portion on screen), one update information display card indicating an SMS reception, one update information display card indicating another SMS reception, one update information display card indicating that there has been a news update from RSS (RDF (Resource Description Framework) Site Summary), one update information display card indicating an SNS update, one update information display card indicating an e-mail reception, one update information display card indicating that a photograph has been taken, and the like are displayed sequentially.

It should be noted that although FIG. 4 shows the example in which dates and times become earlier from the upper portion of the screen toward the lower portion of the screen, the order may of course be reversed. Moreover, although FIG. 4 shows the example in which the display screen is used in a vertically-long direction, in a case where the display screen is used in a horizontally-long direction, for example, the update information display cards may be displayed in time series from a left-hand side to a right-hand side (or vice versa) on the screen (i.e., display in which cards are arranged horizontally). Furthermore, in a case where screen display of the cellular phone terminal can be switched between the longitudinal direction and the lateral direction, a direction in which the update information display cards are displayed sequentially may be switched to the longitudinal direction or the lateral direction in an interlocking manner with the switch between the longitudinal and lateral display. Accordingly, it becomes possible to display more update information display cards in accordance with which of the longitudinal and horizontal directions the screen is used in. In addition, it is also possible to sequentially display the update information display cards in an oblique direction on the screen.

Further, the update information display cards may be displayed while being arranged in a curve instead of being arranged linearly in series. When arranging them in a curve, a direction of the curve may be switched based on which of a left hand and a right hand a user operates a touch panel with. For example, in a case where the user operates the touch panel with a right hand while the screen display is longitudinal display, the update information display cards may be sequentially displayed such that those on upper and lower sides of the screen are gradually curved rightwardly on the screen while those near the center portion of the screen protrude leftwardly on the screen. Conversely, in a case where the user operates the touch panel with a left hand, the update information display cards may be sequentially displayed such that those on the upper and lower sides of the screen are gradually curved leftwardly on the screen while those near the center portion of the screen protrude rightwardly on the screen. As a result, it is possible to realize a more user-friendly user interface.

Further, in this embodiment, as shown in FIGS. 4 and 5, the update information display cards 51 in the standby state are displayed such that, virtually, an upper or lower side of each card that is originally rectangular, for example, is slightly tilted in a depth direction of the screen. It should be noted that when the display screen is used in the horizontally-long direction and the update information display cards are thus sequentially displayed in the lateral direction on the screen, for example, it is desirable to display the rectangular cards such that the left- or right-hand side of each of the cards is virtually tilted in the depth direction of the screen.

As described above, by virtually tilting the originally-rectangular cards in the depth direction of the screen in this embodiment, a larger number of rectangular cards can be displayed on the screen than in a case where the cards are arranged on the screen as they are. In descriptions below, the update information display cards 51 that are displayed while being tilted in the depth direction of the screen are referred to as update information display cards 51d in an idle state in particular.

Further, as described above, displayed on one update information display card 51d in the idle state is information that precisely indicates content characteristics and an update content, such as information indicating to which application program a content corresponds, information that is unique to each content and capable of indicating an attribute of each content, and date and time information of an update or the like.

Furthermore, upon being input with an instruction to select a desired update information display card 51 from the user through a predetermined gesture operation made on the touch panel with respect to the update information display cards aligned and displayed on the screen as described above, for example, the cellular phone terminal of this embodiment changes a display state of the update information display card 51 selected by the instruction input.

Here, in this embodiment, the predetermined gesture operation for selecting a desired update information display card is, for example, a gesture operation of a user touching a detection area corresponding to a display area of the update information display card out of a detection area on the touch panel. It should be noted that the touch gesture operation is a gesture operation of touching the touch panel a certain time period or longer.

Figure 6:
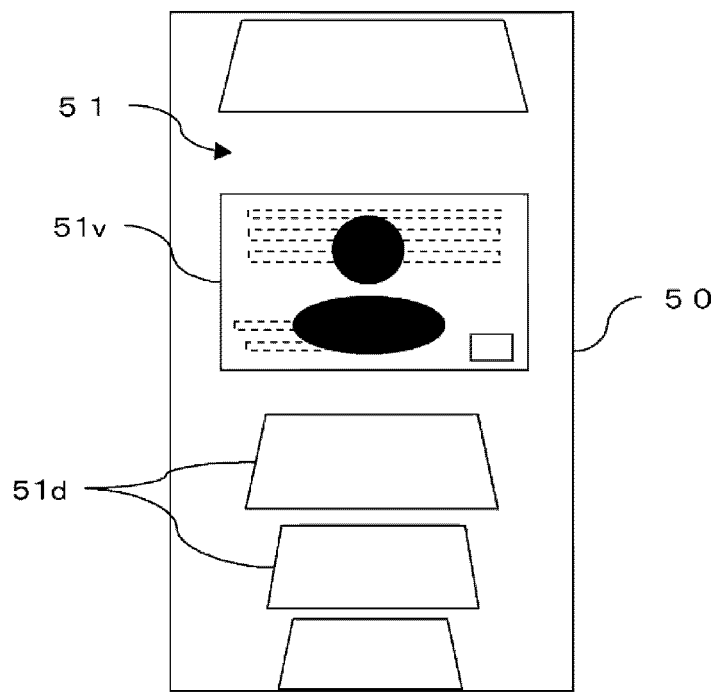
FIG. 6 A diagram showing the user interface screen in a state where the plurality of update information display cards are displayed while being arranged in the chronological order of the update, change, or the like of the content data, in particular, a display example of a case where any one of the update information display cards is in a preview state.

In a case where any one of the plurality of update information display cards 51d in the idle state is selected by the touch gesture operation made via the touch panel, the cellular phone terminal of this embodiment displays the selected update information display card 51 as an original rectangular card 51v as shown in FIG. 6.

In other words, in this case, the cellular phone terminal virtually raises the update information display card 51d in the idle state that has been tilted in the depth direction of the screen as described above so that a card surface thereof becomes substantially parallel to the screen as shown in FIG. 6, with the result that the update information display card 51 is displayed as a substantially-rectangular card.

As described above, in this embodiment, by virtually raising the update information display card 51 and displaying it as a rectangular update information display card 51v, the user is notified that the card has been selected for sure.

In descriptions below, the update information display card 51 raised and displayed as a rectangle on the screen is referred to as update information display card 51v in a preview state in particular.

Moreover, a larger number of pieces of information are displayed on the update information display card 51v in the preview state than the update information display card 51d in the idle state described above. Specifically, since an area that the update information display card 51v in the preview state occupies on the screen is larger than that of the update information display card 51d in the idle state, a larger number of pieces of information can be displayed on the screen of the update information display card 51v in the preview state.

In the case of this embodiment, similar to the update information display card 51d in the idle state, displayed on the update information display card 51v in the preview state are information indicating to which application program a content corresponds, and date and time information on an update or the like, and more-specific information than in the case of the idle state is displayed as information indicating an update content of the content.

Figure 7:
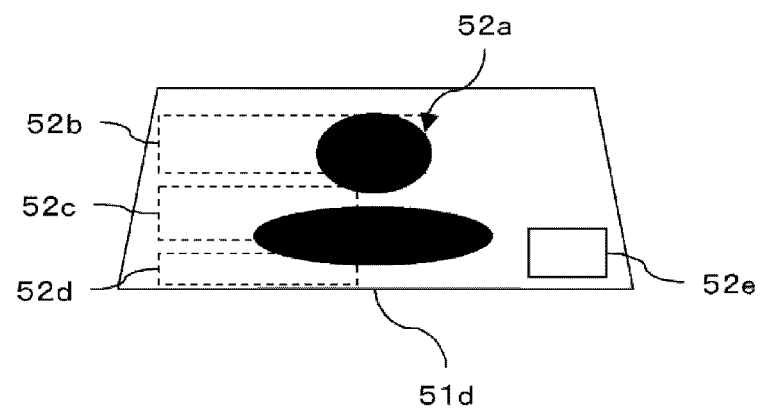
FIG. 7 A diagram used for explaining an update information display card in the idle state.
Figure 8:
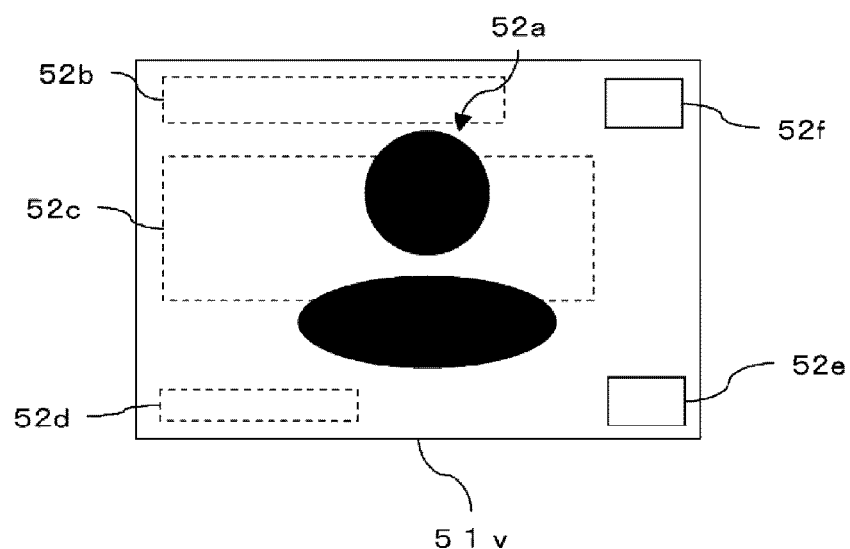
FIG. 8 A diagram used for explaining an update information display card in the preview state.

FIGS. 7 and 8 respectively show an enlarged update information display card 51d in the idle state (FIG. 7) and update information display card 51v in the preview state (FIG. 8).

As an example, arranged on the update information display card 51d in the idle state shown in FIG. 7 are an icon 52e that indicates to which of various application programs for SNS, e-mails, music, and the like a content corresponds, letter information 52b as information that is unique to each content and capable of indicating an attribute of each content, such as a sender of a message and a news headline, letter information 52c that roughly indicates an update content of the content, and letter information 52d that indicates a date and time of an update, addition, and the like. Moreover, when there is a thumbnail image of a photograph of a sender of a message or the like, a thumbnail image of an album cover of songs, or the like, a thumbnail image 52a thereof may be displayed on the card as a piece of information capable of indicating an attribute of the content.

On the other hand, on the update information display card 51v in the preview state shown in FIG. 8, the same icon 52e and date and time letter information 52d as in the case of the update information display card 51d in the idle state are arranged, and letter information 52c as information indicating a more-specific content of an update content of each content than in the case of the idle state is also arranged. In addition, on the update information display card 51v in the preview state, a thumbnail image 52a that is the same as that described above, an icon 52f that indicates a pivoting state to be described later, and the like are also arranged as necessary.

It should be noted that in a case where the user does not instruct anything for a certain time period or longer after the update information display card 51v is set to the preview state, the cellular phone terminal of this embodiment restores the update information display card 51v to the card 51d in the idle state.

(Activation of Application)

Further, upon being input with an instruction to activate an application program corresponding to a content of the update information display card 51 by the user through a predetermined gesture operation on the touch panel, for example, the cellular phone terminal of this embodiment activates the application program.

In this embodiment, the predetermined gesture operation for activating an application program corresponding to the content is, for example, a gesture operation of the user tapping a detection area corresponding to a display area of a desired update information display card out of the update information display cards in the idle state or a detection area corresponding to a display area of an update information display card in the preview state, in the detection area on the touch panel. It should be noted that the tap gesture operation is a gesture operation of touching the touch panel for a time period shorter than a certain time period.

(Filtering Processing of Update Information Display Card)

In the cellular phone terminal of this embodiment, it is also possible to sequentially display a plurality of update information display cards that indicate an update or the like of the same type of content data and the like instead of sequentially displaying the update information display cards 51 that indicate an update, addition, and the like of a plurality of different types of content data as described above, for example.

Specifically, the cellular phone terminal of this embodiment is capable of making a switch between a user interface screen that displays update information display cards corresponding to a plurality of different types of content data as described above and a user interface screen that displays update information display cards that all correspond to the same type of content data, in accordance with a filtering instruction input made by a predetermined gesture operation of the user on the touch panel, for example.

It should be noted that in this embodiment, the predetermined gesture operation for instructing filtering is, for example, a gesture operation of the user flicking the touch panel in a left- (flick left) or right-hand direction (flick right) or a gesture operation of selecting a page designation icon prepared on the display screen by a push gesture operation and dragging the icon.

Figure 9:
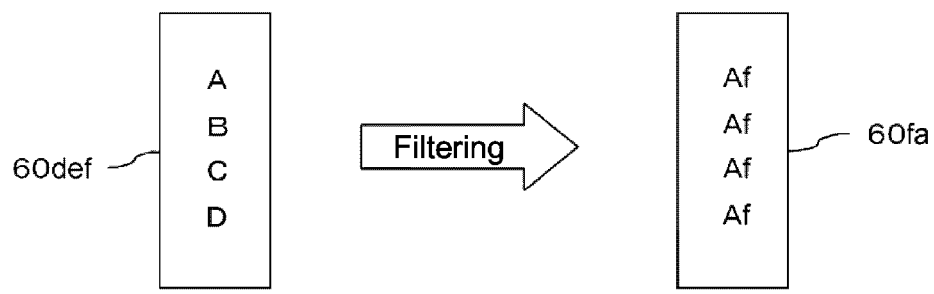
FIG. 9 A diagram used for schematically explaining a default display state where the plurality of update information display cards corresponding to different types of content data are in series and a post-filter display state where the plurality of update information display cards corresponding to the same type of content data and the like are in series.
Figure 10:
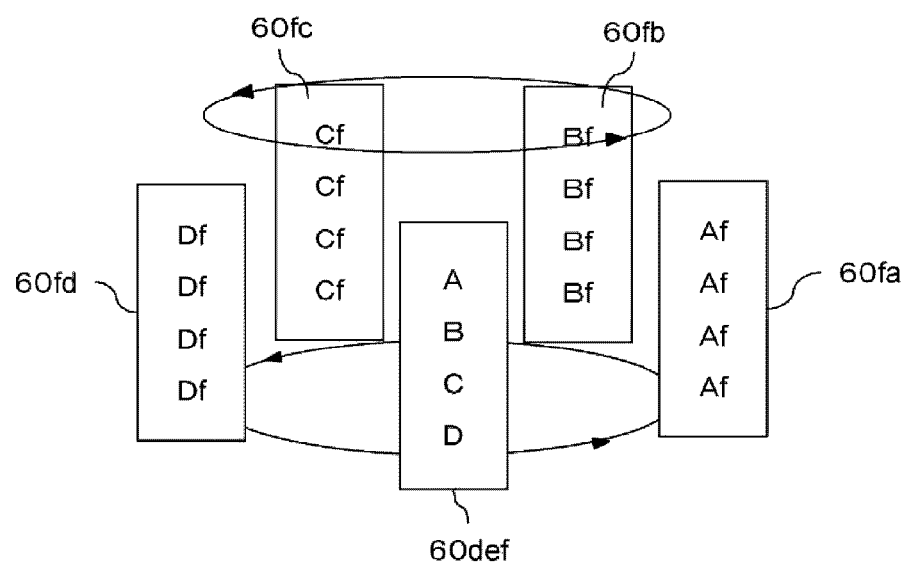
FIG. 10 A diagram schematically showing a shift example of a display state at a time a filtering instruction input is repeated.
Figure 11:
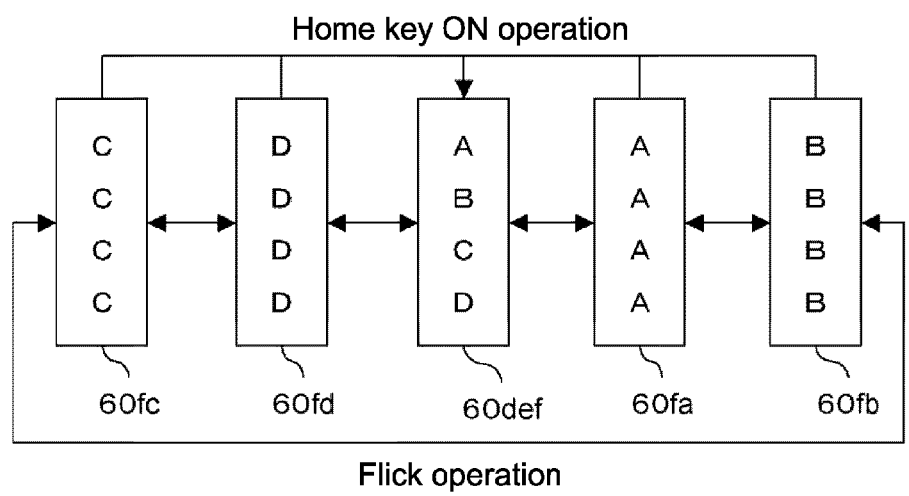
FIG. 11 A diagram used for explaining a relationship between a gesture operation for the filtering instruction input and the post-filter display states.

FIGS. 9 to 11 schematically show examples of switches of the update information display cards by filtering processing.

FIG. 9 shows a display state where a plurality of update information display cards corresponding to a plurality of different types of content data as described above are displayed in series (hereinafter, referred to as default display state 60*def*) and a display state where a plurality of update information display cards corresponding to the same type of content data and the like are displayed in series (hereinafter, referred to as post-filter display state 60*fa*).

It should be noted that "A, B, C, D" described in the default display state 60*def* in FIG. 9 represent update information display cards corresponding to different types of content data. In addition, "Af, Af, Af, Af" described in the post-filter display state 60*fa* in FIG. 9 represent update information display cards corresponding to the same type of content data.

Specifically, the post-filter display state 60*fa* indicates a display state where, due to an input of a filtering instruction made by a gesture operation of a flick or the like from the user via the touch sensor in the default display state 60*def*, a plurality of update information display cards "Af, Af, Af, Af" corresponding to the same type of contents as an update information display card "A", for example, are generated and arranged.

Taking an example to explain the filtering processing, when a gesture operation for the user to input a filtering instruction is made via the touch sensor in the default display state 60*def* where the update information display cards corresponding to the plurality of types of content data handled by various application programs for, for example, calls, SMS, e-mails, and photographs are arranged, the cellular phone terminal of this embodiment shifts display to the post-filter display state 60*fa* where the plurality of update information display cards corresponding to the same predetermined type of contents are arranged.

FIGS. 10 and 11 schematically show shift examples of the display state at a time a gesture operation for inputting a filtering instruction is repeated.

Specifically, the examples of FIGS. 10 and 11 schematically show a state where, when there are the default display state 60*def*, a post-filter display state 60*fa* constituted of the update information display cards "Af, Af, Af, Af" corresponding to the same type of contents, a post-filter display state 60*fb* constituted of update information display cards "Bf, Bf, Bf, Bf" corresponding to the same type of contents, a post-filter display state 60*fc* constituted of update information display cards "Cf, Cf, Cf, Cf" corresponding to the same type of contents, and a post-filter display state 60*fd* constituted of update information display cards "Df, Df, Df, Df" corresponding to the same type of contents, the default display state 60*def* and the post-filter display states 60*fa* to 60*fd* are switched cyclically every time a gesture operation for inputting the filtering instruction is made.

It should be noted that when a predetermined hard key prepared in advance is operated in the cellular phone terminal of this embodiment, it is possible to restore the state directly from the post-filter display states 60*fa* to 60*fd* to the default display state 60*def*.

(Pivoting Processing of Update Information Display Card)

In this embodiment, it is possible to perform a switch shift to a pivot display state of displaying, after a desired update information display card is selected from update information display cards in the default display state or update information display cards in the post-filter display state as described above, a list of update information of various different contents related to a content of the selected update information display card.

Here, in this embodiment, an example of the update information of contents displayed as a list in the pivot display state is update information of other same type of contents or a different type of contents that are extracted based on information related to an attribute of content data corresponding to the selected update information display card (hereinafter, referred to as attribute-related information in the embodiment of the present invention).

In a case where the selected update information display card corresponds to, for example, an e-mail reception content from a certain sender, an example of the attribute-related information of content data corresponding to the selected update information display card is information on a registered name, phone number, e-mail address, and the like of that sender registered in an address book. Moreover, in a case where the selected update information display card corresponds to a music content of a certain artist, an example of the attribute-related information is information on an artist name, a title of an album containing that music content, a musical genre of that music content, and the like. In these examples, in a case where the selected update information display card corresponds to an e-mail reception content from a certain sender, as update information of other same type of contents extracted based on the attribute-related information, update information of other sent/received e-mail contents that have been exchanged with the sender as the attribute-related information can be exemplified. Moreover, in a case where the selected update information display card corresponds to a music content of a certain artist, as information of other same type of contents extracted based on the attribute-related information, update information of other album contents and the like of that artist as the attribute-related information can be exemplified. Moreover, in a case where the selected update information display card corresponds to an e-mail reception content of a certain sender, as update information of a different type of contents extracted based on the attribute-related information, update information of an address book, SNS and SMS/MMS contents, contents of photographs and the like that are associated with the sender can be exemplified. Moreover, in a case where the selected update information display card corresponds to a music content of a certain artist, as update information of a different type of contents extracted based on the attribute-related information, update information of other album contents of that artist can be exemplified.

It should be noted that in this embodiment, the pivot display state in which display is switched to a list of update information extracted based on attribute-related information of content data of the selected update information display card will be referred to as first pivot display state.

Moreover, in the cellular phone terminal of this embodiment, a shift to the first pivot display state as described above is executed when a user inputs a pivoting instruction by a predetermined gesture operation on the touch panel.

Here, in this embodiment, as the predetermined gesture operation for selecting a desired update information display card and shifting to the first pivot display state, the same touch operation as in the case of a shift from the idle state to the preview state described above is used. In addition, when a gesture operation of smear is additionally made while the touch gesture operation is being continued, that is, the touch gesture operation is combined with the smear gesture operation, the cellular phone terminal of this embodiment performs a display shift to the first pivot display state.

Moreover, in this embodiment, a predetermined gesture operation for switching display of a list of update information displayed in the first pivot display state to a list of update information of other contents, that is, shifting to the first pivot display state where a list of update information of other contents is displayed is, for example, a flick gesture operation. In addition, in this embodiment, when a gesture operation of, for example, tapping (clicking) a menu softkey for a content selection prepared in a pivot option area displayed on the screen in the first pivot display state is made, a jump can be made to the first pivot display state where a list of update information of contents associated with the softkey is displayed.

In the embodiment of the present invention, instead of the update information extracted based on the attribute-related information corresponding to the selected update information display card as described above, the update information displayed as a list in the pivot display state may be, for example, update information of content data corresponding to different attribute-related information, that are extracted based on attribute-related information of content data corresponding to update information displayed in the pivot display state at a certain time point.

Specifically, in a case where update information displayed in the pivot display state at a certain time point is update information of a music content, for example, as one piece of attribute-related information of the music content, information indicating a musical genre to which the music content belongs can be exemplified. Therefore, in this example, as update information of contents corresponding to different attribute-related information, that are extracted based on attribute-related information of content data corresponding to the update information displayed in the pivot display state at the certain time point, update information on a music content, album content, or the like of a different artist belonging to that musical genre can be exemplified.

It should be noted that in this embodiment, the pivot display state in which display is switched to a list of update information of contents corresponding to different attribute-related information, that are extracted based on attribute-related information of content data displayed in the pivot display state at a certain time point as described above will be referred to as second pivot display state.

Moreover, in the cellular phone terminal of this embodiment, a shift to the second pivot display state as described above is executed when a user inputs a pivoting instruction by a predetermined gesture operation on the touch panel.

Here, in this embodiment, as the predetermined gesture operation for shifting to the second pivot display state for displaying, based on attribute-related information of content data corresponding to update information displayed in the pivot display state at a certain time point, a list of update information of content data corresponding to different attribute-related information as described above, a flick gesture operation can be exemplified.

Figure 12:
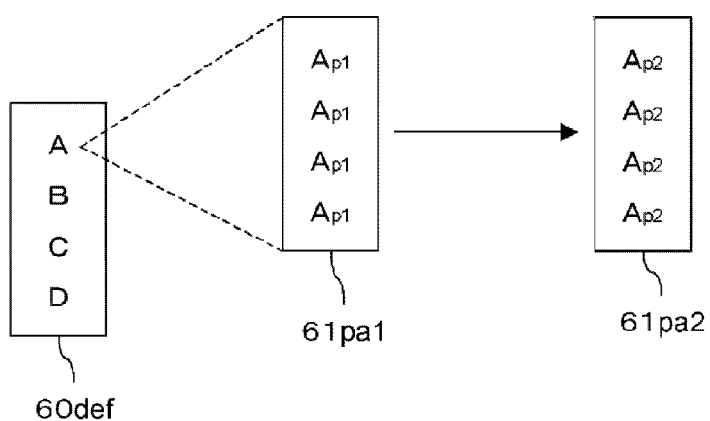
FIG. 12 A diagram used for explaining a shift from the default display state to a first pivot display state.
Figure 13:
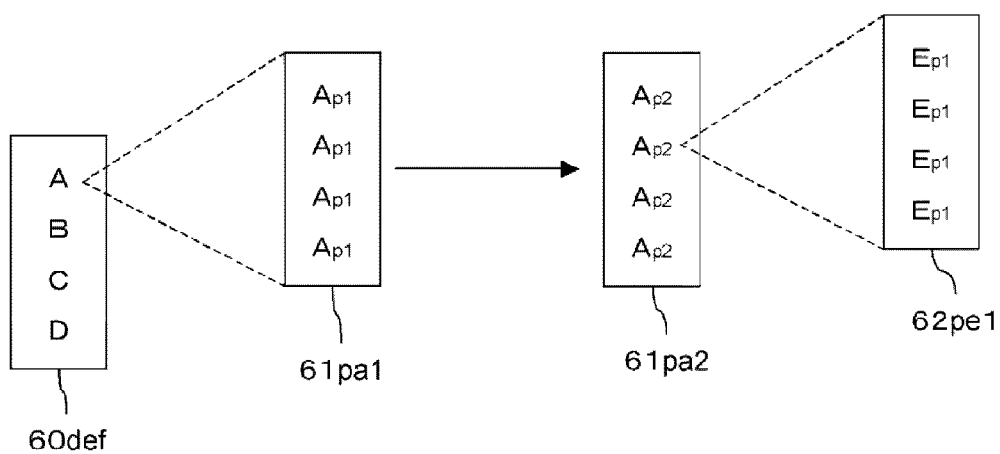
FIG. 13 A diagram used for explaining a shift from the default display state to the first pivot display state and a shift from the first pivot display state to a second pivot display state.

FIGS. 12 and 13 schematically show examples of a shift to the first pivot display state (FIGS. 12 and 13) and a shift from the first pivot display state to the second pivot display state (FIG. 13).

FIG. 12 shows a first pivot display state 61*pa*1 to which a shift has been made by selecting a desired update information display card from those in the default display state 60*def* and making a pivoting gesture operation, and a first pivot display state 61*pa*2 to which a shift has been made by additionally making a pivoting gesture operation for displaying different update information from the first pivot display state 61*pa*1.

It should be noted that "A, B, C, D" described in the default display state 60*def* in FIG. 12 represent update information display cards corresponding to different types of content data. Further, "Ap1, Ap1, Ap1, Ap1" described in the first pivot display state 61*pa*1 in FIG. 12 represent update information of the same type of contents extracted based on attribute-related information of a content of the update information display card selected in the default display state 60*def* (e.g., A). Moreover, "Ap2, Ap2, Ap2, Ap2" described in the first pivot display state 61*pa*2 in FIG. 12 represent update information of contents different in type from the contents (Ap1, Ap1, Ap1, Ap1), that are extracted based on the attribute-related information of the content of the update information display card (A) selected in the default display state 60*def*.

FIG. 13 shows the same first pivot display state 61*pa*1 and first pivot display state 61*pa*2 as in the example of FIG. 12 and a second pivot display state 62*pe*1 shifted from the first pivot display state 61*pa*2.

It should be noted that "Ep1, Ep1, Ep1, Ep1" described in the second pivot display state 62*pe*1 in FIG. 13 represent update information of contents corresponding to different attribute-related information, that are extracted based on attribute-related information of a content in the first pivot display state 61*pa*2.

(Example of User Interface Screen)

FIGS. 14 to 28 each show a specific example of a user interface screen on which update information display cards as described above are displayed in the cellular phone terminal of this embodiment. It should be noted that in the following figures, the different types of contents corresponding to the update information display cards 51 are represented by "A, B, C, . . . ". In other words, "A, A, A, . . . ", "B, B, B, . . . ", and the like each represent the same type of contents.

(Scroll of Update Information Display Cards)

Figure 14:
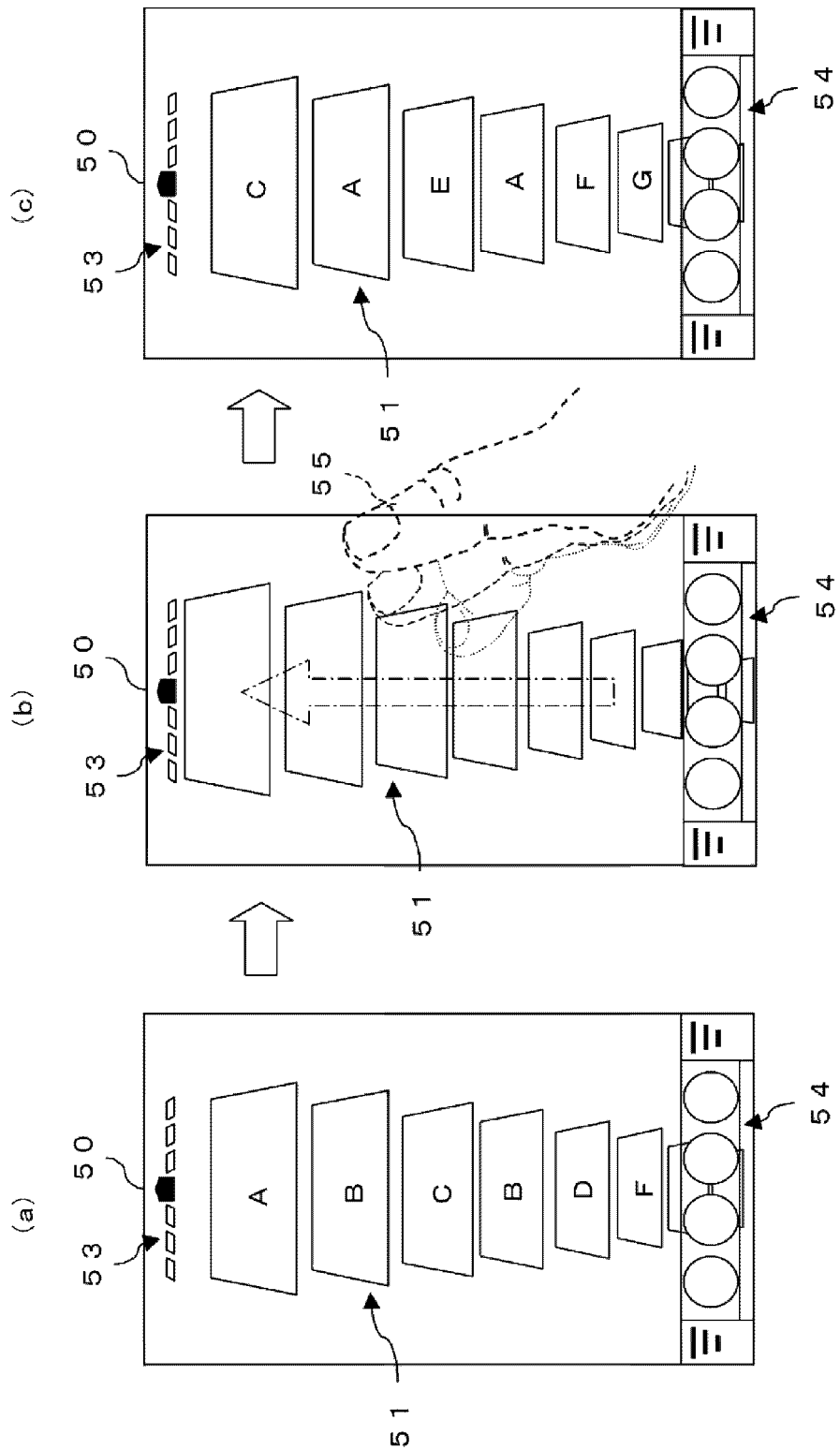
FIG. 14 Diagrams showing a shift example of the user interface screen in a case where the update information display cards displayed on a display screen are scrolled.

FIG. 14 show an example of the user interface screen in a case where the update information display cards 51 displayed on a display screen 50 are scrolled.

FIG. 14(*a*) shows an example of the display screen 50 in the default display state.

When a user performs a gesture operation of flicking up a finger 55 upwardly in the figure as indicated by an arrow in a dashed line in FIG. 14(*b*) on a touch panel provided on the display screen 50, for example, the cellular phone terminal of this embodiment controls display so as to scroll the update information display cards 51 displayed on the display screen 50 upwardly in the figure.

Accordingly, the update information display cards 51 displayed on the display screen 50 before the flick-up gesture operation is made (FIG. 14(*a*)) move out of the screen from an upper portion of the screen in a reverse chronological order, and update information display cards 51 earlier in time series than the update information display cards 51 that have been displayed before the flick-up gesture operation is made are sequentially displayed on the display screen 50 from the lower portion of the screen (FIG. 14(*c*)).

It should be noted that when an update information display card 51 earliest in time series is displayed on the display screen 50, scroll display in the upward direction on the screen may be stopped thereafter or a latest update information display card and update information display cards after that may be scrolled subsequent to the update information display card earliest in time series.

On the other hand, though not shown in the figures, in a case where there are update information display cards that are later in time series than the update information display cards 51 displayed on the display screen 50, at a time a gesture operation of flicking down the finger 55 downwardly on the screen on the touch panel is made, for example, the cellular phone terminal of this embodiment controls display so as to scroll the update information display cards 51 displayed on the display screen 50 downwardly on the screen.

Accordingly, the update information display cards 51 that have been displayed on the display screen 50 before the flick-down gesture operation is made sequentially move out of the screen from the lower portion in a chronological order, and update information display cards that are later in time series than the update information display cards 51 that have been displayed before the flick-down gesture operation is made are sequentially displayed on the display screen 50 from the upper portion of the screen.

It should be noted that similar to the case described above, when a latest update information display card 51 in time series is displayed on the display screen 50, slide display of the update information display cards in the downward direction on the screen may be stopped thereafter or an update information display card that is earliest in time series and update information display cards after that may be displayed in slides subsequent to the latest update information display card.

In addition, in a case where a next operation is not made after the flick-up or flick-down gesture operation is made, the cellular phone terminal of this embodiment controls display so as to stop the scroll after gradually speeding down the scroll.

(Idle State and Preview State of Update Information Display Cards)

Figure 15:
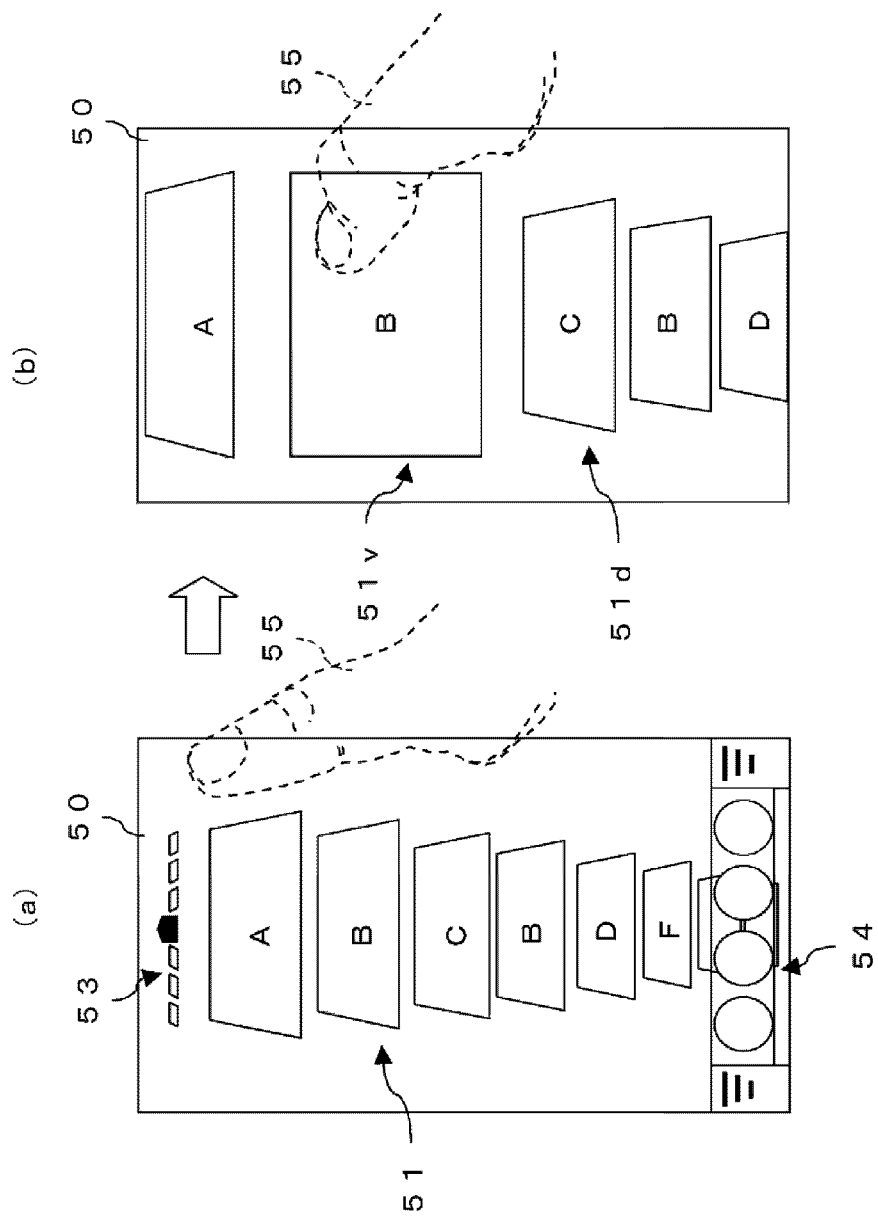
FIG. 15 Diagrams showing a screen shift example from a display state where the update information display cards displayed on the display screen are all in the idle state to that where any one of the update information display cards is selected and brought to the preview state.

Next, FIG. 15 show a display example in a case where the update information display cards 51 on the display screen 50 are all in the idle state (FIG. 15(*a*)) and a display example in a case where any one of those update information display cards is touched and selected with the finger 55 of the user to enter the preview state (FIG. 15(*b*)).

As shown in FIG. 15(*a*), in a case where all the update information display cards 51 are in the idle state, in addition to the update information display cards 51*d* in the idle state, a page designation icon 53, an application shortcut bar 54, and the like are displayed on the display screen 50. It should be noted that although details will be described later, the page designation icon 53 is an icon used for displaying on the display screen 50 a desired page that the user has designated. Moreover, the application shortcut bar 54 is an area to which shortcut softkeys for activating applications that are used frequently or applications set by a user among application programs mounted on the cellular phone terminal of this embodiment are allocated. When any one of the shortcut softkeys of the application shortcut bar 54 is tapped, the cellular phone terminal of this embodiment activates an application program associated with that softkey.

In a case where the update information display cards 51 in the idle state are displayed on the display screen 50 as shown in FIG. 15(*a*), at a time the user performs, with the finger 55, a gesture operation of touching a detection area corresponding to a display area of a desired update information display card 51 out of the detection area on the touch panel, the cellular phone terminal of this embodiment controls display so as to switch the update information display card 51 corresponding to the detection area on which the touch gesture operation has been made to the update information display card 51*v* in the preview state as shown in FIG. 15(*b*).

It should be noted that although the page designation icon 53 and the application shortcut bar 54 are hidden when any one of the update information display cards 51 is in the preview state in the example of FIG. 15(*b*), it is of course possible to leave the page designation icon 53 and the application shortcut bar 54 displayed.

(Application Activation by Selection of Update Information Display Card)

Figure 16:
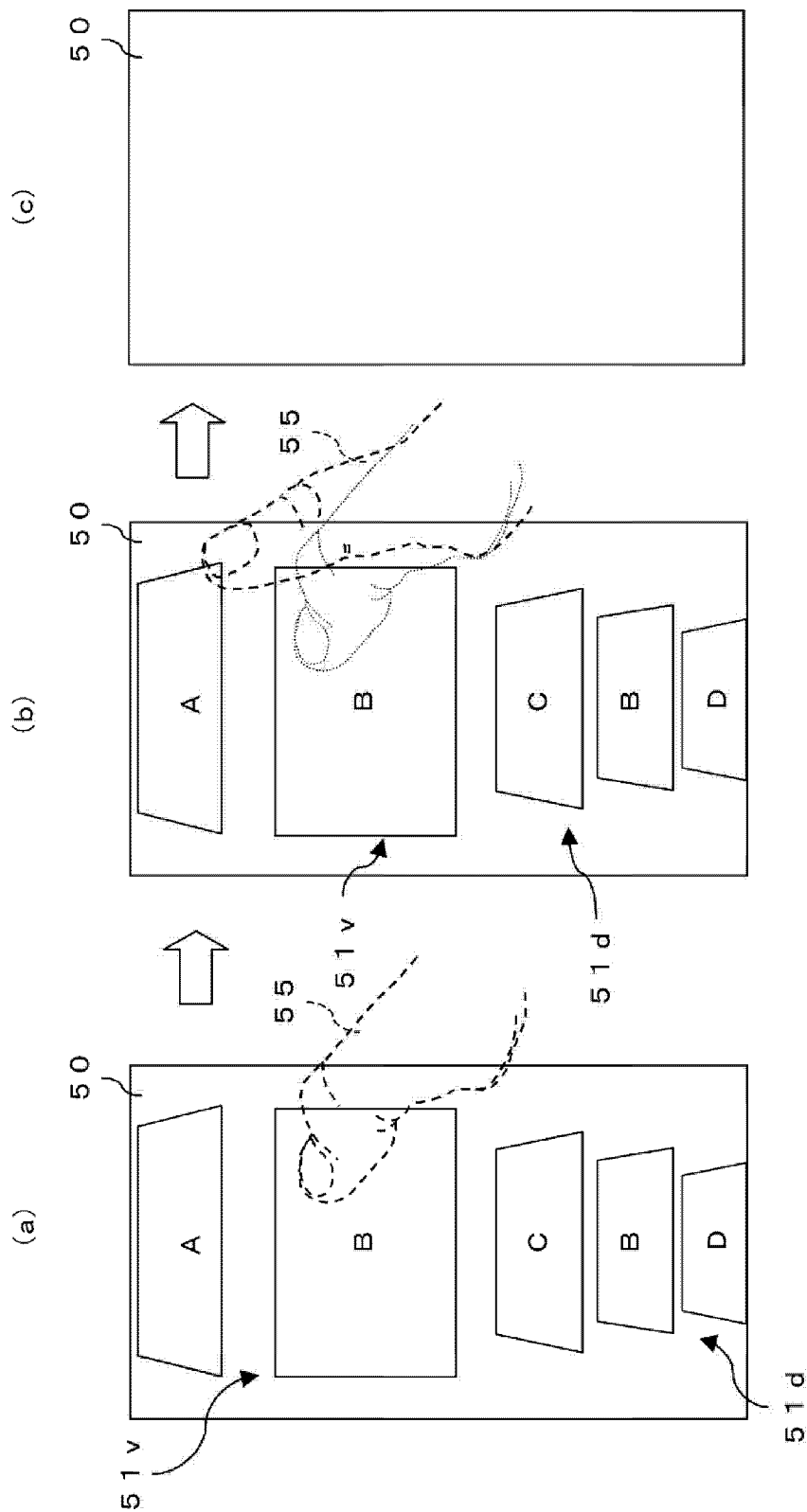
FIG. 16 Diagrams showing a screen shift example in a case where, after a desired update information display card is selected from the update information display cards displayed on the display screen and brought to the preview state, an application program corresponding to a content of that update information display card is activated.
Figure 17:
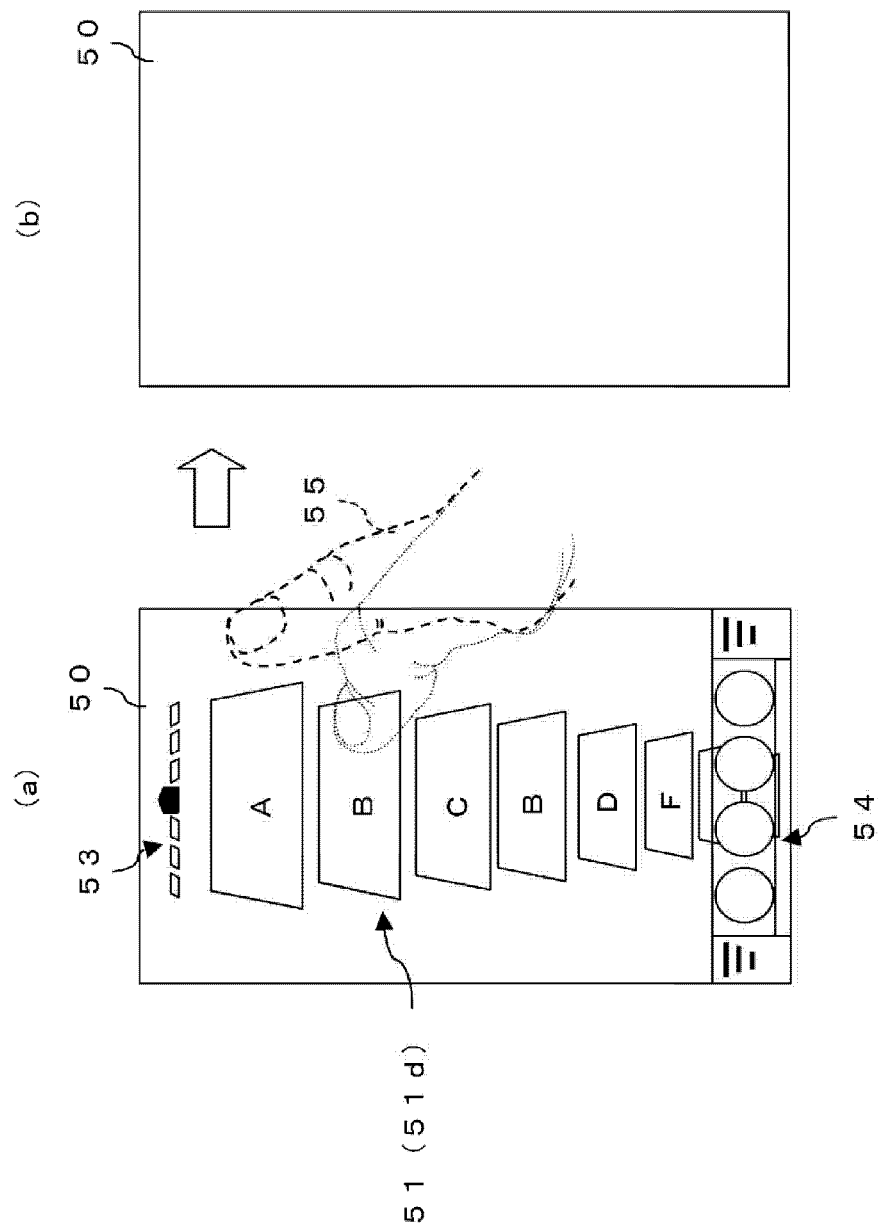
FIG. 17 Diagrams showing a screen shift example in a case where an application program is activated immediately from the update information display cards in the idle state.

Next, FIGS. 16 and 17 each show a display example in a case where an application program corresponding to a content of a selected update information display card 51 is activated.

FIG. 16 show a display example in a case where, after a desired update information display card 51 is selected from the update information display cards 51 on the display screen 50 and brought into the preview state, an application program corresponding to a content of the update information display card in the preview state is activated.

In the example of FIG. 16, when a desired update information display card is touched by the finger 55 of the user as shown in FIG. 16(*a*), the cellular phone terminal of this embodiment sets the update information display card to the preview state as described above.

Next, when the update information display card 51*v* is tapped with the finger 55 of the user within a certain time period during which the preview state of the update information display card 51*v* is maintained after a temporary release of the finger 55 of the user as shown in FIG. 16(*b*), the cellular phone terminal of this embodiment activates an application program corresponding to a content of that update information display card 51.

As a result, the display screen 50 shifts to a screen of the activated application program as shown in FIG. 16(c).

FIG. 17 show a display example in a case where, by the user performing a tap gesture operation on a desired update information display card 51d out of the update information display cards 51d in the idle state, an application program is activated immediately without undergoing the preview state as described above.

In the example of FIG. 17, when a desired update information display card is tapped with the finger 55 of the user out of the update information display cards 51d in the idle state as shown in FIG. 17(a), the cellular phone terminal of this embodiment immediately activates an application program corresponding to a content of that update information display card.

Consequently, the display screen 50 shifts to a screen of the activated application program as shown in FIG. 17(b).

(Pivot Display State)

Figure 18:
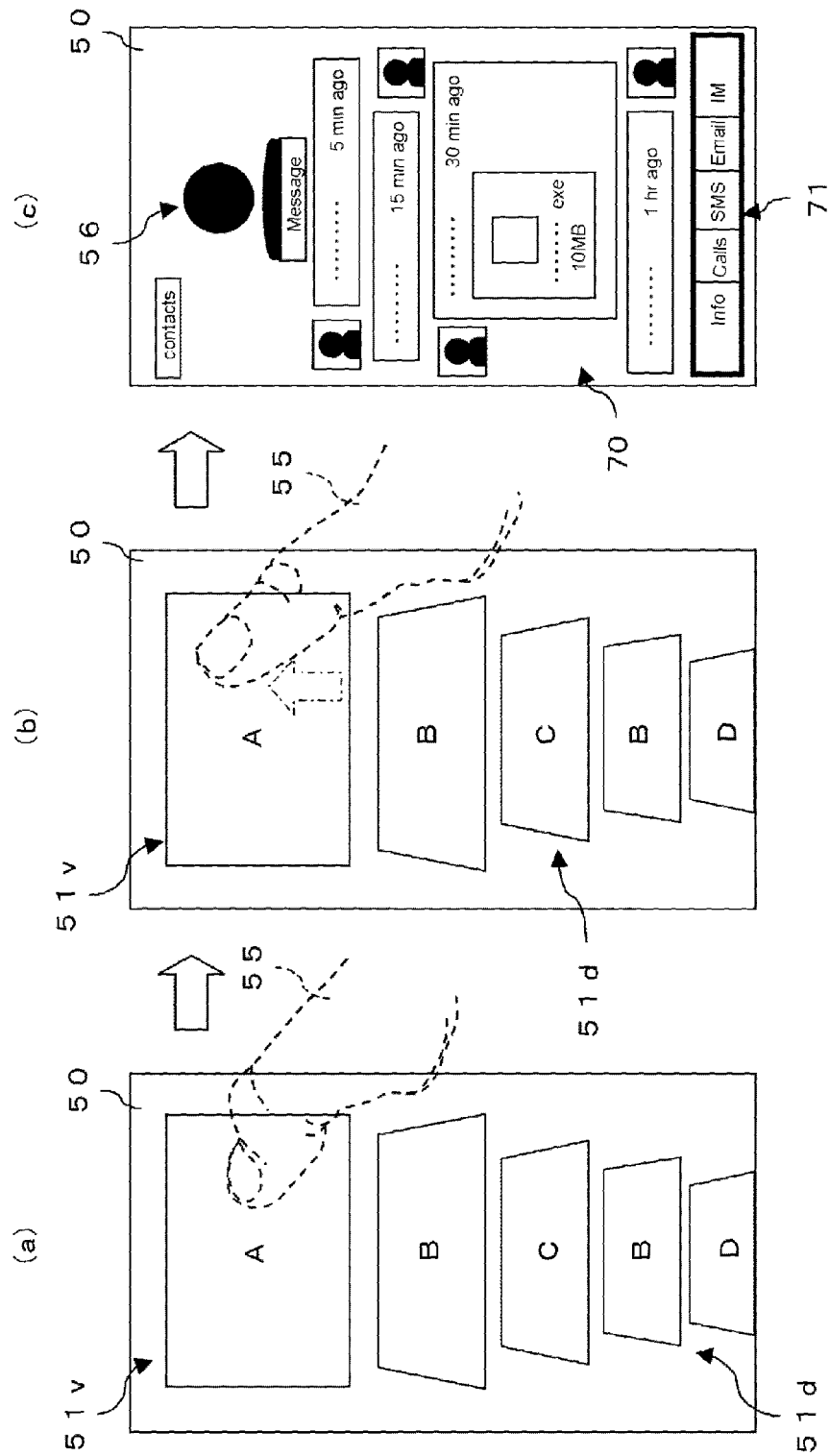
FIG. 18 Diagrams showing a screen shift example to a pivot display state by a selection of an update information display card and a switch to update information of a different content related to a content of the selected update information display card.
Figure 19:
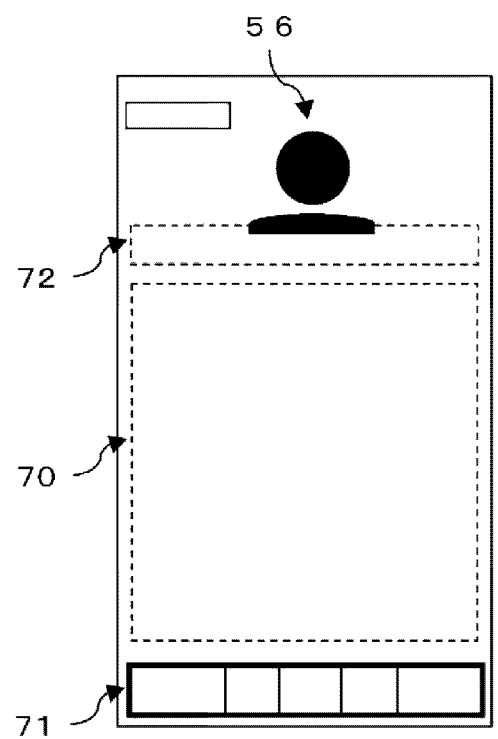
FIG. 19 A diagram used for explaining a content area, an option area, an action softkey area, and the like arranged on the display screen in the pivot display state.
Figure 20:
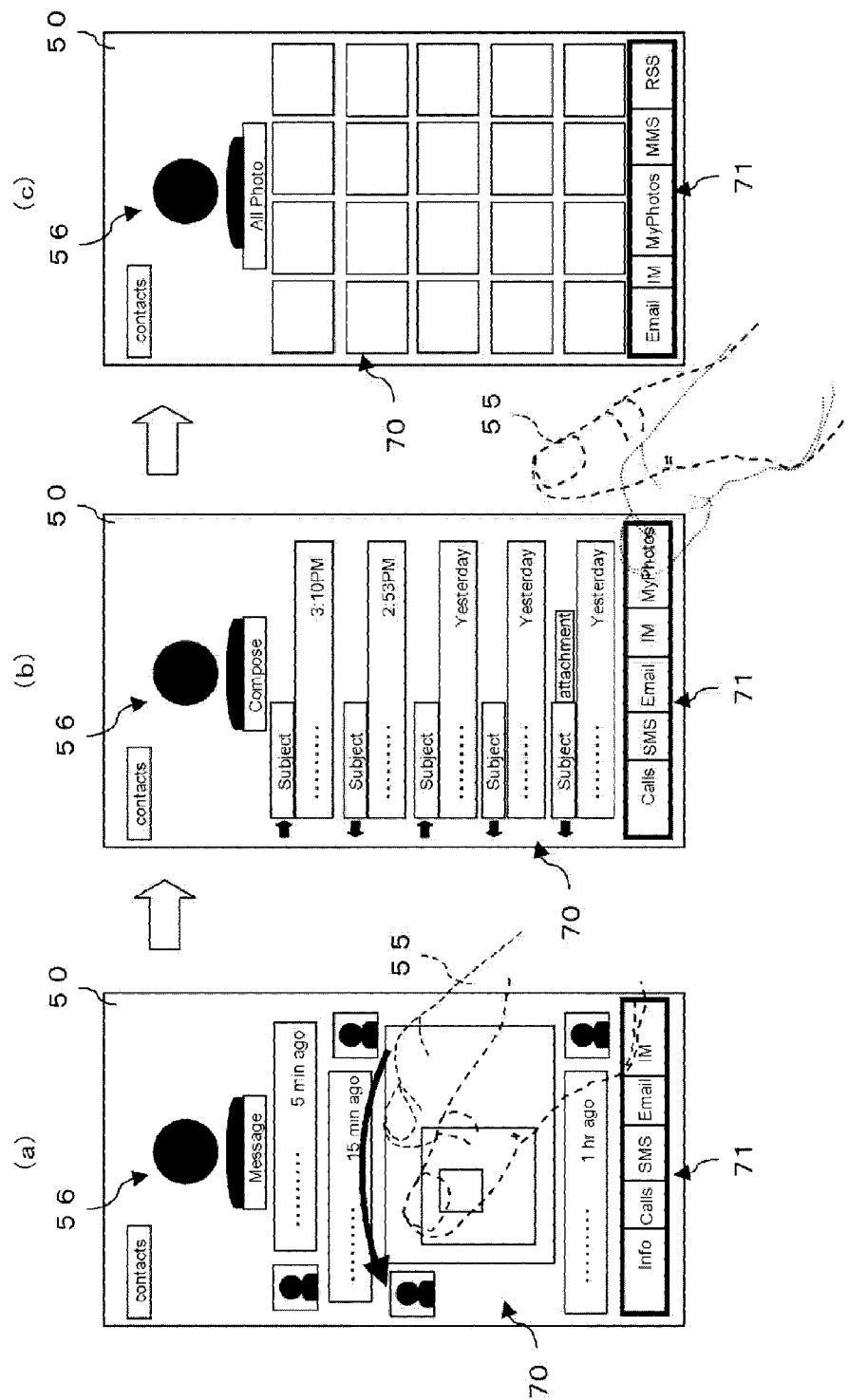
FIG. 20 Diagrams showing an example of making switches among a pivot display state where SMS/MMS contents are displayed, a pivot display state where e-mail contents are displayed, and a pivot display state where photographic image contents are displayed, as an example of switch display of the pivot display states.

Next, FIGS. 18 to 20 each show a display example in a pivot display state where a list of update information of contents related to a selected update information display card is displayed.

First, when a user touches a desired update information display card 51 in a case where the update information display cards 51 are displayed on the display screen 50, the cellular phone terminal of this embodiment sets the update information display card in the preview state as shown in FIG. 18(a).

Then, when the user performs a smear gesture operation with the finger 55 as shown in FIG. 18(b) while maintaining the touch of the update information display card 51v in the preview state, the cellular phone terminal of this embodiment causes a shift to a pivot display state where a list of update information extracted based on attribute-related information of a content of the selected update information display card is displayed as shown in FIG. 18(c).

It should be noted that the example of FIG. 18(c) shows the pivot display state where, due to a selection of an update information display card corresponding to an SMS message content exchanged with a certain party out of the update information display cards 51 shown in FIGS. 18(a) and 18(b), update information of contents extracted based on attribute-related information of the content of that update information display card, that is, update information of a plurality of message contents transmitted and received to/from the SMS message party are sequentially displayed as a list.

Here, in this embodiment, in the pivot display state, a content area 70, a pivot option area 71, and an action softkey area 72 are prepared on the display screen as shown in FIG. 19, for example. Displayed in the content area 70 as a time-series list are update information of contents displayed in the pivot display state, for example. Displayed in the action softkey area 72 are various softkeys corresponding to the types of contents of the update information displayed in the pivot display state. In the pivot option area 71, while menu softkeys respectively corresponding to the content types are arranged, a menu softkey corresponding to the content type of update information displayed in the pivot display state is arranged at the center thereof. Moreover, in the pivot display state, when there is image information such as a photographic image of a communication party and a jacket image of a purchased music album as attribute-related information of contents corresponding to the displayed update information, for example, image information 56 thereof is also arranged.

Hereinafter, several specific examples of information displayed on the display screen in the pivot display state will be described.

For example, in a case where an update information list of phone number incoming/outgoing call histories is displayed in the pivot display state, as incoming/outgoing call logs, a time-series list of update information constituted of phone numbers in incoming and outgoing calls, presence/absence of a missed call, and time information thereof is displayed in the content area 70. Further, in this case, a toggle button for selecting whether to display all the incoming/outgoing call histories or only the histories of missed calls is displayed in the action softkey area 72.

In a case where an SMS/MMS update information list is displayed in the pivot display state, as SMS/MMS histories, a time-series list of update information constituted of an SMS/MMS message, time information, and, when there is an image of a party, a thumbnail image of that image is displayed in the content area 70. Further, in this case, a softkey for activating an SMS application program for creating a message to be sent to an SMS/MMS destination phone number is displayed in the action softkey area 72.

In a case where an e-mail update information list is displayed in the pivot display state, as e-mail histories, a time-series list of update information constituted of a title of an e-mail, the first one or two rows of a mail text, sent/received time information, an icon indicating which of a sent mail and a received mail the e-mail is, and, when there is appended data, an icon indicating the appendage is displayed in the content area 70. Further, in this case, a softkey for activating an e-mail application program for creating a text message of an e-mail to be sent is displayed in the action softkey area 72.

In a case where an IM (Instant Messaging) update information list is displayed in the pivot display state, a time-series list of update information constituted of an IM message, date and time information thereof, and, when there is an image of a party, a thumbnail image of that image is displayed in the content area 70. Further, in this case, a softkey for activating an IM application program for creating an IM message is displayed in the action softkey area 72.

In a case where a photographic image update information list is displayed in the pivot display state, a time-series list of update information constituted of a thumbnail image of a photograph containing, for example, a face image tagged with contact information, and the like is displayed in the content area 70. Further, in this case, a softkey for shifting to a photograph list tagged with other contact information, for example, is displayed in the action softkey area 72.

In a case where an update information list of images such as photographs stored on a network or photographs prepared additionally is displayed in the pivot display state, a time-series list of update information constituted of a thumbnail image of a photograph stored on the network or prepared additionally, and the like is displayed in the content area 70. Further, in this case, a softkey for accessing a photographic image stored on the network, for example, is displayed in the action softkey area 72.

In a case where an SNS update information list is displayed in the pivot display state, a time-series list of update information constituted of updated information of an SNS diary, a message, and the like is displayed in the content area 70. Further, when there is an image related to an SNS participant, a thumbnail image of that image is also displayed on the list. Furthermore, in this case, a softkey for accessing SNS is displayed in the action softkey area 72.

In a case where a posting site update information list is displayed in the pivot display state, a time-series list of update information constituted of update information of a posted message, and the like is displayed in the content area 70. Further, in this case, a softkey for accessing the posting site for posting or editing a message is displayed in the action softkey area 72.

In a case where an update information list of news contents from RSS (RDF (Resource Description Framework) Site Summary) is displayed in the pivot display state, a time-series list of update information constituted of RSS news headline information and the like is displayed in the content area 70. Further, in this case, a softkey for accessing RSS is displayed in the action softkey area 72.

FIG. 20 show an example of making switches among a pivot display state where an update information list of SMS/MMS contents is displayed (FIG. 20(*a*)), a pivot display state where an update information list of e-mail contents is displayed (FIG. 20(*b*)), and a pivot display state where an update information list of photographic image contents is displayed (FIG. 20(*c*)), among the pivot display states exemplified as described above by gesture operations made by a user.

Specifically, in the example of FIG. 20, in the pivot display state where the update information list of SMS/MMS contents is displayed, an update information list including an SMS/MMS message, time information thereof, a thumbnail image of a party, and the like is displayed in the content area 70 as shown in FIG. 20(*a*). Also at this time, a menu softkey for an SMS content selection is arranged at the center of the pivot option area 71.

When the user performs a flick-left gesture operation using the finger 55 in the pivot display state shown in FIG. 20(*a*), for example, the pivot display state shifts to a state where an update information list of e-mail contents is displayed. In other words, in the example of FIG. 20, as can be seen from the alignment of content selection menu softkeys in the pivot option area 71, a pivot display state for displaying an update information list of e-mail contents is prepared on the right-hand side (virtual right-hand side) of the pivot display state for displaying the update information list of SMS contents. Therefore, when a flick-left gesture operation is made in the pivot display state for displaying the update information list of SMS contents, the cellular phone terminal of this embodiment shifts the display to the state where the update information list of e-mail contents is displayed.

In the pivot display state for e-mails shown in FIG. 20(*b*), an update information list including a title of an e-mail, a first one or two rows of a mail text, sent/received time information, an icon indicating which of a sent mail and a received mail the e-mail is, and, when there is appended data, an icon indicating the appendage is displayed in the content area 70.

In addition, when the user taps and selects a content selection menu softkey for photographic images from the pivot option area 71 with the finger 55 in the pivot display state shown in FIG. 20(*b*), for example, the cellular phone terminal of this embodiment jumps to the pivot display state for displaying an update information list of photographic image contents associated with the softkey as shown in FIG. 20(*c*).

In the pivot display state for photographic images shown in FIG. 20(*c*), an update information list of thumbnail images of photographs taken by a built-in camera and the like is displayed in the content area 70.

(Display During Filtering)

Figure 21:
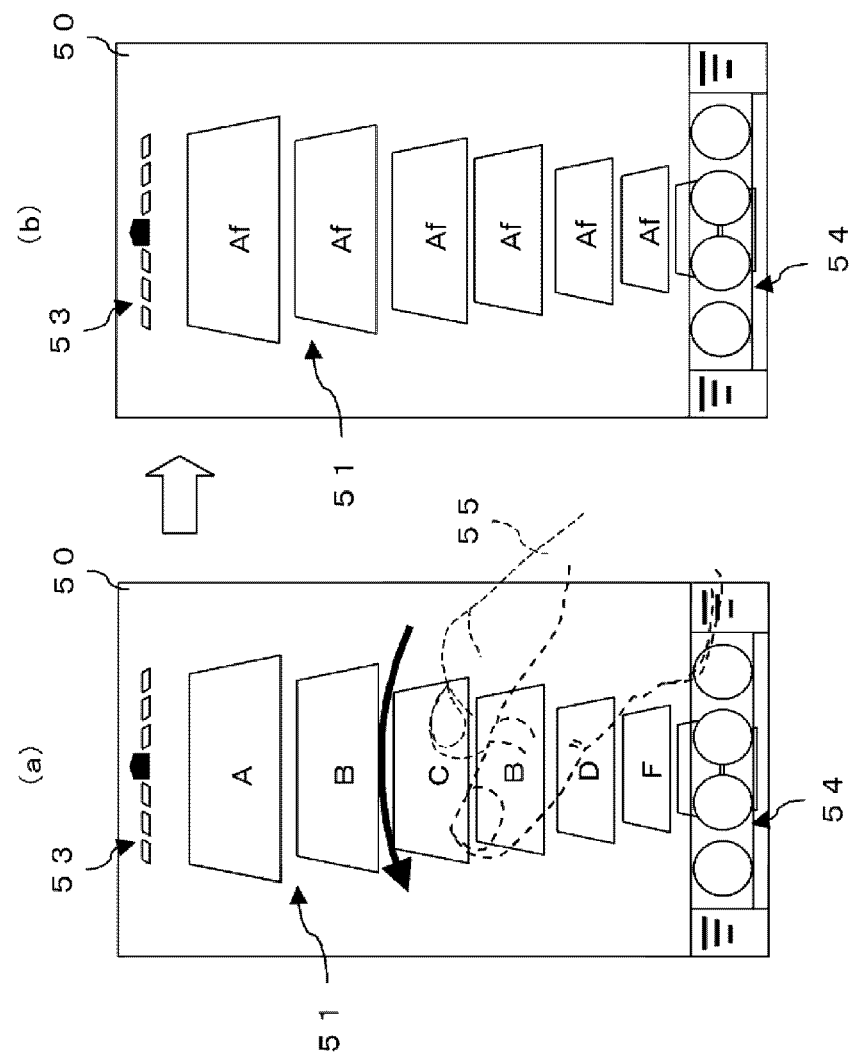
FIG. 21 Diagrams showing an example in which display shifts from the default display state to the post-filter display state by filtering processing.

FIG. 21 show a display example of a shift from a default display state (FIG. 21(*a*)) to a post-filter display state (FIG. 21(*b*)) by the filtering processing.

When a user performs a flick-left gesture operation while update information display cards corresponding to a plurality of different types of contents are displayed as in the default display state shown in FIG. 21(*a*), for example, the cellular phone terminal of this embodiment shifts the display of the display screen 50 to the post-filter display state as shown in FIG. 21(*b*).

In other words, in the example of FIG. 21, by the flick-left gesture operation in the default display state shown in FIG. 21(*a*), update information display cards 51 corresponding to the same type of contents (e.g., "Af, Af, . . . ") that are to be displayed after the default display state by the filtering are displayed.

(Example of Switching Contents by Filtering)

Figure 22:
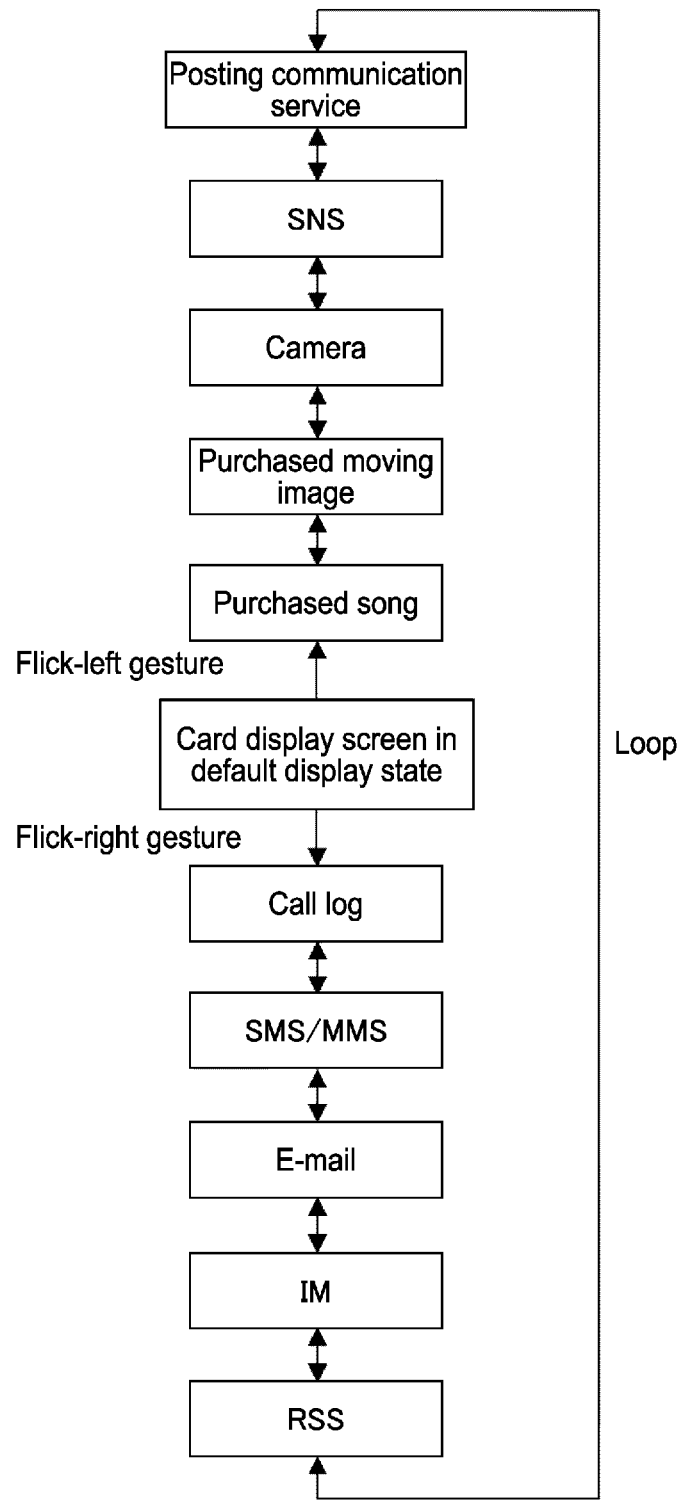
FIG. 22 A diagram for explaining a flow of switch display of contents according to gesture operations in filtering.

FIG. 22 shows an example of contents that are switched in accordance with gesture operations for the filtering.

As shown in FIG. 22, in a case where a flick-right gesture operation is repeated from a state where the update information display cards are displayed in the default display state, for example, display of the update information display cards on the display screen is sequentially switched to that corresponding to contents of call logs, SMS/MMS, e-mails, IM, and RSS in the stated order set in advance, for example. On the other hand, when a flick-left gesture operation is repeated from the default display state, for example, display of the update information display cards on the display screen is sequentially switched to that corresponding to contents of purchased songs, purchased moving images, photographs taken by a camera, SNS, and posting communication service in the stated order set in advance, for example.

Moreover, in a case where a flick-right gesture operation is additionally made while update information display cards of RSS contents are displayed, for example, a shift is made to a state where update information display cards of posting communication service contents are displayed. On the other hand, when a flick-left gesture operation is additionally made while the update information display cards of posting communication service contents are displayed, for example, a shift is made to a state where the update information display cards of RSS contents are displayed.

(Paging Display)

Figure 23:
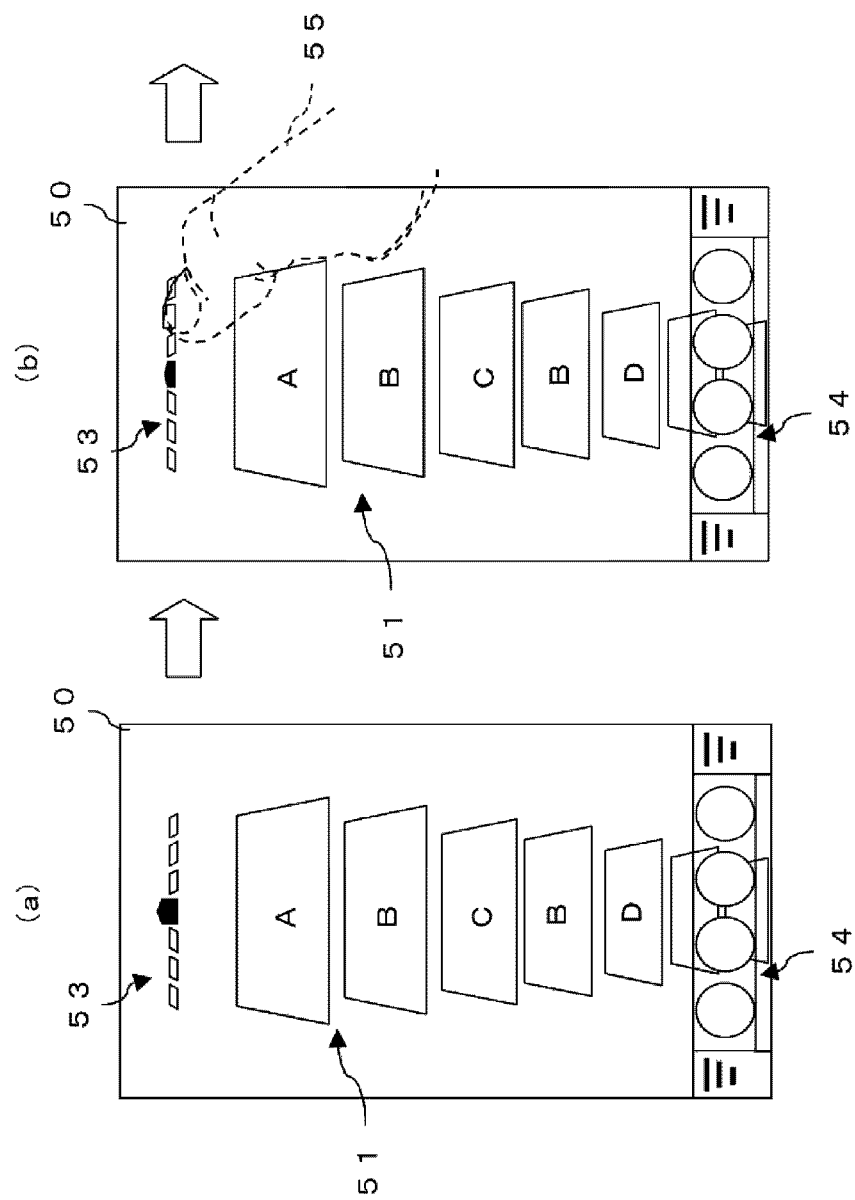
FIG. 23 Diagrams used for explaining a state where a page designation icon on the user interface screen in the default display state is selected with a finger.
Figure 24:
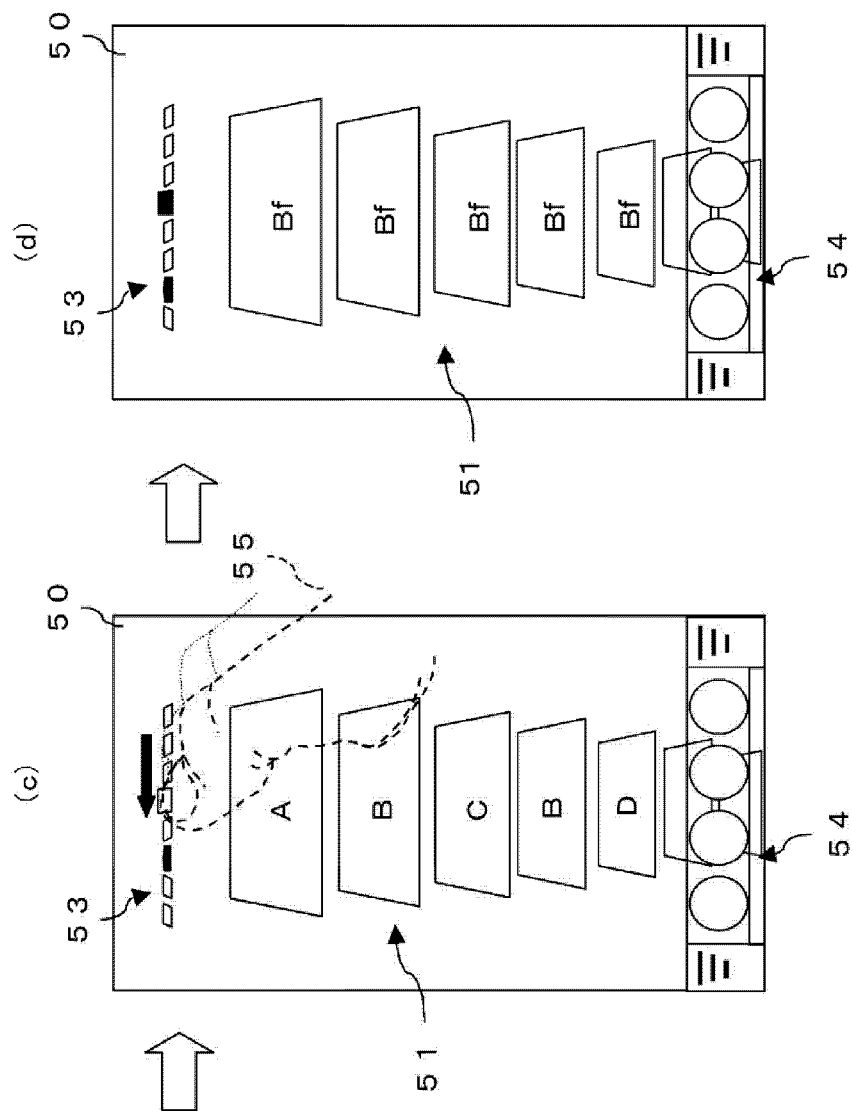
FIG. 24 Diagrams used for explaining a screen shift in a case where a desired icon is selected from a page designation icon and the selected icon is virtually moved to substantially the center portion of the page designation icon to thus perform a page jump.

FIGS. 23 and 24 show a display example in a case where the user interface screen on which the update information display cards are displayed is switched by a page designation.

As shown in FIG. 23(*a*), when all the update information display cards 51 are displayed in the idle state, the cellular phone terminal of this embodiment displays the page designation icon 53 at a predetermined position at an upper portion of the user interface screen. It should be noted that FIG. 23(*a*) shows a case where the display screen is in the default display state.

In the page designation icon 53, a plurality of icons are arranged in the lateral direction on the screen, for example. Specifically, the icons constituting the page designation icon 53 are arranged in accordance with an alignment of virtually-provided pages. Moreover, an icon at the center of the icons constituting the page designation icon 53 corresponds to a page currently displayed on the display screen. It should be noted that although, in the examples of FIGS. 23 and 24, the icons are provided three each on both sides of the center icon, that is, a total of seven icons are provided, the actual number of pages may match the number of icons or more pages than the number of icons may be prepared.

Here, when a predetermined gesture operation for switching a page is made by the user via the page designation icon 53, the cellular phone terminal of this embodiment carries out filtering processing to display update information display cards 51 of a content type corresponding to a page designated by the predetermined gesture operation.

Further, in this embodiment, as the predetermined gesture operation for switching a page, a press gesture operation of selecting a desired icon from the page designation icon 53, a drag gesture operation of virtually moving the selected icon to practically a center portion of the page designation icon 53, and a release gesture operation of releasing the moved icon at practically the center portion of the page designation icon 53 are used.

In other words, when the user selects a desired icon from the page designation icon 53 by a press gesture operation using the finger 55 as shown in FIG. 23(b), virtually moves the selected icon to practically the center portion of the page designation icon 53 by a drag gesture operation as shown in FIG. 24(c), and thereafter performs a release gesture operation, the cellular phone terminal of this embodiment shifts display of the display screen to a display screen of a page associated with the icon moved to the center portion by the drag as shown in FIG. 24(d).

It should be noted that as described above, in a case where the selected icon is virtually moved in accordance with the drag gesture operation, the cellular phone terminal of this embodiment controls display so as to sequentially move the other icons along with the movement of the selected icon.

Further, the other icons displayed on a side toward which the selected icon moves sequentially move out of the screen along with the movement of the icon, whereas, on a side opposite to the side toward which the selected icon moves, new additional icons are sequentially displayed along with the movement of the icon. It should be noted that when there are no more pages on the other side of the side toward which the selected icon moves, no new additional icon is displayed even when the selected icon is moved.

(Change of Display of Page Designation Icon)

Figure 25:
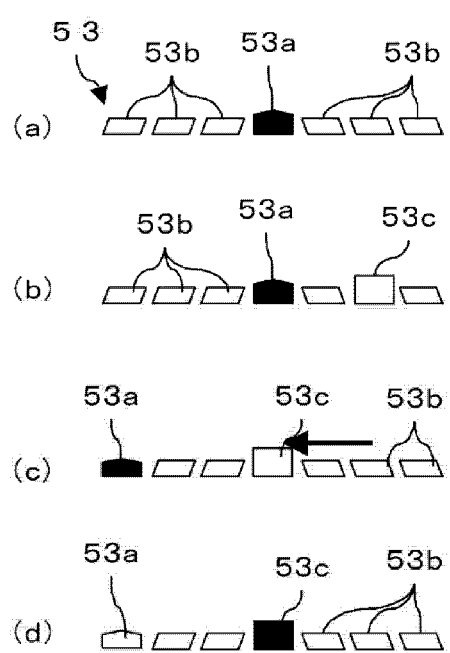
FIG. 25 Diagrams that each show an enlarged page designation icon and are used for explaining a state where a display state of the page designation icon changes according to gesture operations made by a user.

FIG. 25 each show a state where a display state of the page designation icon 53 changes in accordance with gesture operations made by the user.

In this embodiment, a display area of the page designation icon 53 and a detection area on the touch panel are associated with each other. When a detection area corresponding to the display area of the page designation icon 53 is touched by a finger or the like of the user (press gesture operation), the cellular phone terminal of this embodiment can judge which of the icons the user is indicating based on the detection area touched with the finger or the like.

As described above, the page designation icon 53 is prepared for indicating the user which of the pages is being displayed on the display screen. FIG. 25(a) shows the page designation icon 53 in a case where the display screen is in the default display state, and an icon corresponding to a page in the default display state (center icon 53a) out of the icons constituting the page designation icon 53 has a different shape, color, and the like from other icons 53b. In other words, in this embodiment, a shape, color, and the like of the icon 53a corresponding to the page in the default display state are differed from those of the other icons 53b for a page designation so as to enable the user to easily find a page in the default display state.

Here, when the user selects a desired icon out of the icons constituting the page designation icon 53 by a press gesture operation, the cellular phone terminal of this embodiment changes, for example, a shape of the selected icon to a shape different from that before as shown in FIG. 25(b). Accordingly, the user can easily grasp which icon, that is, which page is being selected.

In addition, as shown in FIG. 25(c), when a drag gesture operation to virtually move the selected icon to the center is made as shown in FIG. 25(c) and the icon is thereafter released at that position by a release gesture operation, the cellular phone terminal of this embodiment changes a shape, color, or the like of that icon from that before as shown in FIG. 25(d). Accordingly, the user can easily grasp that page jump processing executed by selecting and dragging the icon has ended. It should be noted that in this case, the display on the display screen shifts to a screen on which update information display cards of a content type prepared for a page associated with the icon moved to the center portion by the drag are displayed, as described above with reference to FIGS. 23 and 24.

(Deletion of Update Information Display Card)

Figure 26:
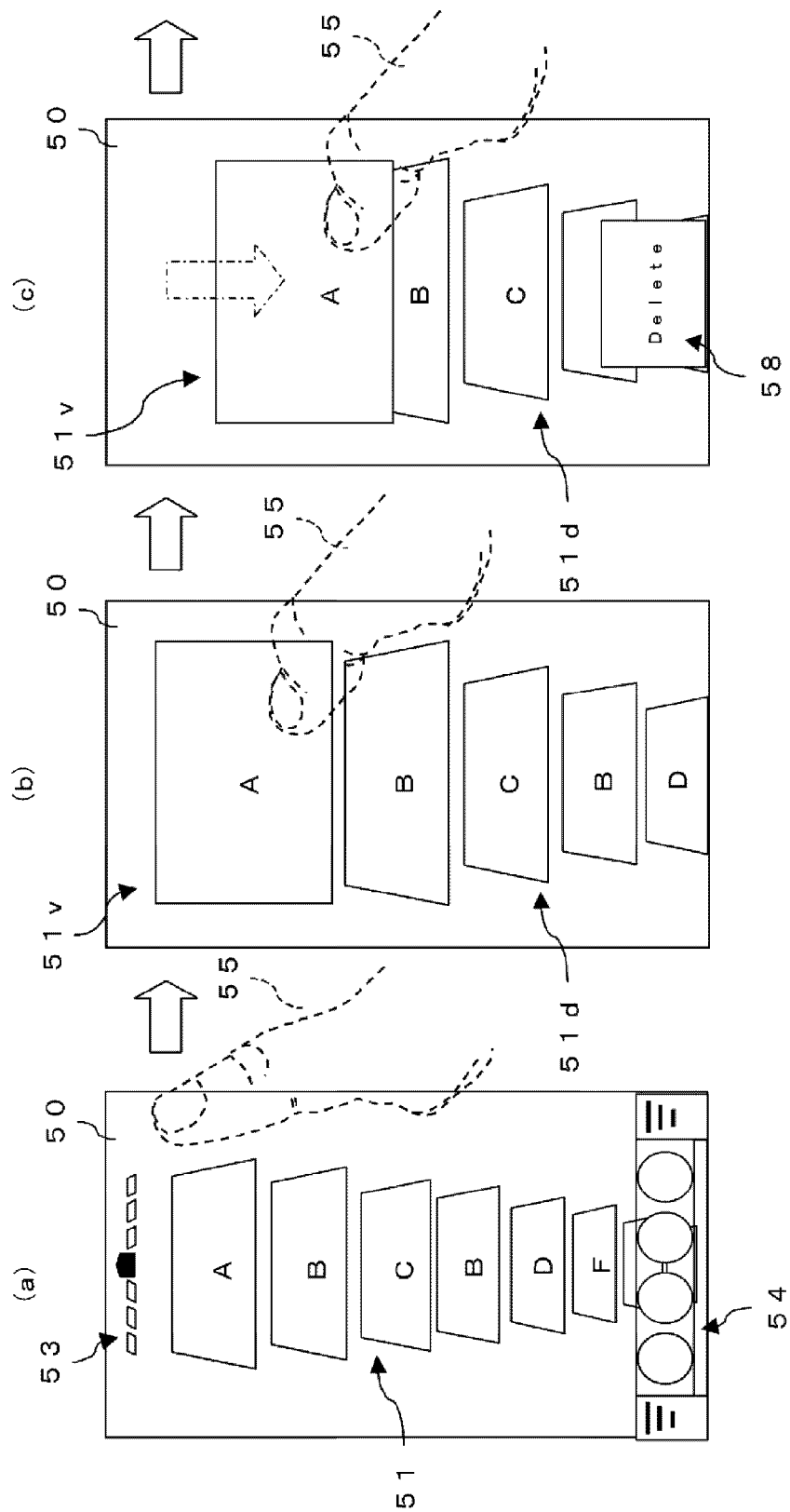
FIG. 26 Diagrams showing a screen shift example from a time a desired update information display card is selected from the update information display cards on the display screen to a time a delete icon is displayed.
Figure 27:
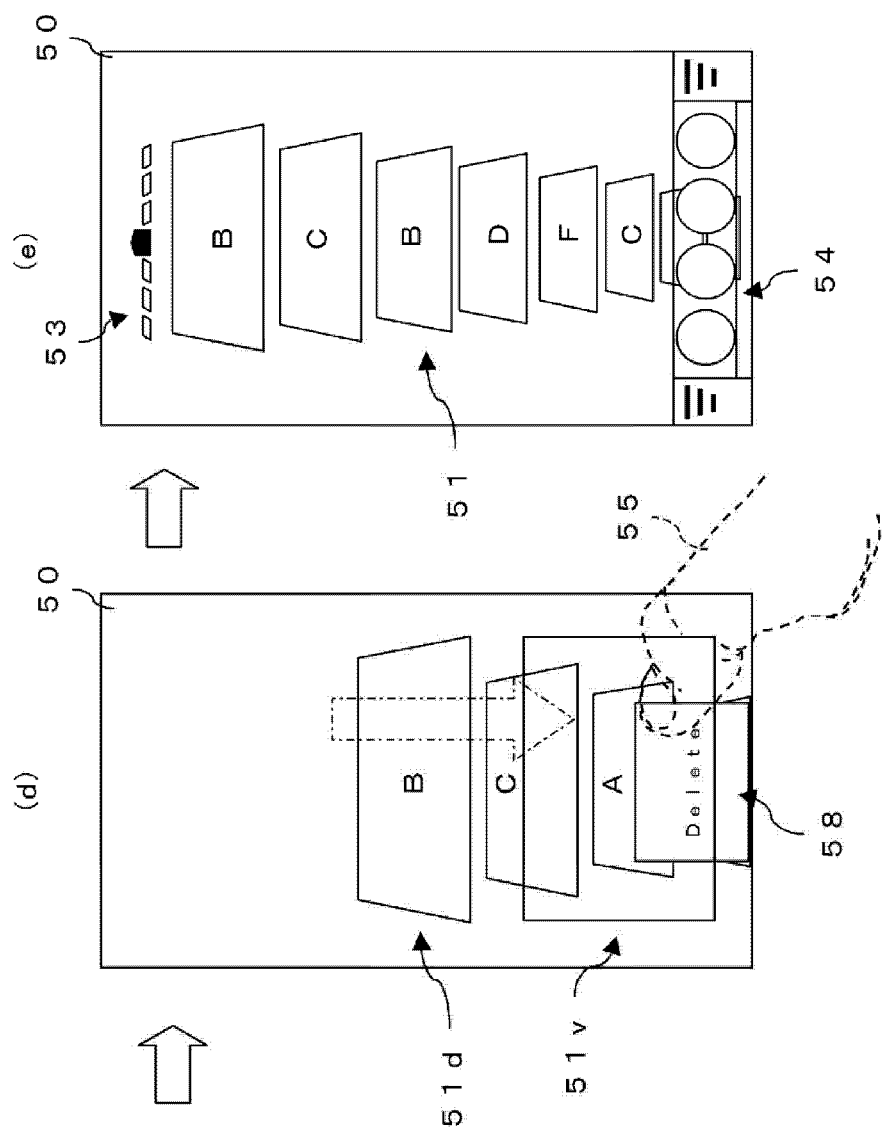
FIG. 27 Diagrams showing a screen shift example up to a time an update information display card is deleted by being moved to the delete icon.

FIGS. 26 and 27 show an example of the user interface screen in a case where a desired update information display card 51 is selected from the update information display cards 51 displayed on the display screen 50 to be deleted.

FIG. 26(a) shows an example of a screen on which all the update information display cards 51 are in the idle state.

Next, when the user performs a touch gesture operation on a desired update information display card 51 with the finger 55 as shown in FIG. 26(b), the update information display card 51 shifts to the preview state. Accordingly, it becomes possible for the user to recognize to which content the selected update information display card 51 relates.

Then, when a predetermined delete gesture operation is made while the touch is maintained, the cellular phone terminal of this embodiment displays a delete icon (so-called Recycle Bin icon) 58 on the display screen 50 as shown in FIG. 26(c).

It should be noted that in this embodiment, a gesture operation of dragging down the update information display card 51 downwardly on the screen while maintaining the touched state by the touch gesture operation is taken as an example of the delete gesture operation.

Moreover, at a time the delete icon 58 is displayed, for notifying the user that the dragged update information display card is a deletion target, it is desirable to display the card in a color different from those of other cards (e.g., with red card frame).

Furthermore, when a desired update information display card 51 is dragged down to the delete icon 58 displayed on the display screen 50 as shown in FIG. 27(d) and the user thereafter performs a release gesture operation, the cellular phone terminal of this embodiment deletes the desired update information display card 51 from the display screen and causes a shift to the display screen 50 on which the other remaining update information display cards 51 are realigned and displayed in the idle state as shown in FIG. 27(e).

As described above, according to this embodiment, when deleting an update information display card, the update information display card is first shifted from the idle state to the preview state and the delete icon 58 is displayed so as to enable the update information display card to be deleted. At this time, by displaying the update information display card distinctively from other cards, the user can confirm whether to delete the update information display card.

Further, in this embodiment, the update information display card can be deleted by a simple operation of dragging the update information display card in the preview state to the delete icon 58.

It should be noted that in this embodiment, only the update information display card displayed on the display screen 50 is deleted by the delete operation, and even when the update information display card is deleted, information on a content and the like corresponding to the update information display card remains without being deleted.

(Linking with Contact Information)

Figure 28:
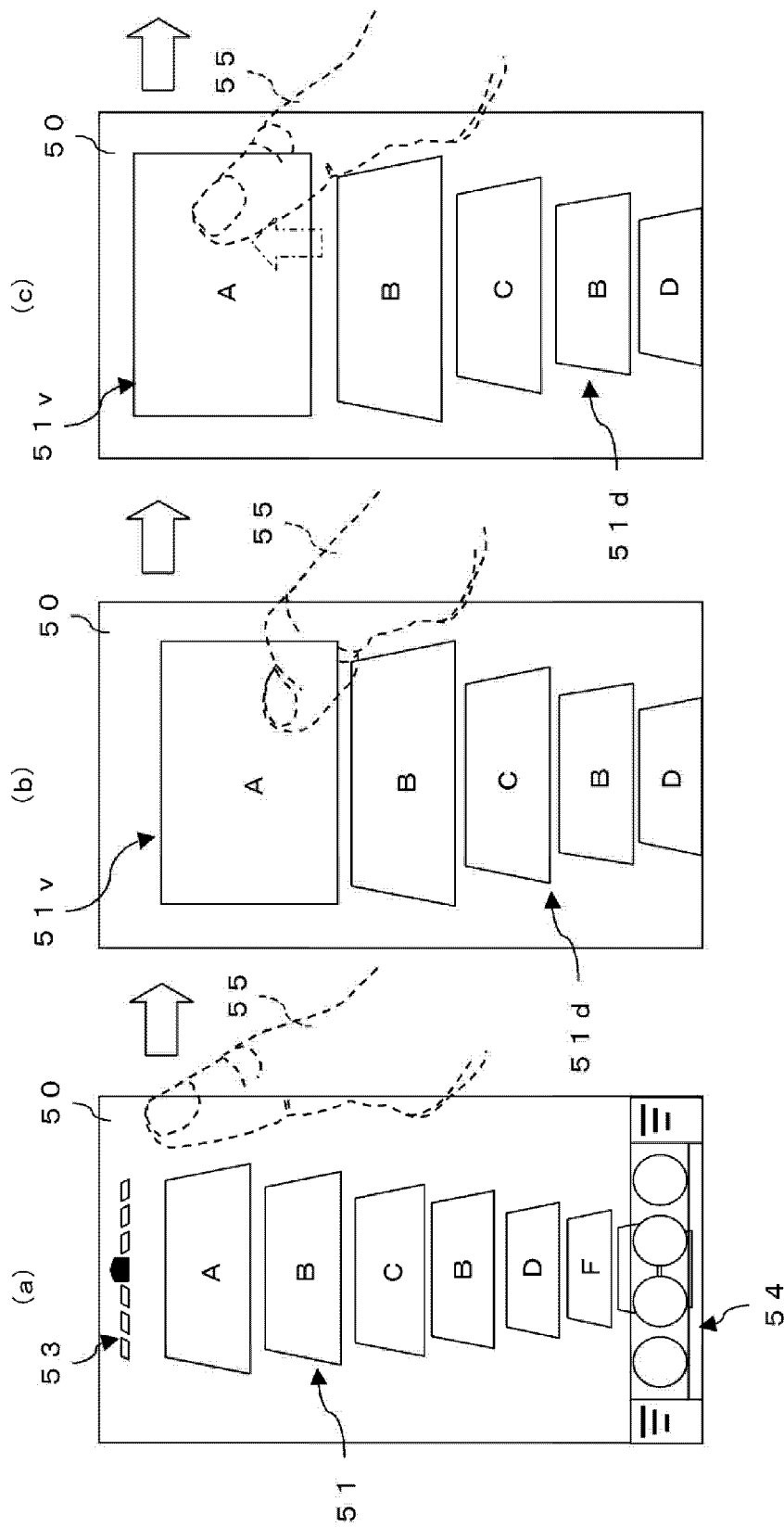
FIG. 28 Diagrams showing an example of the user interface screen at a time linking is performed in a case where content data of an update information display card is not linked with registered information of an address book and the like, in particular, a screen shift example up to a time an update information display card to be linked is selected.
Figure 29:
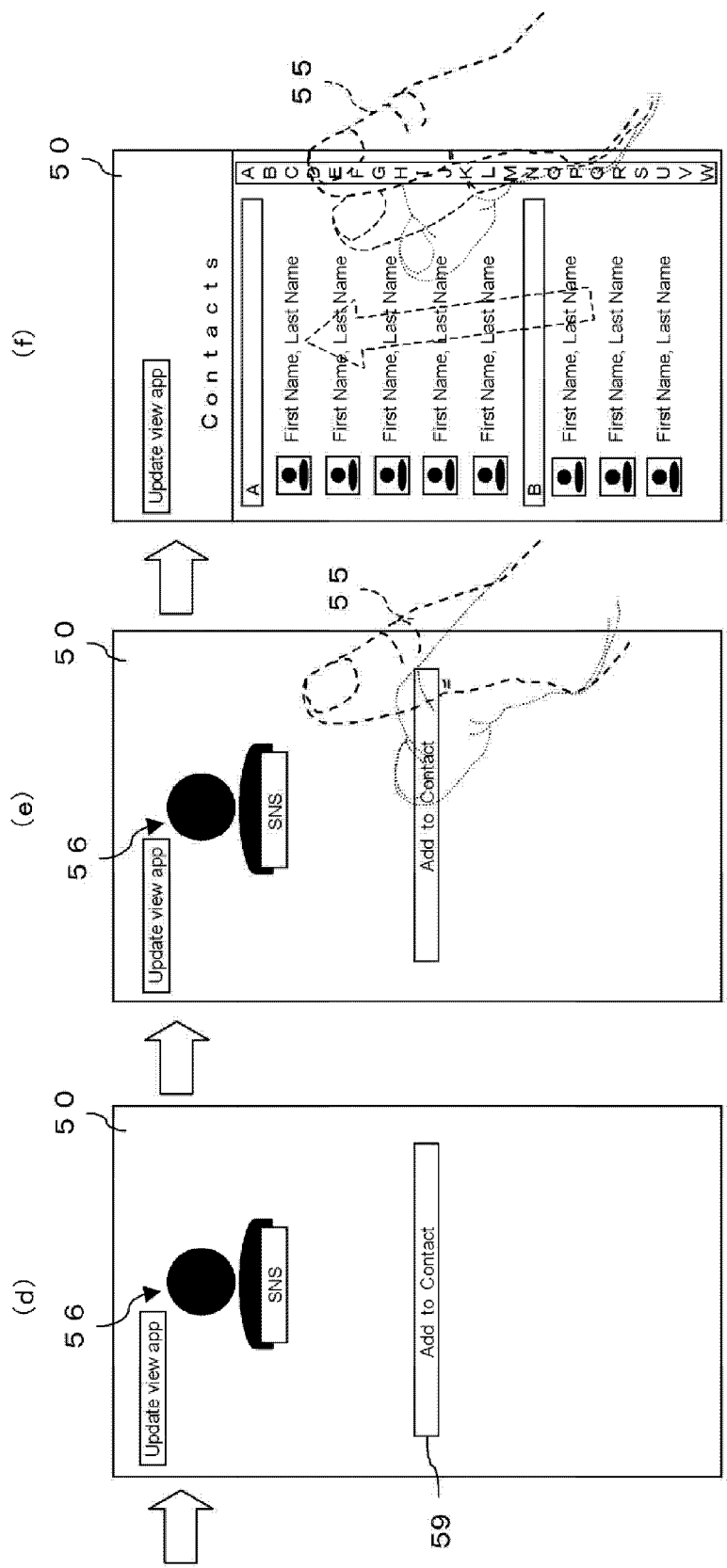
Figure 30:
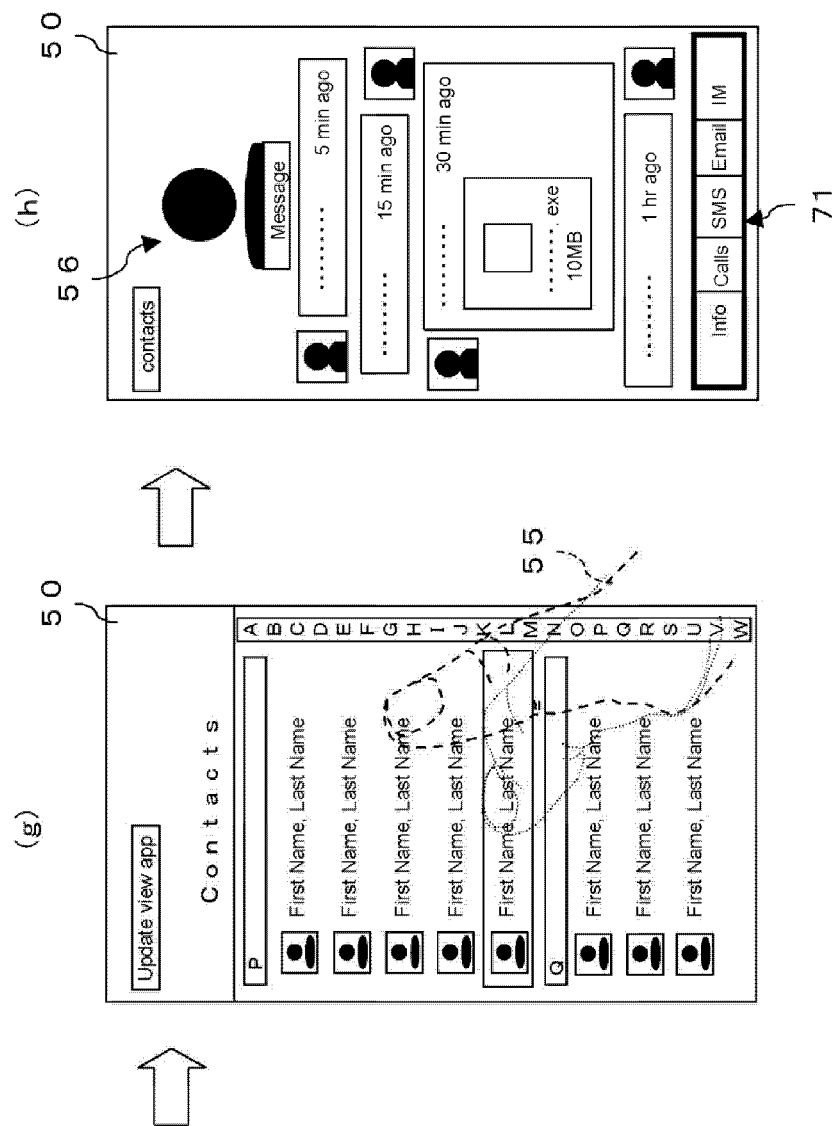

FIGS. 28 to 30 show an example of the user interface screen in a case of linking, when information on contents corresponding to the update information display cards 51 displayed on the display screen 50 are not linked with information registered in, for example, an address book in a cellular phone terminal or an address book on an external network, those pieces of information with each other. It should be noted that in the example of FIGS. 28 to 30, a case where an SNS participant is added to a contact information list of an address book is taken as an example.

FIG. 28(*a*) shows an example of a screen on which all the update information display cards 51 are in the idle state. At this time, when there is an update information display card whose SNS contact information link is not linked with information registered in the address book among the update information display cards 51, for example, the cellular phone terminal of this embodiment displays information indicating that there is no linkage on the update information display card.

Next, as shown in FIG. 28(*b*), when the user selects the update information display card 51 on which information indicating that there is no linkage is displayed by a touch gesture operation, the update information display card 51 is set to the preview state.

Furthermore, as shown in FIG. 28(*c*), when a gesture operation for pivoting processing (smear gesture operation) is made while the touch is maintained, the cellular phone terminal of this embodiment displays a user interface screen for inquiring the user whether to link the SNS contact information link of the update information display card with information registered in the address book as shown in FIG. 29(*d*). A link addition softkey 59 for the user to instruct the linking is displayed on the user interface screen at this time.

Then, when the user performs a gesture operation of tapping the link addition softkey 59 as shown in FIG. 29(*e*), the cellular phone terminal of this embodiment displays a user interface screen that shows a contact information list as shown in FIG. 29(*f*).

As an example, a list of contact information is arranged in an alphabetical order on the list screen. It should be noted that when a flick-up or flick-down gesture operation is performed by the user on the contact information list screen, for example, the cellular phone terminal of this embodiment scrolls the list screen.

Moreover, when the user selects any of the contact information by a tap gesture operation as shown in FIG. 30(*g*), the cellular phone terminal of this embodiment shifts the display of the display screen to a pivot display state as shown in FIG. 30(*h*).

(Structure (Functional Blocks) for Executing Update Information Display)

Figure 31:
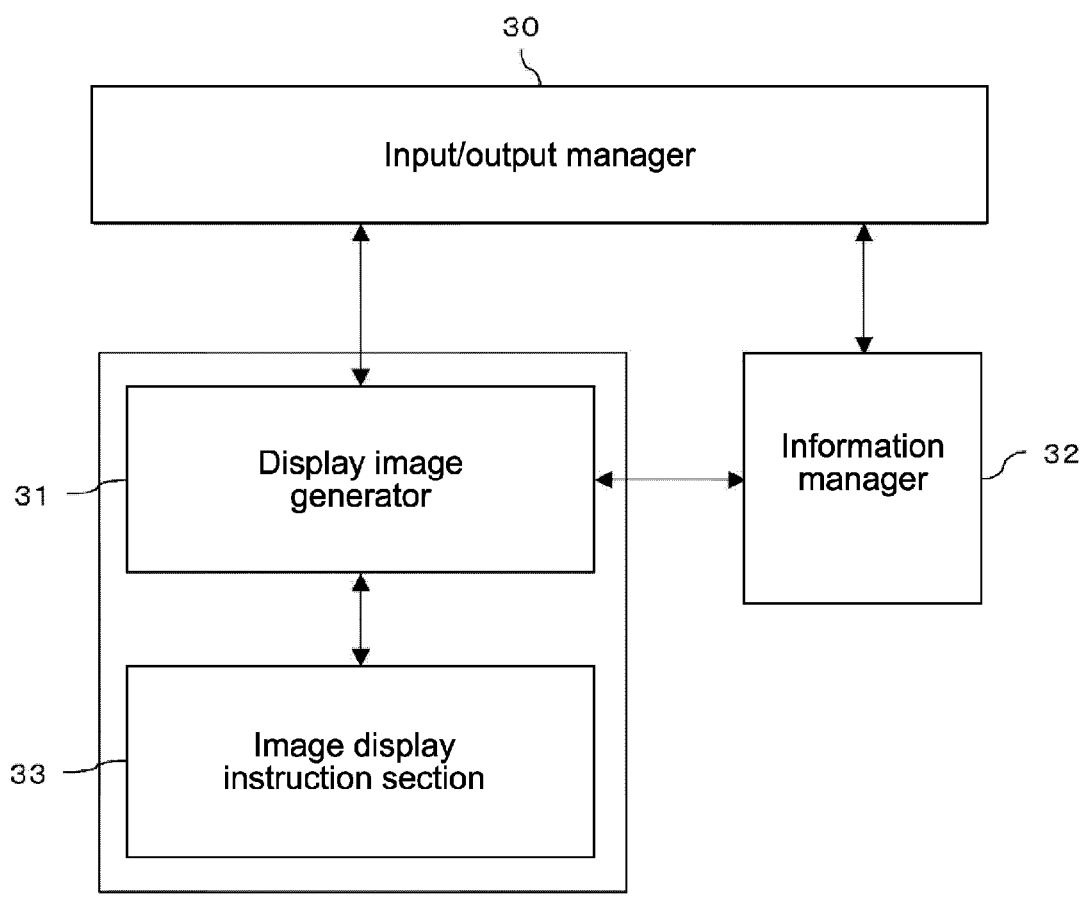
FIG. 31 A functional block diagram showing constituent elements formed inside a controller of the cellular phone terminal by execution of an information presentation application program of this embodiment.

Next, FIG. 31 shows a structural example for sequentially displaying on the display screen a plurality of update information display cards 51 as described above in time series in the cellular phone terminal of this embodiment. It should be noted that FIG. 31 shows, as functional blocks, main constituent elements formed by the controller 10 shown in FIG. 1 executing the information presentation application program according to the embodiment of the present invention.

An input/output manager 30 shown in FIG. 31 is one of the constituent elements constituted by executing the information presentation application program according to the embodiment of the present invention. As functions of the input/output manager 30, a function of receiving instruction information input from a user via a touch panel or the like of the operation section 14 and transmitting it to a display image generator 31, a function of managing inputs and outputs of information exchanged with the information manager 32 and information exchanged with other application programs, and a function of transmitting an information update notification from the information manager 32 to the display image generator 31 can be exemplified.

Specifically, in this embodiment, when receiving instruction information input by the user by an operation on the touch panel and the like of the operation section 14, the input/output manager 30 transmits the input instruction information to the display image generator 31. Also, when receiving information that is to be required when the update information display cards 51 and the like are displayed on the display screen from the information manager 32 to be described later, the input/output manager 30 transmits the information to the display image generator 31. In addition, when receiving a notification that notifies that information has been updated from the information manager 32, the input/output manager 30 transmits the notification information to the display image generator 31. Furthermore, the input/output manager 30 activates other application programs as necessary and manages inputs and outputs of information exchanged with the other application programs.

The display image generator 31 is one of the constituent elements formed by executing the information presentation application program according to the embodiment of the present invention, which generates, based on user input instruction information input via the input/output manager 30, information received from the information manager 32 via the input/output manager 30, and the like, display image information to be displayed on the display screen, and transmits the display image information to an image display instruction section 33. In other words, upon receiving information necessary for screen display from the information manager 32 via the input/output manager 30, the display image generator 31 of this embodiment generates display image information for displaying the update information display cards 51 and the like on the display screen based on that information and transmits the display image information to the image display instruction section 33. Moreover, upon receiving the user input instruction information via the input/output manager 30, the display image generator 31 analyzes what kind of an instruction the input from the user is based on the input instruction information, generates display image information on which the user instruction is reflected appropriately, and transmits it to the image display instruction section 33.

The image display instruction section 33 is one of the constituent elements formed by executing the information presentation application program according to the embodiment of the present invention and causes the display image information supplied from the display image generator 31 to be displayed on the display screen of the display section 13 shown in FIG. 1, for example. It should be noted that the image display instruction section 33 may be originally provided in the cellular phone terminal of this embodiment, but is an essential constituent element for displaying information on the display screen by executing the information presentation application program of this embodiment.

The information manager 32 is one of the constituent elements formed by executing the information presentation application program according to the embodiment of the present invention, which monitors an update condition of content data that are successively updated by various application programs and stored in the information storages described above in the cellular phone terminal, and manages update information of those content data. More specifically, the information manager 32 manages update information of contents successively updated by various application programs, that is, update information of, for example, an address book including an individual name, an e-mail address, and an SNS account, incoming calls, transmission histories, transmission/reception histories of SMS/MMS and e-mail messages, an adding/buying history of photographic images and moving images taken by the camera section 28, transferred from a personal computer, or purchased from an online shop, an adding/buying history of songs transferred from a personal computer or purchased from an online shop, various types of data including an SNS diary and message that are used by a user via a cellular phone terminal, calendar data, and histories of files that a user has downloaded via a network. Moreover, the information manager 32 transmits information necessary for displaying the update information display cards 51 and the like on the display screen to the input/output manager 30. In addition, when content data managed as described above is updated, the information manager 32 notifies the display image generator 31 to that effect via the input/output manager 30. It should be noted that details on specific information management by the information manager 32 will be described later.

(Overview of Operation When Displaying Update Information)

Figure 32:
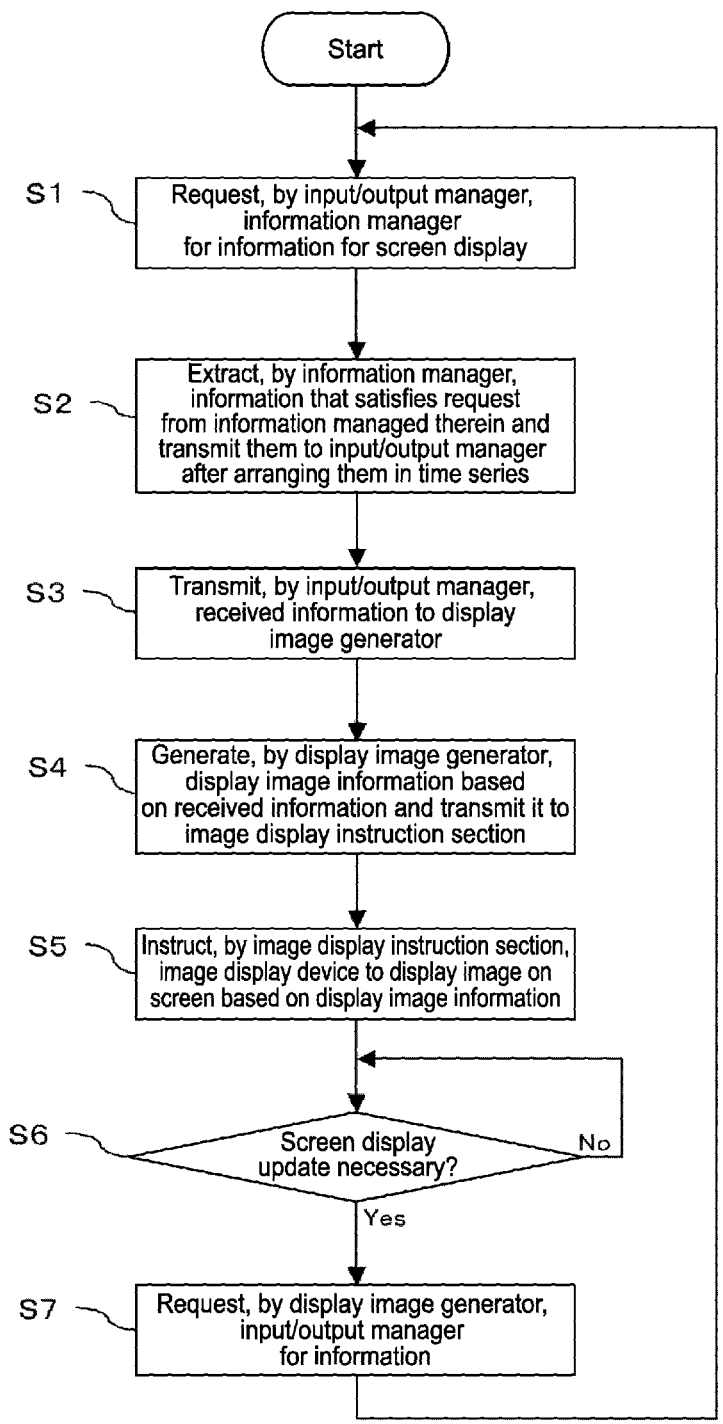
FIG. 32 A flowchart showing a flow of processing carried out when the update information display cards are displayed on the display screen by the structure shown in FIG. 31.

In the structure described above with reference to FIG. 31, display of update information on the display screen is carried out by a flow as shown in a flowchart of FIG. 32.

When displaying the update information display cards 51 on the display screen, as a process of Step S1, the input/output manager 30 first requests the information manager 32 for information for screen display. It should be noted that when the display of the update information display cards 51 is performed on a standby screen, the input/output manager 30 requests the information manager 32 for information for displaying on the screen the update information display cards 51 displayed in the default display state described above at a time the cellular phone terminal is in a standby state. Moreover, when an instruction to switch display of the screen by the filtering processing, paging processing, pivoting processing, and the like described above is input by the user, the input/output manager 30 requests the information manager 32 for information for displaying on the screen the update information display cards 51 or the list of update information to be switched in the filtering processing, paging processing, pivoting processing, and the like.

Upon receiving the request from the input/output manager 30, as a process of Step S2, the information manager 32 extracts several pieces of information satisfying the request from the information managed by itself and transmits them to the input/output manager 30 after arranging them in time series.

As a process of Step S3, the input/output manager 30 that has received the information from the information manager 32 transmits the information to the display image generator 31.

As a process of Step S4, the display image generator 31 that has received the information from the input/output manager 30 generates display image information based on the received information and transmits the display image information to the image display instruction section 33.

As a process of Step S5, the image display instruction section 33 that has received the display image information instructs the display section 13 to display an image on the display screen based on the display image information.

Moreover, as a process of Step S6, the display image generator 31 judges whether an update of screen display is necessary. In other words, the display image generator 31 judges whether an update of screen display is necessary for reflecting, when an instruction input is made by the user or an information update is made, or when the display is switched to the standby screen or the screen is switched by the filtering processing, paging processing, pivoting processing, or the like as in the case of Step S1, the input or update on the display on the display screen.

Then, when it is judged in Step S6 that an update of screen display is necessary, the display image generator 31 requests the information manager 32 via the input/output manager 30 for information necessary for updating the screen display as a process of Step S7. The process returns to Step S1 after Step S7.

As described above, in the cellular phone terminal of this embodiment, the processes of Step S1 to Step S7 are repeated to perform screen display and a display switch.

(Structure of Information Manager)

Figure 33:
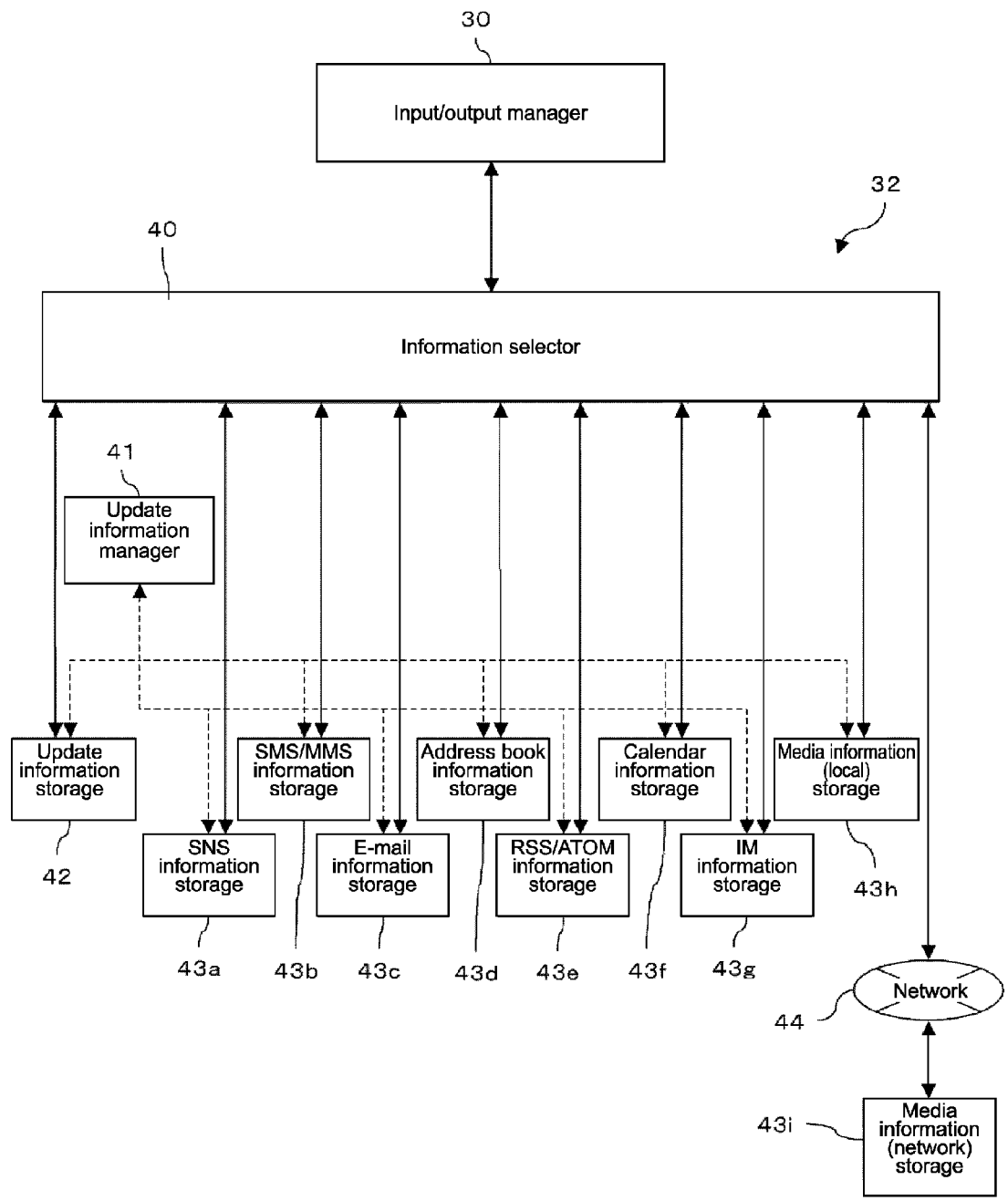
FIG. 33 A block diagram showing a specific structural example of an information manager shown in FIG. 31 and information storages managed by the information manager.

FIG. 33 shows a specific structural example of the information manager 32 shown in FIG. 31 above. It should be noted that the input/output manager 30 and various information storages 43a to 43i are also illustrated in FIG. 33.

For integrally managing update information of all types of contents and readily extracting the update information as necessary to transmit them to the display image generator 31, the information manager 32 includes an information selector 40, an update information manager 41, and an update information storage 42 as shown in FIG. 33.

Each of the various information storages 43a to 43i exists for a corresponding content type such as an address book, SNS, SMS/MMS, e-mails, RSS, IM, and a calendar. Further, in addition to storing information of contents of the associated type, the information storages 43a to 43i have, as common functions, a function of returning information stored inside in a designated order in response to a request from the information selector 40 or the update information manager 41 and a function of extracting and returning, when a limited number of pieces of information are requested, that number of pieces of information in a designated order. It should be noted that the information storages 43a to 43i may be included in the information manager 32 or may be an information storage means additionally provided inside the cellular phone terminal. In addition, the information storages 43a to 43i do not necessarily need to be an information storage means provided inside the cellular phone terminal and may instead be provided outside the cellular phone terminal via a network 44 like the information storage 43i, for example. Moreover, when provided inside the cellular phone terminal, the information storages may respectively be associated with a plurality of division storage areas obtained by dividing a storage area of one storage means, or may be provided separately as individual storage means.

It should be noted that in FIG. 33, exemplified as the information storages are information storages corresponding to the respective associated types of contents, such as an SNS information storage 43a that stores various types of information on SNS, an SMS/MMS information storage 43b that stores various types of information on SMS and MMS, an e-mail information storage 43c that stores various types of information on e-mails, an address book information storage 43d that stores various types of information on an address book, an RSS/ATOM information storage 43e that stores various types of information on RSS, a calendar information storage 43f that stores various types of information on calendars, an IM information storage 43g that stores various types of information on IM (Instant Messaging), and media information storages 43h and 43i that store various types of information on images and music. Furthermore, the various information storages 43a to 43i can be commonly used by the application programs of the cellular phone terminal. In other words, an application program that handles SMS, MMS, and e-mail messages, an application program that handles an address book, an application program that handles images, an application program that handles music, and the like can store information that they use in the corresponding information storages for use via the input/output manager 30.

Upon receiving a request from the input/output manager 30, the information selector 40 selects an appropriate information storage out of the various information storages 43a to 43i in response to the request, extracts appropriate information from the information stored in the selected information storage, and returns the information to the input/output manager 30.

The update information manager 41 monitors information updates of the information storages 43a to 43i, that is, information updates such as storage (addition) of new information in the information storages 43a to 43i and a change/deletion of information already stored therein. In the case of this embodiment, the information storages 43a to 43i each have a function of notifying the outside of an information update when updated. Therefore, the update information manager 41 detects that an information update has been made based on the update notification from the information storages 43a to 43i. Then, when an information update is made in the information storages 43a to 43i, the update information manager 41 acquires an update content from the corresponding information storage and caches it in the update information storage 42. It should be noted that instead of detecting whether an information update has been made based on the update notification from the information storages 43a to 43i as described above, the update information manager 41 may monitor whether an information update has been made by periodically checking the stored information of the information storages 43a to 43i, for example.

Further, the update information manager 41 also monitors an information update of the update information storage 42, that is, an information update such as storage (addition) of new information in the update information storage 42 and a change/deletion of information already stored therein. Then, when an information update is made in the update information storage 42, the update information manager 41 notifies the input/output manager 30 of the information update via the information selector 40. It should be noted that when the update information storage 42 has a function of notifying the outside of an information update similar to the information storages 43a to 43i described above, the update information manager 41 detects that an information update has been made based on the update notification from the update information storage 42. It is also possible for the update information manager 41 to monitor whether an information update has been made by periodically checking the stored information of the update information storage 42, for example.

Being one of the various information storages, the update information storage 42 is prepared for accumulating in advance information indicating update contents in the various other information storages 43a to 43i.

As described above, the information manager 32 of this embodiment includes the update information manager 41 and the update information storage 42, and the update information manager 41 constantly monitors information updates in the information storages 43a to 43i to store an update content in the update information storage 42 when an information update is made in the information storages 43a to 43i. Accordingly, for example, the information manager 32 of this embodiment can save time as compared to a case where an update content is acquired from the information storages 43a to 43i every time a request is received from the input/output manager 30, and all the update contents can be returned to the input/output manager 30 to be transmitted to the display image generator 31 at high speed.

(Information Update (Additional Information Storage, Change of Information) in Various Information Storages)

When an update such as an information addition of a new content, information change, and the like is made, the various information storages 43a to 43i described above arrange and store the information in time series based on the update dates and times. It should be noted that when the pieces of content information are not arranged and stored in time series or not strictly arranged in time series and stored, for enabling the information to be extracted at high speed thereafter, each of the information storages 43a to 43i creates a correspondence table regarding an order of the pieces of content information arranged in time series and an order in which the pieces of information are actually stored, and also stores data of the correspondence table.

Figure 34:
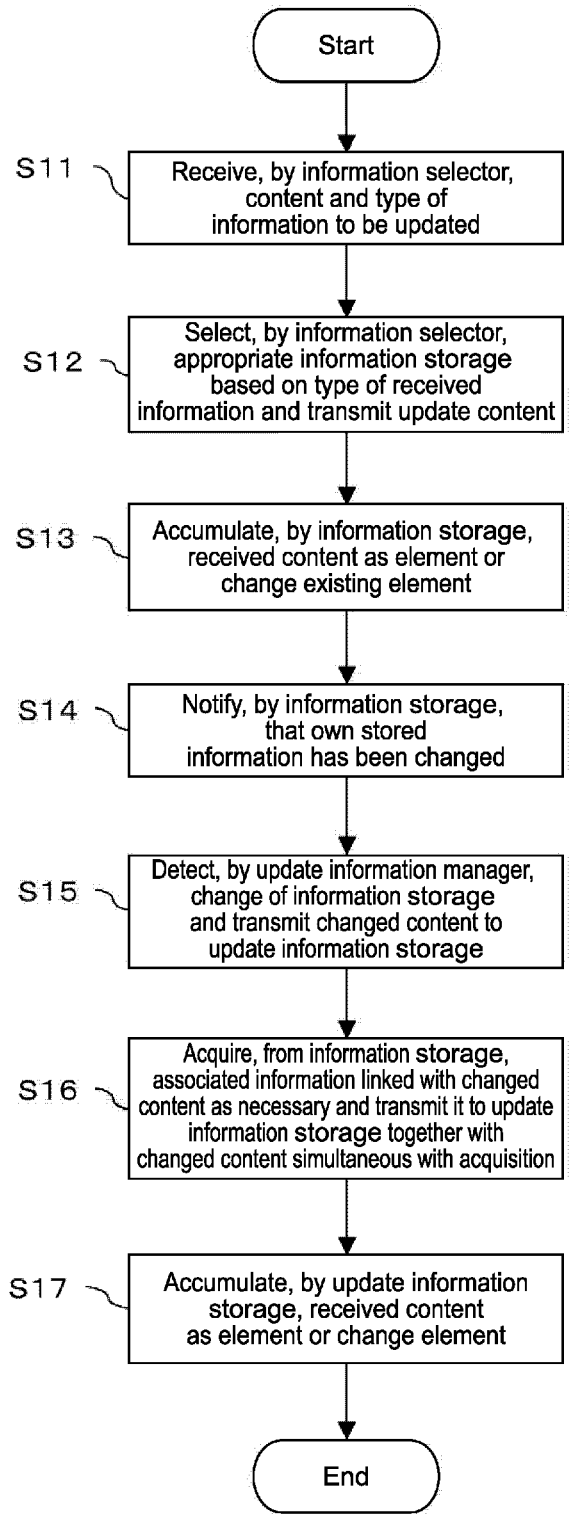
FIG. 34 A flowchart showing a flow of processing of the information manager in a case where information is added/changed (information update).
Figure 35:
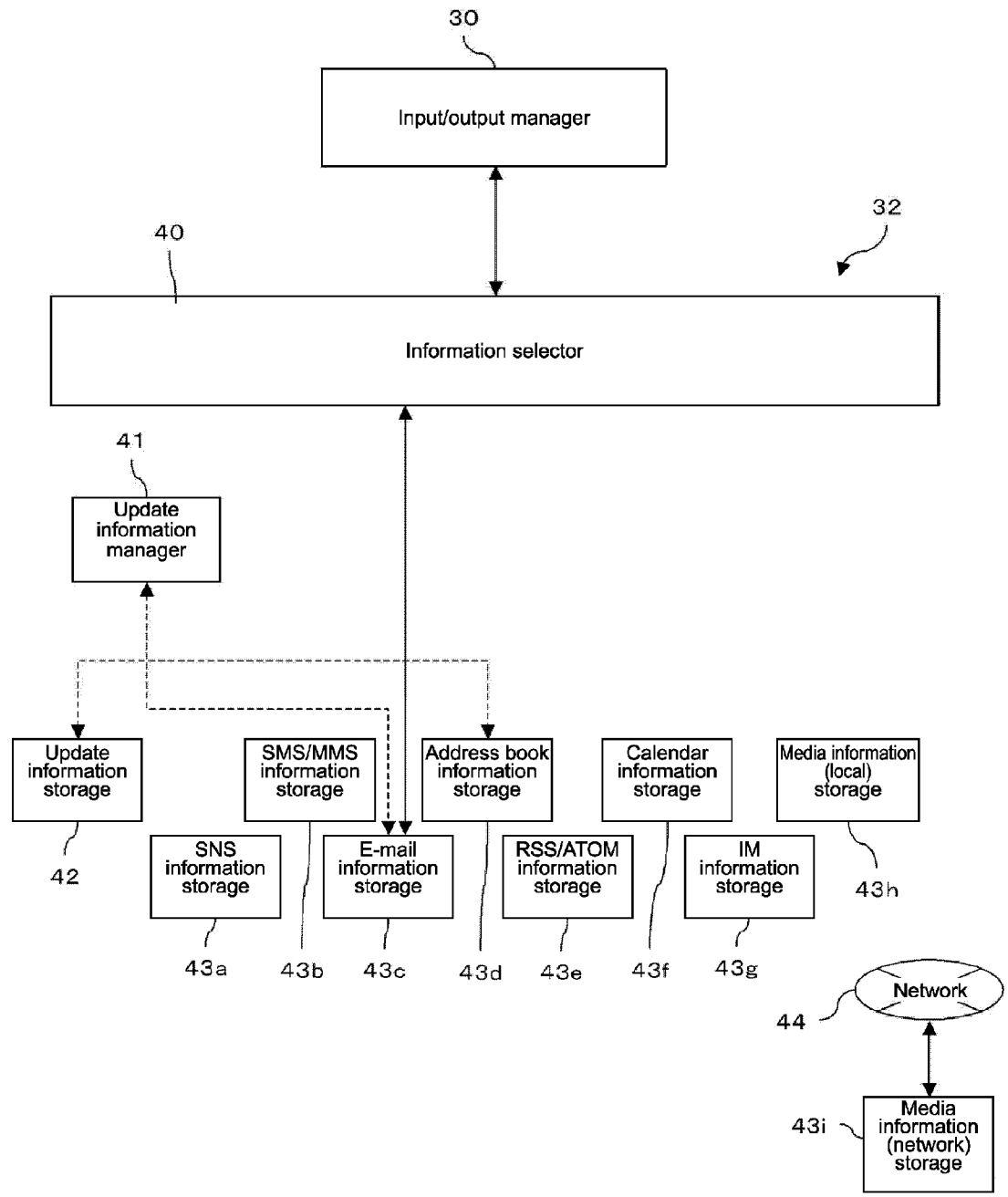
FIG. 35 A block diagram schematically showing a flow of processing carried out among constituent elements of the information manager in a case where an e-mail is newly received, as an example of the information addition/change (information update).

When content information is added or changed in the information storages 43a to 43i, the information manager 32 operates as follows. FIG. 34 shows a processing flow of the information manager 32 in a case where content information is added or changed in the information storages 43a to 43i. Further, FIG. 35 schematically shows a flow of processing carried out among the constituent elements in a case where an e-mail is newly received, as an example of the addition of information.

In FIG. 34, when information is newly added, as a process of Step S11, the information selector 40 first receives a content and a content type of information to be updated from an application program that has newly added the information via the input/output manager 30. In a case where an e-mail is newly received in FIG. 35, the information selector 40 receives data notifying an e-mail reception and e-mail data from the application program for e-mails via the input/output manager 30. As the e-mail data, a received date and time, a sender e-mail address, a title, a mail text, a mail header, and data of appended data if there is any can be exemplified.

As a process of Step S12, the information selector 40 that has received the content and content type of the information to be updated selects an appropriate information storage in accordance with the content type of the received information and transmits the update content to that information storage. In the example of FIG. 35, the information selector 40 selects the e-mail information storage 43c and transmits the e-mail data to the e-mail information storage 43c.

As a process of Step S13, the information storage that has received the information from the information selector 40 newly stores the received information or stores it by changing the existing information. In the example of FIG. 35, the e-mail information storage 43c stores the received e-mail data.

As a process of Step S14, the information storage that has newly stored the received information or changed information notifies (notifies update information manager 41 in this example) that its own stored information has been changed. In the example of FIG. 35, the e-mail information storage 43c notifies the update information manager 41 that the received e-mail has been stored.

As a process of Step S15, the update information manager 41 that has detected that an information update has been made by the notification from the information storage acquires information on the update content from the information storage that has made the notification and transmits the information to the update information storage 42. In the example of FIG. 35, the update information manager 41 that has detected the notification from the e-mail information storage 43c acquires the update content from the e-mail information storage 43c and transmits the information to the update information storage 42.

Also at this time, as a process of Step S16, the update information manager 41 acquires attribute-related information linked with the update content from the information storage as necessary and transmits it to the update information storage 42 together with the update content. In the example of FIG. 35, the update information manager 41 acquires, based on an e-mail address of a sender of the e-mail, information such as a registered name registered in an address book in association with that e-mail address from the address book information storage 43d as attribute-related information of an e-mail content, and transmits the information such as a registered name to the update information storage 42.

The update information storage 42 stores the information received from the update information manager 41 or stores it by changing existing information. In the example of FIG. 35, the update information storage 42 stores the update content or registered name related to the e-mail. It should be noted that similar to the case of the various information storages 43a to 43i described above, when the pieces of information are not stored in time series or not strictly arranged in time series and stored, for enabling the information to be extracted at high speed thereafter, the update information storage 42 creates a correspondence table regarding an order of the pieces of information arranged in time series and an order in which the pieces of information are actually stored, and also stores data of the correspondence table.

(Extraction of Information From Various Information Storages)

Figure 36:
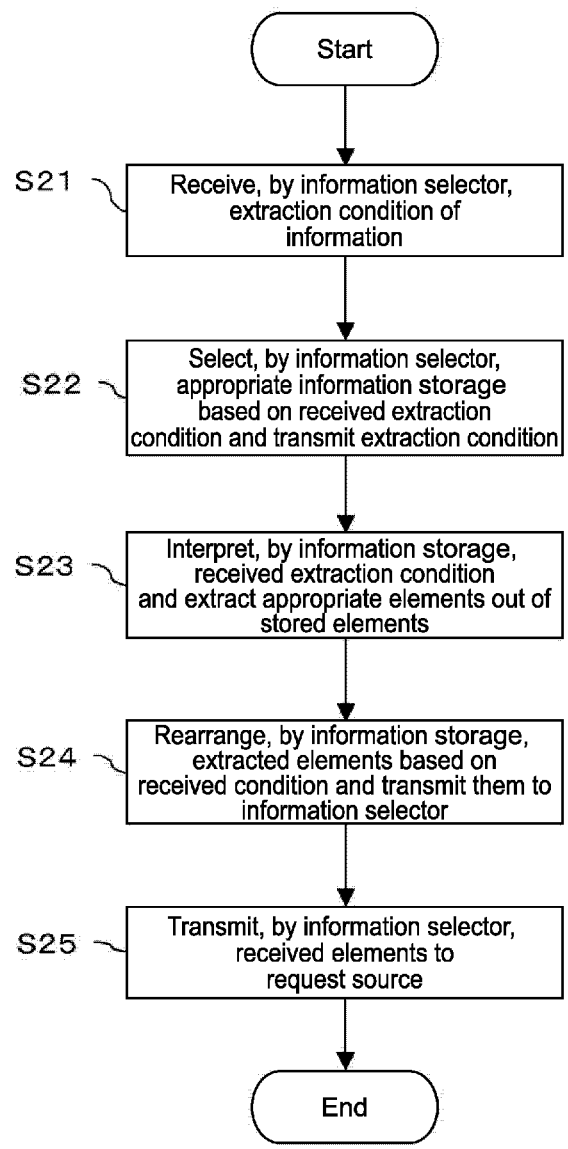
FIG. 36 A flowchart showing a flow of processing of the information manager in a case where information is extracted.
Figure 37:
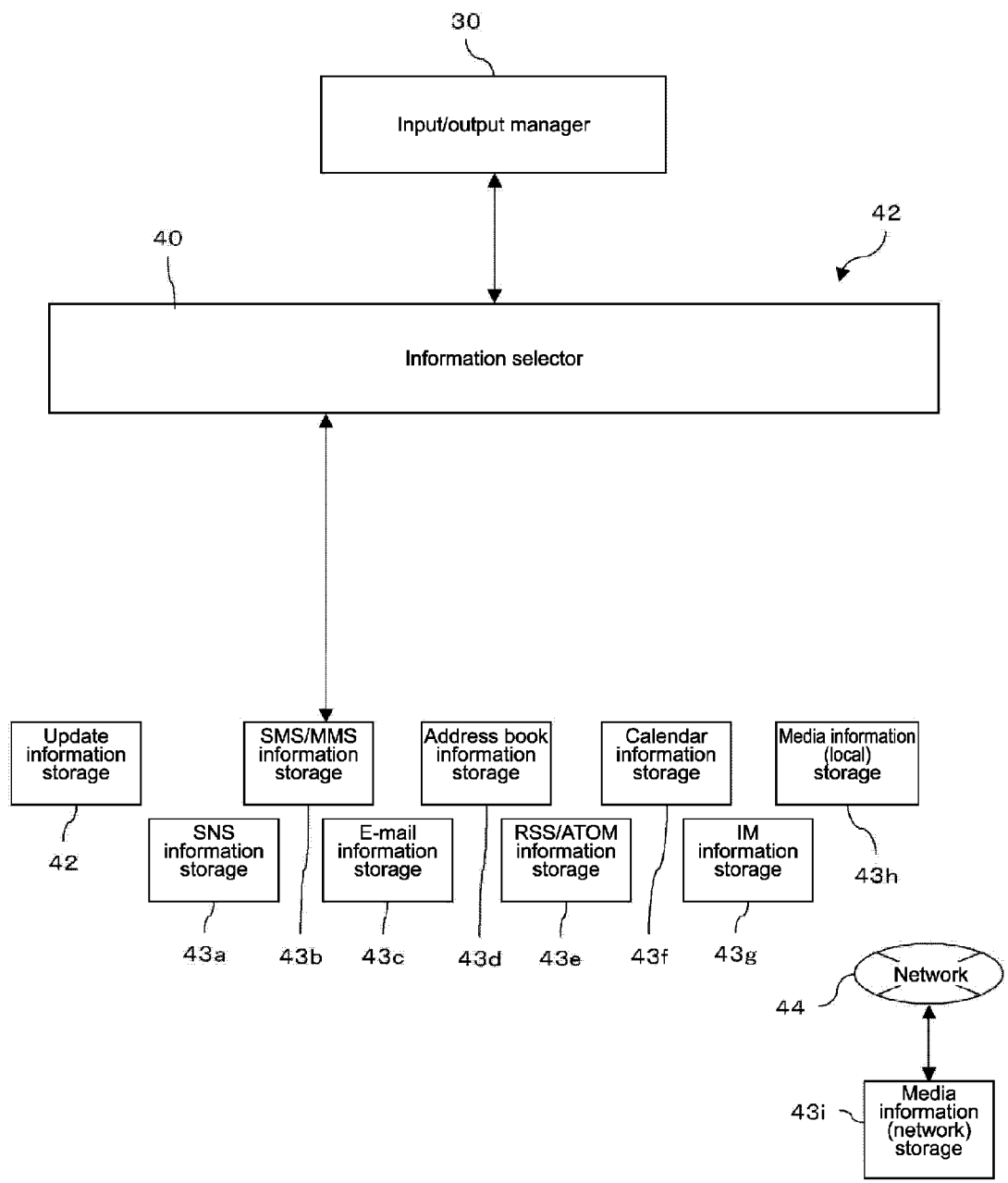
FIG. 37 A block diagram schematically showing a flow of processing carried out among the constituent elements of the information manager in a case where an SMS/MMS message history is extracted, as an example of the information extraction.

When extracting information stored in the various information storages 43a to 43i as described above, the information manager 32 operates as follows. FIG. 36 shows a processing flow of the information manager 32 that is carried out when extracting information. In addition, FIG. 37 schematically shows an example of a processing flow carried out among the constituent elements of the information manager 32 in a case where information on a message history is extracted from the SMS/MMS information storage 43b.

In FIG. 36, when information is extracted from the various information storages 43a to 43i, as a process of Step S21, the information selector 40 receives a query that requests desired information from any of application programs via the input/output manager 30. Specifically, when SMS/MMS message histories are extracted in FIG. 37, the information selector 40 receives a query that requests SMS/MMS message histories from an SMS/MMS application program as an extraction condition. It should be noted that an example of the query that requests SMS/MMS message histories is a query that requests 10 latest message histories.

As a process of Step S22, the information selector 40 that has received the extraction condition selects an appropriate information storage based on the extraction condition and transmits the extraction condition to that information storage. In the example of FIG. 37, the information selector 40 selects the SMS/MMS information storage 43b and transmits the extraction condition that requests SMS/MMS message histories to the SMS/MMS information storage 43b.

As a process of Step S23, the information storage that has received the extraction condition from the information selector 40 interprets the received extraction condition and extracts appropriate information that satisfies the extraction condition from stored information. In the example of FIG. 37, the SMS/MMS information storage 43b extracts SMS/MMS message histories as information that satisfies the extraction condition.

As a process of Step S24, the information storage that has extracted the information that satisfies the extraction condition rearranges the extracted pieces of information based on the extraction condition and transmits them to the information selector 40. In the example of FIG. 37, the SMS/MMS information storage 43b rearranges the SMS/MMS message histories based on the extraction condition and transmits them to the information selector 40.

The information selector 40 that has received the information from the information storage transmits the information to the application program as the request source via the input/output manager 30. In the example of FIG. 37, the information selector 40 transmits the SMS/MMS message histories to the SMS/MMS application program.

It should be noted that although FIGS. 36 and 37 show the example in which the information selector 40 selects an information storage corresponding to the extraction condition and extracts information from that information storage, it is also possible to transmit, in a case where information stored in the update information storage 42 suffices information that satisfies the extraction condition, for example, the extraction condition to the update information storage 42. In this case, the update information storage 42 interprets the extraction condition, extracts appropriate information that satisfies the extraction condition from stored information, and transmits the extracted information to the information selector 40 after rearranging them based on the extraction condition.

Further, when information is extracted as described above, the information storages 43a to 43i or the update information storage 42 also update/updates information indicating an information extraction count and retain/retains it. Similarly, when information on an e-mail or the like is extracted and a content thereof is displayed on a display or is not displayed on the display, the information storages 43a to 43i or the update information storage 42 also update/updates information indicating that the information is "read" or "unread" and retain/retains it. As a result, it becomes possible to reflect the information on the information extraction count and information on read/unread on the update information display card thereafter.

Further, as described above, in a case where data of a correspondence table regarding the order of the pieces of information arranged in time series and the order in which the pieces of information are actually stored is stored in the information storages 43a to 43i, when extracting information from the information storages 43a to 43i, the pieces of information are extracted in time series based on the correspondence table.

It should be noted that although the example in which information is extracted from the information storages 43a to 43i has been described, the same holds true for a case where the update information storage 42 stores the data of the correspondence table. When information is extracted from the update information storage 42, pieces of information are extracted in time series based on the correspondence table.

(Example of Update Content that Update Information Manager Acquires from Information Storage)

FIGS. 38 and 39 show an update information table that shows, as a list, information that the update information manager 41 acquires from the information storages 43a to 43i and stores in the update information storage 42. It should be noted that the update information table shown in FIGS. 38 and 39 shows only a main portion of the update information table actually stored in the update information storage 42, and many more items are actually prepared in addition thereto. Although the items in the update information table are prepared in advance in the information presentation application program of this embodiment, it is also possible for the items to be arbitrarily changed by the user.

The update information table shown in FIGS. 38 and 39 includes items for registering or storing additional information on a content type of update information, an image and text to be displayed on an update information display card, and the like, such as a filter category, a subcategory, an image, a text TX1, a text TX2, a preview text PTXA, and a preview text PTXB.

Here, the items of the filter category each indicate a category that is handled as the same type of contents in the filtering described above, and the items of the subcategory are prepared for additionally segmentalizing the filter category.

Address information indicating a reference location of a photographic image, a predetermined image, and the like to be displayed on an update information display card is stored as each of the items "image". It should be noted that the reference location of an image may be inside the cellular phone terminal, or may be a location specified by a URI (Uniform Resource Identifier) on the Internet, for example. Also, thumbnail image information of an image and the like may be stored as the item "image".

Descriptive information on a source of a content corresponding to an update information display card is stored as the item "text TX1", and information on a stored date and time is stored as the item "text TX2". It should be noted that the stored date and time is information on a date and time (year/month/day/sec etc.) on/at which information is stored in the various information storages described above.

Simple explanatory information on a content displayed on an update information display card in the idle state is stored as the item "preview text PTXA", and somewhat-specific explanatory information on a content displayed on an update information display card in the preview state is stored as the item "preview text PTXB".

It should be noted that information stored as each of the items "text TX1", "text TX2", "preview text PTXA", and "preview text PTXB" is mainly text information.

Hereinafter, specific examples of the items and information registered or stored as those items will be described in detail.

Items different for each content handled by application programs, such as media, telephone and message, e-mail, IM, SNS, and RSS feed are prepared for the filter category.

As subcategories belonging to the filter category "media", items of "music", a "moving image", and a "photograph" are prepared. The subcategory "music" is further segmentalized into items of, for example, a "latest purchased album" and a "latest purchased song". Similarly, the subcategory "moving image" is segmentalized into items of, for example, a "latest purchased moving image" and a "latest captured moving image". It should be noted that for the subcategory "photograph", only an item of, for example, a "latest captured photograph" is prepared. In addition, reference destination information of, for example, an album jacket image is stored as the item "image" of the subcategory "music", information on, for example, an album title is stored as the item "text TX1" corresponding to the item "latest purchased album", and information on, for example, a song title is stored as the item "text TX1" corresponding to the item "latest purchased song". Moreover, information on date and time information (stored date and time) on/at which album or song data purchased through a download, for example, is stored in an information storage is stored as the item "text TX2" corresponding to each of the items "latest purchased album" and "latest purchased song". Further, information on, for example, an artist name is stored as the items "preview text PTXA" and "preview text PTXB" corresponding to each of the items "latest purchased album" and "latest purchased song". Reference destination information on an image of a head frame is stored as the item "image" of the subcategory "moving image", and information on date and time information (stored date and time) on/at which moving image data purchased through a download, for example, is stored in an information storage is described as the item "text TX2" corresponding to the item "latest purchased moving image". On the other hand, date and time information on/at which the captured moving image data is stored in an information storage is described as the item "text TX2" corresponding to the item "latest captured moving image". Furthermore, reference destination information of a photographic image is stored as the item "image" of the subcategory "photograph", and date and time information on/at which data of the photograph is stored in an information storage is described as the item "text TX2". It should be noted that in the example of FIG. 38, although no information is registered as the items "preview text PTXA" and "preview text PTXB" corresponding to the subcategories "moving image" and "photograph" in particular, when a comment or the like is added to the moving image or the photograph, for example, text information of the comment or the like may be registered.

As subcategories belonging to the filter category "telephone and message", items of a "missed call", "voice mail", "received SMS", and "received MMS" are prepared. Moreover, the subcategory "missed call" is further segmentalized into items of a "missed call from person registered in address book" and "missed call from person unregistered in address book". Similarly, the subcategory "voice mail" is segmentalized into items of a "voice mail from person registered in address book" and "voice mail from person unregistered in address book". The subcategory "received SMS" is segmentalized into items of an "SMS message from person registered in address book" and "SMS message from person unregistered in address book". The subcategory "received MMS" is segmentalized into items of an "MMS message from person registered in address book" and "MMS message from person unregistered in address book". In addition, reference destination information of a photographic image of a caller/sender registered in an address book is stored as the item "image" corresponding to each of the subcategories "missed call from person registered in address book", "SMS message from person registered in address book", and "MMS message from person registered in address book", whereas reference destination information of an image prepared in advance is stored as the item "image" corresponding to each of the subcategories "missed call from person unregistered in address book", "SMS message from person unregistered in address book", and "MMS message from person unregistered in address book". Reference destination information of a voice mail image is stored as the item "image" corresponding to the subcategory "voice mail". Moreover, information on a name of a caller/sender registered in an address book is stored as the item "text TX1" corresponding to each of the subcategories "missed call from person registered in address book", "SMS message from person registered in address book", and "MMS message from person registered in address book", whereas information on a phone number of a caller/sender is stored as the item "text TX 1" corresponding to each of the subcategories "missed call from person unregistered in address book", "SMS message from person unregistered in address book", and "MMS message from person unregistered in address book". Information on a voice mail is stored as the item "text TX1" corresponding to the subcategory "voice mail". Further, date and time information on/at which information notifying that there has been a missed call, voice mail, received SMS, or received MMS is stored in an information storage is described as the item "text TX2" corresponding to each of the subcategories "missed call", "voice mail", "received SMS", and "received MMS". Further, information on a phone number of a caller is stored as the item "preview text PTXB" corresponding to the subcategory "missed call from person registered in address book". Furthermore, information on a message in a predetermined limited number of letters is stored as the item "preview text PTXA" corresponding to each of the subcategories "received SMS" and "received MMS", and information on a message in a larger number of letters than in the case of the "preview text PTXA" is stored as the item "preview text PTXB".

As subcategories belonging to the filter category "e-mail", an item of a "received e-mail" is prepared. Moreover, the subcategory "received e-mail" is further segmentalized into items of an "e-mail from person registered in address book" and "e-mail from person unregistered in address book". In addition, information on a photographic image of a sender registered in an address book or address information of a storage destination thereof is stored as the item "image" corresponding to the subcategory "e-mail from person registered in address book", whereas information on an image prepared in advance is stored as the item "image" corresponding to the subcategory "e-mail from person unregistered in address book". Moreover, information on a sender registered in an address book is stored as the item "text TX1" corresponding to the subcategory "e-mail from person registered in address book", whereas information on an e-mail address of a sender is stored as the item "text TX1" corresponding to the subcategory "e-mail from person unregistered in address book". Furthermore, date and time information on/at which information notifying that an e-mail has been received is stored in an information storage is described as the item "text TX2" corresponding to the subcategory "received e-mail", information described in a title of the e-mail is stored as the item "preview text PTXA", and information on a title, a part of an e-mail text, presence/absence of appended data, a URL, a phone number registered in an address book, and the like is stored as the item "preview text PTXB".

As a subcategory belonging to the filter category "IM", an item of "IM" is prepared. In addition, the subcategory "IM" is further segmentalized into items of a "message from person registered in address book" and "message from person unregistered in address book". Moreover, information on a photographic image of a sender registered in an address book or address information on a storage destination thereof is stored as the item "image" corresponding to the subcategory "IM from person registered in address book", whereas information on an image prepared in advance is stored as the item "image" corresponding to the subcategory "IM from person unregistered in address book". Further, information on a sender registered in an address book is stored as the item "text TX1" corresponding to the subcategory "IM from person registered in address book", whereas information on a phone number of a sender is stored as the item "text TX1" corresponding to the subcategory "IM from person unregistered in address book". Furthermore, date and time information on/at which information notifying that IM communication has been made is stored in an information storage is described as the item "text TX2" corresponding to the subcategory "IM", information on a message within a predetermined limited number of letters is stored as the item "preview text PTXA", and information on a message in a larger number of letters than in the case of the "preview text PTXA" is stored as the item "preview text PTXB".

As a subcategory belonging to the filter category "SNS", an item for each SNS is prepared. In addition, the subcategory "SNS" is further segmentalized into items of "already linked with contact information" and "unlinked with contact information". Moreover, information on a photographic image of a party registered in an address book or address information on a storage destination thereof is stored as the item "image" corresponding to the subcategory "already linked with contact information", whereas information on an image prepared in advance is stored as the item "image" corresponding to the subcategory "unlinked with contact information". Further, information on a name of a party registered in an address book is stored as the item "text TX1" corresponding to the subcategory "already linked with contact information", whereas information on a phone number of an SNS party is stored as the item "text TX1" corresponding to the subcategory "unlinked with contact information". Furthermore, date and time information on/at which information notifying that an SNS update has been made is stored in an information storage is described as the item "text TX2", information indicating an SNS update condition within a predetermined limited number of letters is stored as the item "preview text PTXA", and information indicating an SNS update condition in a larger number of letters than in the case of the "preview text PTXA" is stored as the item "preview text PTXB".

As subcategories belonging to the filter category "RSS feed", an item of an RSS feed of a text and image and an item of an RSS feed of only an image are prepared. In addition, information on an image of a source logo is stored as the item "image" corresponding to each of the subcategories "text and image" and "image only". Moreover, information on a headline is stored as the item "text TX1" corresponding to the subcategory "text and image", whereas information on a header is stored as the item "text TX1" corresponding to the subcategory "image only". Further, date and time information on/at which RSS feed information is stored in an information storage is described as the item "text TX2". Furthermore, information continuing from the headline is stored as the item "preview text PTXA" corresponding to the subcategory "text and image". In addition, more-specific information on the headline or other information on an image or the like is stored as the "preview text PTXB" corresponding to the subcategory "text and image".

It should be noted that in the table of FIGS. 38 and 39 described above, the items having no information registered therein in particular can be used as a reserve, and information may be written therein as necessary or the user may be allowed to write information therein.

In addition, though an illustration as an item is omitted in FIGS. 38 and 39, an item of a "source ID" may also be prepared. Information indicating an information storage location in the various information storages described above is registered as the item "source ID". In other words, for example, information on a media ID that specifies a storage location of data of music, moving images, photographs, and the like in the media information storages 43h and 43i described above is stored as the item "source ID" corresponding to each of subcategories "latest downloaded song", "latest downloaded moving image", "latest captured moving image", and "latest captured photograph". Moreover, for example, information on a call log ID that specifies a storage location of an incoming call history corresponding to a missed call in the address book information storage 43d described above is stored as the item "source ID" corresponding to each of the subcategories "missed call from phone number registered in address book" and "missed call from phone number unregistered in address book". Similarly, information on a message ID that specifies an SMS/MMS message storage location in the SMS/MMS information storage 43b is stored as the item "source ID" corresponding to each of the subcategories "SMS/MMS message reception registered in address book" and "SMS/MMS message reception unregistered in address book". Information on an e-mail ID that specifies a received e-mail storage location in the e-mail information storage 43c is stored as the item "source ID" corresponding to each of the subcategories "e-mail received from e-mail address registered in address book" and "e-mail received from e-mail address unregistered in address book". Similarly, ID information for specifying information storage locations in the SNS information storage 43a, the RSS/ATOM information storage 43e, and the IM information storage 43g are stored as the items "source ID" respectively corresponding to the subcategories "SNS", "RSS feed", and "IM". Specifically, information registered as the item "source ID" is used for referencing, when a desired update information display card 51 is selected by a user, specific information on an individual specified by that update information display card 51 or a photograph, a message, a phone number, an e-mail address, and communication histories of that individual, for example.

Moreover, though an illustration as an item is omitted in FIGS. 38 and 39, an item of a "display time" that stores date and time information (year/month/day/sec etc.) on/at which information is displayed on an update information display card may also be prepared. Specifically, for example, date and time information on/at which a moving image and a photograph are captured are stored as the items "display time" respectively corresponding to the subcategories "latest captured moving image" and "latest captured photograph". Moreover, for example, date and time information on/at which a call is missed is stored as the item "display time" corresponding to each of the subcategories "missed call from phone number registered in address book" and "missed call from phone number unregistered in address book". Date and time information on/at which a message is received is stored as the item "display time" corresponding to each of the subcategories "SMS/MMS reception registered in address book" and "SMS/MMS reception unregistered in address book". Date and time information on/at which an e-mail is received is stored as the item "display time" corresponding to each of the subcategories "e-mail received from e-mail address registered in address book" and "e-mail received from e-mail address unregistered in address book". The same holds true for the subcategories "SNS" and "RSS feed".

It should be noted that the date and time information registered as the item "display time" differs in a level of detail of a display time (e.g., hourly display, display by minutes, and display by seconds) for each of the application programs corresponding to the respective update information display cards. Further, the reason the two pieces of date and time information are respectively stored as the items "text TX2" and "display time" in the update information table is because it is difficult to collectively sort date and time information described in both the "text TX2" and "display time" in time series. Specifically, for example, there are cases where an error is caused between the date and time information of those two as a matter of convenience of a system and the like, and date and time information of a display time differs in handling time for each application program and the level of detail of a display time also differs as described above. It should be noted that examples of the time that differs for each type of application program include mail transmission/reception times, a called time, and an SNS posting time. Moreover, an example of the case where an error is caused between the date and time information as a matter of convenience of a system and the like is a case where, regarding an e-mail, for example, a delivery delay is caused due to a condition of a server or a reception-side terminal and a mail transmission time (date and time information of display time) and a time at which the mail is stored in the terminal (date and time information of text TX2) largely differ. In addition, in the case of SNS, for example, in a case where a data update is not carried out in real time and a user actively updates it or an update is carried out at designated time intervals (e.g., every 5 minutes) depending on an SNS service, a large difference is caused between a time at which an SNS message is posted (date and time information of display time) and a time at which the message is stored in the terminal (date and time information of text TX2).

Although the items up to the preview text PTXB are illustrated in the table of FIGS. 38 and 39, in addition to that, information on a flag or reference destination necessary for displaying, at a time a desired update information display card is selected by a user, details of that update information display card is also registered in the update information table of this embodiment.

(Management Table and Display and Operation Control of Gesture Operations)

FIGS. 40 and 41 each show an example of a gesture operation management table used when judging, at a time a user performs a gesture operation on a touch panel, for which instruction the gesture operation is input in the input/output manager 30 shown in FIG. 31. It should be noted that FIG. 40 shows a gesture operation management table in a case where all the update information display cards are in the idle state and FIG. 41 shows a gesture operation management table in a case where a gesture operation is made with respect to an update information display card in a preview state. The gesture operation management tables are prepared in advance in the information presentation application program of this embodiment, but a user is also allowed to arbitrarily change them. Moreover, display control and operation control of the user interface screen based on the gesture operation management table are carried out with the display image generator 31 and the input/output manager 30 shown in FIG. 31 co-operating with each other.

First, while referring to the gesture operation management table in the idle state shown in FIG. 40, operations of the respective constituent elements shown in FIG. 31 will be described.

In FIG. 40, when a user performs a touch gesture operation on one of the update information display cards that are all in the idle state, the display image generator 31 shifts the update information display card to a preview state after an elapse of a touch detection time period (X time period) to be described later. In other words, in this case, upon receiving input instruction information generated by the touch gesture operation to the update information display card from the input/output manager 30, the display image generator 31 acquires information to be displayed when the update information display card is in the preview state from the information manager 32 while timing the touch detection time period (X time period) to be described later. Then, at a point the touch detection time period to be described later has elapsed, the display image generator 31 controls the image display instruction section 33 to display the information acquired from the information manager 32 on the update information display card in the preview state simultaneous with the shift of the update information display card to the preview state.

When the user performs a tap gesture operation on any one of the update information display cards that are all in the idle state, the input/output manager 30 activates an application program corresponding to the tapped update information display card. Also at this time, the display image generator 31 receives information for screen display that is supplied from the activated application program via the input/output manager 30 and transmits the information for screen display to the image display instruction section 33.

When the user performs a flick-up/drag gesture operation while the update information display cards are being scrolled upwardly on the screen, upon receiving input instruction information via the input/output manager 30, the display image generator 31 controls the image display instruction section 33 to raise a scroll speed in scrolling the update information display cards. On the other hand, when the user performs a flick-down/drag gesture operation while the update information display cards are scrolled upwardly on the screen, upon receiving input instruction information via the input/output manager 30, the display image generator 31 controls the image display instruction section 33 to lower the scroll speed in scrolling the update information display cards.

When the user performs a flick-down/drag gesture operation while the update information display cards are being scrolled downwardly on the screen, upon receiving input instruction information via the input/output manager 30, the display image generator 31 controls the image display instruction section 33 to raise the scroll speed in scrolling the update information display cards. On the other hand, when the user performs a flick-up/drag gesture operation while the update information display cards are scrolled downwardly on the screen, upon receiving input instruction information via the input/output manager 30, the display image generator 31 controls the image display instruction section 33 to lower the scroll speed in scrolling the update information display cards.

When the user performs a flick-left gesture operation while all the update information display cards are in the idle state, the display image generator 31 causes a shift to a display screen of update information display cards prepared as an adjacent page on a left-hand side. In other words, in this case, upon receiving the input instruction information generated by the flick-left gesture operation from the input/output manager 30, the display image generator 31 acquires information on the update information display cards that are to be displayed as the adjacent page on the left-hand side from the information manager 32 based on information on a direction of the flick gesture operation (left-hand direction). Then, the display image generator 31 controls the image display instruction section 33 to display the update information display cards based on the information acquired from the information manager 32.

When the user performs a flick-right gesture operation while all the update information display cards are in the idle state, the display image generator 31 causes a shift to a display screen of update information display cards prepared as an adjacent page on a right-hand side. In other words, in this case, upon receiving the input instruction information generated by the flick-right gesture operation from the input/output manager 30, the display image generator 31 acquires information on the update information display cards that are to be displayed as the adjacent page on the right-hand side from the information manager 32 based on information on the direction of the flick gesture operation (right-hand direction). Then, the display image generator 31 controls the image display instruction section 33 to display the update information display cards based on the information acquired from the information manager 32.

Next, while referring to the gesture operation management table in the preview state shown in FIG. 41, operations of the respective constituent elements shown in FIG. 31 will be described.

In FIG. 41, when the user performs, at a time any of the update information display cards is in the preview state, a touch gesture operation on the update information display card in the preview state, upon receiving input instruction information via the input/output manager 30, the display image generator 31 maintains the preview state of the update information display card.

When the user performs a tap gesture operation on the update information display card in the preview state, the input/output manager 30 activates an application program corresponding to the tapped update information display card. Also at this time, the display image generator 31 receives information for screen display that is supplied from the activated application program via the input/output manager 30 and transmits the information for screen display to the image display instruction section 33.

When the user performs a touch gesture operation on the update information display card in the preview state and also a drag-right gesture operation in the touched state, the display image generator 31 causes a shift to a page display screen in a pivot display state prepared as an adjacent page on a right-hand side. In other words, in this case, upon receiving input instruction information generated by the touch and drag-right gesture operation from the input/output manager 30, the display image generator 31 acquires update information in the pivot display state prepared as the adjacent page on the right-hand side based on information on a direction of the drag gesture operation (right-hand direction). Then, the display image generator 31 controls the image display instruction section 33 to display a list of update information acquired from the information manager 32.

When the user performs a touch gesture operation on the update information display card in the preview state and also a drag-down gesture operation in the touched state, the display image generator 31 causes a shift to a state where the update information display card can be deleted as described above. In other words, in this case, upon receiving input instruction information generated by the touch and drag-down gesture operation from the input/output manager 30, the display image generator 31 controls the image display instruction section 33 to display the delete icon 58 as shown in FIGS. 26 and 27 above. Furthermore, when the drag-down gesture operation is continued, upon receiving information notifying that the update information display card has been moved to the delete icon 58 from the input/output manager 30, the display image generator 31 controls the image display instruction section 33 to delete the update information display card from the screen. Then, when the update information display card is deleted from the screen, the display image generator 31 acquires, as well as moving the remaining update information display cards to fill in a space of a display area opened by the deletion, information on a new update information display card from the information manager 32 to fill in a display area opened by the movement, and controls the image display instruction section 33 to display the update information display cards on the screen.

When the user performs a touch gesture operation on an icon representing a pivot state on the update information display card in the preview state, upon receiving input instruction information from the input/output manager 30, the display image generator 31 controls the image display instruction section 33 to display an image in the pivot display state described above.

(Gesture Operation Judgment and Timing Map in Activating Application Program)

Figure 42:
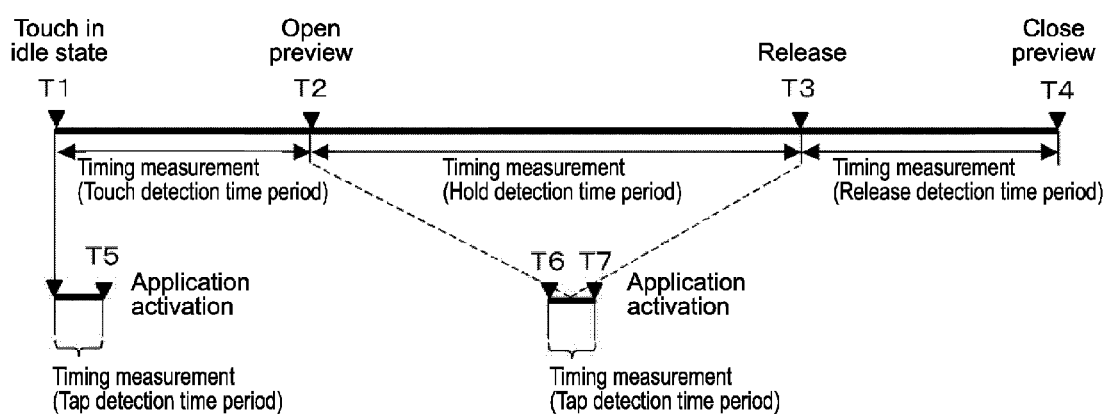
FIG. 42 A diagram showing a timing map in a case where the cellular phone terminal of this embodiment judges which of the instructions the gesture operation of the user is.

FIG. 42 shows an example of a timing map in a case where the input/output manager 30 judges, when the user performs a gesture operation on a touch panel as described above, for which instruction the gesture operation is input, and, based on a result of the judgment by the input/output manager 30, the display image generator 31 shifts a display image.

In FIG. 42, when the user touches a detection area corresponding to a display area of a desired update information display card with a finger or the like out of the detection area of the touch panel when all the update information display cards are in the idle state, for example, the input/output manager 30 starts timing a time from a timing T1 at which the finger is brought into contact.

Then, when a touch continuation time period of the finger or the like exceeds a predetermined touch detection time period without a contact position of the finger or the like on the touch panel moving out of a certain predetermined range, the input/output manager 30 determines that the gesture operation made by the user is a touch gesture operation to the update information display card. Then, at a point the input/output manager 30 judges that the operation is the touch gesture operation, that is, at a timing T2 at which the time period exceeds the touch detection time period, the display image generator 31 sets the desired update information display card to the preview state.

Moreover, when it is judged by the input/output manager 30 that the in-contact state of the finger or the like is being continued without the contact position of the finger or the like of the user moving out of the certain range even after the update information display card is set to the preview state, the display image generator 31 holds the preview state of the desired update information display card.

After that, when the input/output manager 30 detects that, after the finger or the like of the user is removed (released) from the touch panel at a timing T3, that state is maintained for over a predetermined release detection time period, the display image generator 31 restores the update information display card in the preview state to the idle state at a timing T4 at which the time period has exceeded the release detection time period.

Further, in this embodiment, when the finger or the like is removed from the touch panel immediately after the timing is started at the timing T1, the input/output manager 30 judges whether a time period from the timing T1 to a timing T5 at which the finger or the like is removed is within a predetermined tap detection time period.

Then, when the time period from the timing T1 to the timing T5 is within the tap detection time period, the input/output manager 30 judges that a tap gesture operation has been made by the user and activates an application program associated with the desired update information display card.

Moreover, in this embodiment, also when a gesture operation in which the finger or the like touches substantially the same position immediately after being released temporarily and the finger or the like is released again immediately after that is made while the desired update information display card is in the preview state, the input/output manager 30 judges that a tap gesture operation has been made by the user.

In other words, when the desired update information display card is in the preview state, the input/output manager 30 times a time period from a timing T6 at which the finger or the like of the user is temporarily released from the touch panel to a timing T7 at which the finger or the like that has touched substantially the same position again is released right after that.

Then, when it is judged that the time period from the timing T6 to the timing T7 is within a predetermined tap detection time period, the input/output manager 30 judges that a tap gesture operation has been made by the user and activates an application program associated with the update information display card in the preview state.

(Summary)

As described heretofore, the cellular phone terminal according to the embodiment of the present invention enables update information of a plurality of different types of content data to be managed integrally and update information to be arranged on the update information display cards. At the same time, by displaying the update information display cards as a list in a chronological order of the updates, it becomes possible for the user to simply and easily view details of the update information without requiring the user to perform complicated operations.

It should be noted that the above embodiment is merely an example of the present invention. Therefore, the present invention is not limited to the above embodiment and can of course be variously modified depending on a design and the like without departing from the technical idea of the present invention.

The above embodiment has exemplified the cellular phone terminal, but the present invention is also applicable to various information terminals that are capable of executing different types of application programs.

DESCRIPTION OF SYMBOLS 10 controller
11 communication circuit
12 communication antenna
13 display section
14 operation section (touch sensor)
15 memory section
16 built-in memory
17 card-type memory
16a program storage
16b data storage
20 speaker
21 microphone
22 near field communication section
23 near field communication antenna
24 GPS section
25 GPS antenna
26 noncontact communication section
27 noncontact communication antenna
28 camera section
29 external I/F section
30 input/output manager
31 display image generator
32 information manager
33 image display instruction section
40 information selector
41 update information manager
42 update information storage
43a SNS information storage
43b SMS/MMS information storage
43c e-mail information storage
43d address book information storage
43e RSS/ATOM information storage
43f calendar information storage
43g IM information storage
43h media information (local media information) storage
43i media information (network media information) storage
43A-43E information storage
44 network
50 display screen
51, 51d, 51v update information display card
55 finger of user
52a thumbnail image
52b, 52c, 52d letter information
52e, 52f icon
53 page designation icon
56 image information
60def default display state
60fa-60fd post-filter display state
61pa1, 61pa2 first pivot display state
62pe1 second pivot display state
70 content area
71 pivot option area
72 action softkey area

The invention claimed is:
1. An information terminal, comprising:
circuitry configured to:
    store a part of content data updated in an information storage that stores a plurality of types of content data, as update information associated with the respective types of content data, wherein the plurality of types of content data are unrelated and each correspond to all of the most recent events of different applications executed by the information terminal;
    monitor an update of the content data, store, when the content data is updated, the part of the updated content data as the update information associated with the respective types, and read out, during a predetermined screen display state, the update information associated with the respective types of content data in a chronological order of the updates of the content data; and
    arrange the individual time-series update information that have been read out on a plurality of predetermined object images respectively corresponding thereto, and align and display the predetermined object images on which the update information are arranged individually on a screen in the chronological order of the update information, wherein each of the predetermined object images displays an indicator which indicates which of the different applications the respective predetermined object image corresponds to, and each of the update information of the predetermined object images is independent of the other update information on other predetermined object images such that each of the update information does not include a portion of any other update information arranged individually on the screen in the chronological order,
wherein
    the different applications executed by the information terminal include at least a call processing application, an electronic messaging application, and a multimedia application,
    the types of content data associated with the call processing application include at least one of content data indicating a most recent received call at the information terminal, content data indicating a most recent missed call at the information terminal and content data indicating a most recent outgoing call at the information terminal,
    the types of content data associated with the an electronic messaging application include at least one of content data indicating a most recent received electronic message at the information terminal and content data indicating a most recent outgoing electronic message at the information terminal,
    the types of content data associated with the multimedia application include at least one of content data indicating a most recent addition of a new multimedia item at the information terminal and content data indicating a most recent deletion of an existing multimedia item at the information terminal, and
    the circuitry is further configured to:
        read out, when a filtering instruction that requests update information associated with different pieces of content data of the same type is input by a user via a user operation input section, the update information associated with the different pieces of content data of the same type in the chronological order of the updates every time the filtering instruction is input, and
        arrange the individual time-series update information that have been read out and are associated with the different pieces of content data of the same type on the plurality of predetermined object images, and switch the alignment display of the plurality of predetermined object images on which the update information are arranged individually every time the filtering instruction is input.

2. The information terminal according to claim 1, wherein the circuitry is further configured to:
- read out, when a pivoting instruction that requests update information of another same type of content data or a different type of content data related to a desired content data attribute is input by a user via a user operation input section, the update information of another same type of content data or a different type of content data related to the content data attribute desired by the user in the chronological order of the updates every time the pivoting instruction is input, and
- create a list of the time-series update information that have been read out and are associated with the same or different type of content data, and switch list display of the update information every time the pivoting instruction is input.

3. The information terminal according to claim 2, wherein the pivoting instruction includes a combination of a touch operation and a smear operation.

4. The information terminal according to claim 3, wherein the filtering instruction includes a flick.

5. The information terminal according to claim 1, wherein the circuitry is further configured to make a switch between an idle state where the predetermined object images on the display screen are displayed while surfaces of the predetermined object images are virtually tilted in a depth direction of the display screen and a preview state where the predetermined object images are displayed while the surfaces of the predetermined object images are virtually erected to become substantially parallel to the display screen, and set a predetermined object image selected by a user via a user operation input section out of the plurality of predetermined object images that are aligned and displayed to the preview state, and set the other predetermined object images to the idle state.

6. The information terminal according to claim 5, wherein the circuitry is further configured to:
- acquire, when a desired predetermined object image is selected by the user via the user operation input section out of the plurality of predetermined object images aligned and displayed on the screen, detailed update information of content data corresponding to the selected predetermined object image from the information storage, and
- arrange the detailed update information on the predetermined object image set to the preview state by the selection.

7. The information terminal according to claim 1, wherein the circuitry is configured to store the update information associated with each type of content data in separate individual storage locations, which each correspond to the different applications executed by the information terminal.

8. The information terminal according to claim 1, wherein filtering data is stored in association with each of the types of content data, and the circuitry is configured to filter the content data based on the filtering information.

9. The information terminal according to claim 1, wherein the circuitry is further configured to display a thumbnail image corresponding to the updated content data in each of the predetermined object images.

10. The information terminal according to claim 9, wherein the thumbnail image includes an image of a person associated with the at least one of the content data indicating the most recent received call at the information terminal, the content data indicating the most recent missed call at the information terminal and the content data indicating the most recent outgoing call at the information terminal.

11. The information terminal according to claim 9, wherein the thumbnail image includes an image of a person associated with the at least one of the content data indicating the most recent received electronic message at the information terminal and the content data indicating the most recent outgoing electronic message at the information terminal.

12. The information terminal according to claim 9, wherein the thumbnail image includes an image of a person associated with the at least one of the content data indicating the most recent addition of a new multimedia item at the information terminal and the content data indicating the most recent deletion of an existing multimedia item at the information terminal.

13. The information terminal according to claim 1, wherein the filtering instruction includes a flick.

14. An information presentation method for a mobile terminal, comprising the steps of:
- monitoring, by circuitry, an update of content data in an information storage that stores a plurality of types of content data and storing, when the content data is updated in the information storage, a part of the updated content data in an update information storage as update information associated with the respective types of content data, wherein the plurality of types of content data are unrelated and each correspond to all of the most recent events of different applications executed by the mobile terminal;
- reading out, by the circuitry, during a predetermined screen display state, the update information associated with the respective types of content data from the update information storage in a chronological order of the updates of the content data; and
- arranging, by the circuitry, the individual time-series update information that have been read out from the update information storage on a plurality of predetermined object images respectively corresponding thereto, and aligning and displaying the predetermined object images on which the update information are arranged individually on a screen in the chronological order of the update information, wherein each of the predetermined object images displays an indicator which indicates which of the different applications the respective predetermined object image corresponds to, and each of the update information of the predetermined object images is independent of the other update information on other predetermined object images such that each of the update information does not include a portion of any other update information arranged individually on the screen in the chronological order, wherein
- the different applications executed by the information terminal include at least a call processing application, an electronic messaging application, and a multimedia application,
- the types of content data associated with the call processing application include at least one of content data indicating a most recent received call at the information terminal, content data indicating a most recent missed call at the information terminal and content data indicating a most recent outgoing call at the information terminal,
- the types of content data associated with the an electronic messaging application include at least one of content data indicating a most recent received electronic message at the information terminal and content data indicating a most recent outgoing electronic message at the information terminal, the types of content data associated with the multimedia application include at least one of content data indicating a most recent addition of a new multimedia item at the information terminal and content data indicating a most recent deletion of an existing multimedia item at the information terminal, and the method further comprises:

reading out, when a filtering instruction that requests update information associated with different pieces of content data of the same type is input by a user via a user operation input section, the update information associated with the different pieces of content data of the same type in the chronological order of the updates every time the filtering instruction is input, and arranging the individual time-series update information that have been read out and are associated with the different pieces of content data of the same type on the plurality of predetermined object images, and switching the alignment display of the plurality of predetermined object images on which the update information are arranged individually every time the filtering instruction is input.

15. A non-transitory computer-readable medium including an information presentation program causing a mobile terminal to execute:

information management processing of monitoring an update of content data in an information storage that stores a plurality of types of content data that are unrelated and each correspond to all of the most recent events of different applications executed by the mobile terminal, storing, when the content data is updated in the information storage, a part of the updated content data in an update information storage as update information associated with the respective types of content data, and reading out, during a predetermined screen display state, the update information associated with the respective types of content data from the update information storage in a chronological order of the updates of the content data; and display control processing of arranging the individual time-series update information that have been read out from the update information storage in the information management processing on a plurality of predetermined object images respectively corresponding thereto, and aligning and displaying the predetermined object images on which the update information are arranged individually on a screen of a display section in the chronological order of the update information, wherein each of the predetermined object images displays an indicator which indicates which of the different applications the respective predetermined object image corresponds to, and each of the update information of the predetermined object images is independent of the other update information on other predetermined object images such that each of the update information does not include a portion of any other update information arranged individually on the screen in the chronological order, wherein the different applications executed by the information terminal include at least a call processing application, an electronic messaging application, and a multimedia application, the types of content data associated with the call processing application include at least one of content data indicating a most recent received call at the information terminal, content data indicating a most recent missed call at the information terminal and content data indicating a most recent outgoing call at the information terminal, the types of content data associated with the an electronic messaging application include at least one of content data indicating a most recent received electronic message at the information terminal and content data indicating a most recent outgoing electronic message at the information terminal, the types of content data associated with the multimedia application include at least one of content data indicating a most recent addition of a new multimedia item at the information terminal and content data indicating a most recent deletion of an existing multimedia item at the information terminal, the information management processing further includes reading out, when a filtering instruction that requests update information associated with different pieces of content data of the same type is input by a user via a user operation input section, the update information associated with the different pieces of content data of the same type in the chronological order of the updates every time the filtering instruction is input, and the display control processing further includes arranging the individual time-series update information that have been read out and are associated with the different pieces of content data of the same type on the plurality of predetermined object images, and switching the alignment display of the plurality of predetermined object images on which the update information are arranged individually every time the filtering instruction is input.

* * * * *